United States Patent
Hao et al.

(10) Patent No.: US 8,559,355 B2
(45) Date of Patent: Oct. 15, 2013

(54) METHOD FOR CONFIGURING AND INDICATING PHYSICAL RANDOM ACCESS CHANNEL PRACH PARAMETERS IN A TIME DIVISION DUPLEX SYSTEM

(75) Inventors: Peng Hao, Shenzhen (CN); Shuqiang Xia, Shenzhen (CN); Chunli Liang, Shenzhen (CN); Bo Dai, Shenzhen (CN); Bin Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 454 days.

(21) Appl. No.: 12/935,862

(22) PCT Filed: Jan. 21, 2009

(86) PCT No.: PCT/CN2009/070256
§ 371 (c)(1),
(2), (4) Date: Sep. 30, 2010

(87) PCT Pub. No.: WO2009/121248
PCT Pub. Date: Oct. 8, 2009

(65) Prior Publication Data
US 2011/0026445 A1 Feb. 3, 2011

(30) Foreign Application Priority Data

Apr. 2, 2008 (CN) .......................... 2008 1 0066390

(51) Int. Cl.
*H04W 4/00* (2009.01)
(52) U.S. Cl.
USPC ............................ 370/314; 370/345; 370/462
(58) Field of Classification Search
USPC .................. 370/310–350, 434, 450–455, 501, 370/509–514, 519, 68, 69; 455/434, 455/450–455, 501, 509–514, 519, 68, 69
See application file for complete search history.

(56) References Cited

U.S. PATENT DOCUMENTS

| | | | |
|---|---|---|---|
| 2001/0024956 A1 | 9/2001 | You et al. | |
| 2010/0182974 A1* | 7/2010 | Barraclough et al. | 370/329 |
| 2010/0260079 A1* | 10/2010 | Baldemair et al. | 370/280 |

FOREIGN PATENT DOCUMENTS

| | | |
|---|---|---|
| CN | 101242669 A | 8/2008 |
| CN | 101250774 A | 8/2008 |
| CN | 101252775 A | 8/2008 |
| JP | 2004112389 A | 4/2004 |

* cited by examiner

*Primary Examiner* — Andrew Chriss
*Assistant Examiner* — Kenan Cehic
(74) *Attorney, Agent, or Firm* — Christopher L. Parmelee; Walker & Jocke

(57) ABSTRACT

The present invention discloses a method for configuring and indicating physical random access channel parameter in a time division duplex system, suitable for the long term evolution system, including: the same PRACH configuration set is stored in a base station and a terminal respectively; when performing a PRACH configuration, the terminal inquires the PRACH configuration set according to configuration information to obtain a configuration parameter, and/or the terminal computes to obtain the configuration parameter according to a system parameter. Set by using the method provided by the present invention, the PRACH configuration set can provide enough density types for various PRACH formats in order to meet the requirements of different system loads, and meanwhile can provide enough version types for each combination of format and density, decrease the processing load of the base station, and reduce the inter-cell interference.

13 Claims, 2 Drawing Sheets

METHOD FOR CONFIGURING AND INDICATING PHYSICAL RANDOM ACCESS CHANNEL PRACH PARAMETERS IN A TIME DIVISION DUPLEX SYSTEM

FIELD OF THE INVENTION

The present invention relates to the field of mobile communication, in particular to a method for configuring and indicating physical random access channel parameters in a time division duplex (TDD for short) system.

BACKGROUND OF THE INVENTION

A frame structure in the TDD mode of the long term evolution (LTE for short) system is shown in FIG. 1. In such a frame structure, one radio frame with a length of 10 ms (307200 Ts, 1 ms=30720 Ts) is divided into 2 half-frames each of which is 5 ms (153600 Ts) long and comprises 8 normal time slots with a length of 0.5 ms and 3 special time slots. The 3 special time slots are a downlink pilot time Slot (DwPTS for short), a guard period (GP for short), and an uplink pilot time slot (UpPTS for short), and the total lengths of these 3 special time slots is 1 ms (30720 Ts). Subframe 1 is always consisted of 3 special time slots; when there are 2 downlink-to-uplink switching points in 10 ms, subframe 6 is consisted of 3 special time slots; in other cases, subframe 6 only comprises a DwPTS (here the length of the DwPTS is 1 ms). Other subframes are consisted of 2 normal time slots.

In the above frame structure, subframes 0, 5 and the DwPTS are always used for downlink transmission, and subframe 2 and the UpPTS are always used for uplink transmission. When there are 2 downlink-to-uplink switching points in 10 ms, subframe 7 is also used for uplink transmission.

In the TDD mode of the LTE system, a physical random access channel (PRACH for short) has two categories:

The first category: this category of the PRACH is transmitted in normal uplink subframes (subframes with special time slots are not included), and this category of the PRACH has four types of formats:

(1) Preamble format 0: occupying 1 uplink subframe, the length of the cyclic prefix (CP for short) is 3168 TS and the length of the preamble is 24576 Ts;

(2) Preamble format 1: occupying 2 uplink subframes, the length of the CP is 21024 TS, and the length of the preamble is 24576 Ts;

(3) Preamble format 2: occupying 2 uplink subframes, the length of the CP is 6240 TS and the length of the preamble is 2×24576 Ts;

(4) Preamble format 3: occupying 3 uplink subframes, the length of the CP is 21024 Ts and the length of the preamble is 2×24576 Ts;

The second category: this category of the PRACH is transmitted in the UpPTS, and this category of the PRACH has one type of format:

(1) Preamble format 4: the length of the CP is 448 Ts and the length of the preamble is 4096 Ts.

In the frequency domain, the various PRACHs mentioned above all occupy 6 resource blocks (RB for short), each RB comprises 12 subcarriers, and the bandwidth of each subcarrier is 15 kHz.

When a mobile terminal such as a cell phone accesses a system, downlink synchronization is performed first, and then the cell phone demodulates the broadcast channel to obtain the configuration parameters of the PRACH, and finally uplink synchronization is accomplished via the PRACH, and a connection to a base station is established.

Herein, the configuration parameters of the PRACH in the TDD mode comprises density (viz. the number of the available PRACHs per time unit), preamble format (hereinafter referred to as format for shot), and version number. Wherein, if the formats and densities are the same but the versions are different, it means that the preamble formats are the same and the numbers of the PRACHs per time unit are the same, while the locations of these PRACHs in the time domain or in the frequency domain are different. In a practical application, a plurality of versions can be set for the PRACHs with the same format and the same density. The purpose for using these different versions of the PRACHs in different cells is: to scatter the PRACHs of different cells managed by the same base station in the time domain for trying to allow the respective cells managed by the same base station to initiate a PRACH processing request at different times so as to avoid the case that the base station is over busy at some time, while it has no data to process at other time. In addition, for the PRACH of the preamble format 4, since data are not sent in the UpPTS, different cells use different versions, the PRACH of each cell has a different location in the time domain or in the frequency domain, reducing the inter-cell interference of the PRACHs.

How to indicate the PRACH configuration parameters to a terminal with less air interface resources is a problem to be urgently solved.

SUMMARY OF THE INVENTION

The main object of the present invention is to provide an improved method for configuring and indicating physical random access channel, PRACH, parameters in a TDD system so as to indicate the PRACH configuration parameters to a terminal with less air interface resources.

In order to realize the above mentioned object, the prevent invention provides a method for configuring and indicating PRACH parameters in a TDD system, suitable for a long term evolution, LTE, system.

The method according to the present invention includes: The same PRACH configuration set is stored in a base station and a terminal, respectively; when performing a PRACH configuration, the terminal inquires the PRACH configuration set according to configuration information to obtain configuration parameters, and/or the terminal computes to obtain the configuration parameters according to a system parameter.

Further, the PRACH configuration parameters mentioned above include one or more of the following combinations: density, PRACH format, and version number.

Further, the terminal computing to obtain the configuration parameters according to the system parameter computation refers to the terminal obtaining a version number according to the system parameter computation, the operation specifically comprising:

the terminal computes the number of versions according to the following formula:

$$R = \left\lfloor \frac{N_{RA}^{BW} \cdot N_{SP}}{D} \right\rfloor,$$

wherein R is the number of versions, $N_{RA}^{BW}$ is the number of the PRACHs supported by the system in frequency domain, $N_{SP}$ is the number of switch points within 10 ms, and D is the density of the PRACHs; the terminal computes the version number according to the following formula: $r = N_{ID}^{cell} \mod R$, wherein $N_{ID}^{cell}$ represents the ID value of the cell, and R is the number of versions.

Further, the method of generating the PRACH configuration set is as follows: determining the density set supported by each kind of PRACH format; combining each PRACH format and the density supported by each PRACH format and determining one configuration index for each combination; and storing various kinds of combinations and configuration indexes in the PRACH configuration set.

Further, in the method of generating the PRACH configuration set, computing the number of versions needed for the PRACH format to enable the PRACHs of all the cells managed by the same base station to be distributed uniformly in time at the density supported by the PRACH format, after determining the density set supported by each kind of PRACH format; selectively allocating corresponding number of version numbers for the PRACH format and the density supported by the PRACH format according to the number of versions; and storing combinations of the PRACH format, the density supported by the PRACH format, and the corresponding version number in the PRACH configuration set, and determining one configuration index for each kind of combination.

Performing configuration using the method provided by the present invention, the PRACH configuration set can provide enough density types for various PRACH formats in order to satisfy the requirements of different system loads, and meanwhile, can provide enough version types for each combination of format and density, decrease the processing load of the base station, and reduce the inter-cell interference.

DETAILED DESCRIPTION OF THE PREFERRED EMBODIMENTS

Function Summary

An embodiment of the present invention provides an improved method for configuring and indicating PRACH parameters in a TDD system, in which PRACH configuration parameters can be indicated to a terminal with less air interface resources. Since the PRACH configuration parameters in the TDD mode comprise density, PRACH format (preamble format), and version number, and the LTE system indicates the above PRACH configuration parameters using 6 bits, the PRACH configuration set may comprise at most 64 kinds of configuration. In order to use these indication bits effectively, in the technical solution of the embodiment of the present invention, different configuration parameters can be combined into one configuration set, and different indexes are set for different configuration parameters, and the configuration set is pre-stored in a base station and in a terminal, and when broadcasting the PRACH configuration parameters to the terminal, the base station only needs to inform the terminal of the configuration index, and the terminal inquires the configuration set to obtain the PRACH configuration parameters, i.e., obtaining the PRACH format, the density, and the version number. For the version number, one of the configuration parameters, besides being informed to the terminal by its presence in the configuration set, it can also be computed by the terminal according to system parameters.

If no conflict is involved, the embodiments and the features of the embodiments of the present invention can be combined with one another. In addition, it needs to be explained that the steps shown in the flow chart of the drawings can be executed for example in a computer system via a set of computer executable instructions. Moreover, although a logical order is shown in the flow chart, the shown or described steps can be executed in an order different from the above order in some cases.

Figure 2:
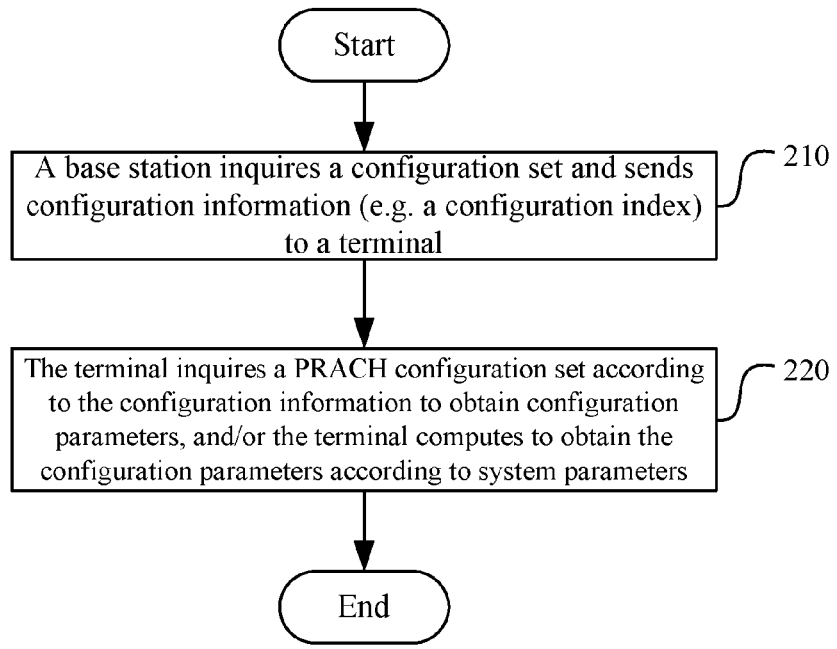
FIG. 2 is a flow chart showing indicating PRACH configuration parameters in the TDD mode of the LTE system according to the present embodiment.

FIG. 2 shows a process for indicating PRACH configuration parameters in the TDD mode of the LTE system according to an embodiment of the present invention. As shown in FIG. 2, the following processing is included:

Step 210, a base station inquires a configuration set and sends configuration information (e.g. configuration index) to a terminal;

Step 220, the terminal inquires a PRACH configuration set according to the configuration information to obtain configuration parameters, and/or the terminal computes to obtain the configuration parameters according to system parameters.

In other embodiments, other configuration parameters can also be added in the configuration set, and any one or several configuration parameters can be used as the configuration information and set for the terminal as long as other corresponding parameters of the configuration set can be determined solely from the configuration information.

The processing above will be described hereinafter in detail.

Currently, according to the load analysis of the system, there are in total six types of the densities available for the respective formats in the LTE system, i.e., 0.5, 1, 2, 3, 5, 10 PRACH/10 ms, wherein 0.5 PRACH/10 ms represents that there is 1 PRACH per 20 ms. In addition, when 1 radio frame contains 2 switching points, two densities of 2 and 4 PRACH/10 ms are also added in order to ensure the equal numbers of the PRACHs of 2 half-frames.

A method for generating a PRACH configuration set in the TDD mode mainly includes the following processing (Step 1 to Step 3):

Step 1, selects, from six types of available densities, a density set supported by a preamble format for respective preamble formats.

Selection principle: 1. considering the requirements of different system loads; 2. making the total number of the configuration sets not exceed a maximum configuration number limited by the system (for example, 16, 32 or 64).

Selection Manners:

(1) The density set supported by preamble format 0 may be any one of the following solutions:

0.5, 1, 2, 3, 5, 10 PRACH/10 ms;
0.5, 1, 2, 3, 5 PRACH/10 ms;
0.5, 1, 2, 3 PRACH/10 ms;
1, 2, 3, 5, 10 PRACH/10 ms;
1, 2, 3, 5 PRACH/10 ms;
1, 2, 3 PRACH/10 ms;
1, 2 PRACH/10 ms;
0.5, 1, 2, 3, 4, 5, 6, 10 PRACH/10 ms;
0.5, 1, 2, 3, 4, 5, 6 PRACH/10 ms;
0.5, 1, 2, 4, 6, 10 PRACH/10 ms; and
0.5, 1, 2, 4, 6 PRACH/10 ms;

(2) The density set supported by preamble format 1 or 2 may be any one of the following solutions:
0.5, 1, 2, 3, 5 PRACH/10 ms;
0.5, 1, 2, 3 PRACH/10 ms;
0.5, 1, 2 PRACH/10 ms;
0.5, 1 PRACH/10 ms;
1, 2, 3, 5 PRACH/10 ms;
1, 2, 3 PRACH/10 ms;
1, 2 PRACH/10 ms;
0.5, 1, 2, 3, 5, 6 PRACH/10 ms;
0.5, 1, 2, 4, 6 PRACH/10 ms; and
0.5, 1, 2, 4 PRACH/10 ms;

(3) The density or density set supported by preamble format 3 may be any one of the following solutions:
0.5, 1, 2, 3, 5 PRACH/10 ms;
0.5, 1, 2, 3 PRACH/10 ms;
0.5, 1, 2 PRACH/10 ms;
0.5, 1 PRACH/10 ms;
0.5 PRACH/10 ms;
1, 2, 3, 5 PRACH/10 ms;
1, 2, 3 PRACH/10 ms;
1, 2 PRACH/10 ms;
1 PRACH/10 ms;
0.5, 1, 2, 3, 4 PRACH/10 ms;
0.5, 1, 2, 4 PRACH/10 ms; and
0.5, 1, 2, 4, 6 PRACH/10 ms;

(4) The density set supported by preamble format 4 may be any one of the following solutions:
0.5, 1, 2, 3, 5, 10 PRACH/10 ms;
0.5, 1, 2, 3, 5 PRACH/10 ms;
0.5, 1, 2, 3 PRACH/10 ms;
1, 2, 3, 5, 10 PRACH/10 ms;
1, 2, 3, 5 PRACH/10 ms;
1, 2, 3 PRACH/10 ms;
1, 2 PRACH/10 ms;
0.5, 1, 2, 3, 4, 5, 6, 10 PRACH/10 ms;
0.5, 1, 2, 3, 4, 5, 6 PRACH/10 ms;
0.5, 1, 2, 4, 6, 10 PRACH/10 ms; and
0.5, 1, 2, 4, 6 PRACH/10 ms;

Step 2, computes the number of versions R needed for each kind of preamble format and its supported density to enable the PRACHs of all the cells managed by the same base station to be distributed uniformly in time; the computing methods can be selected from one of the following six methods:

(1) method A1, when the density range is 0.5, 1, 2, 3, 5, and 10 PRACH/10 ms, determining the maximum value of the smallest number of versions needed for enabling the PRACHs of all the cells managed by the same base station to be distributed uniformly in time for the configuration of each PRACH format, the density supported by each PRACH format, and different downlink uplink subframe ratios.

Specifically, the minimum value for each PRACH format and density for each downlink uplink ratio is computed. Based on the above results, the maximum value of the minimum values corresponding to all the downlink uplink ratios is taken as the number of versions needed. Therefore, the number of versions needed is: the number of versions corresponding to each PRACH format and density is the maximum value of the smallest number of versions needed for respective downlink uplink ratios.

Figure 1:
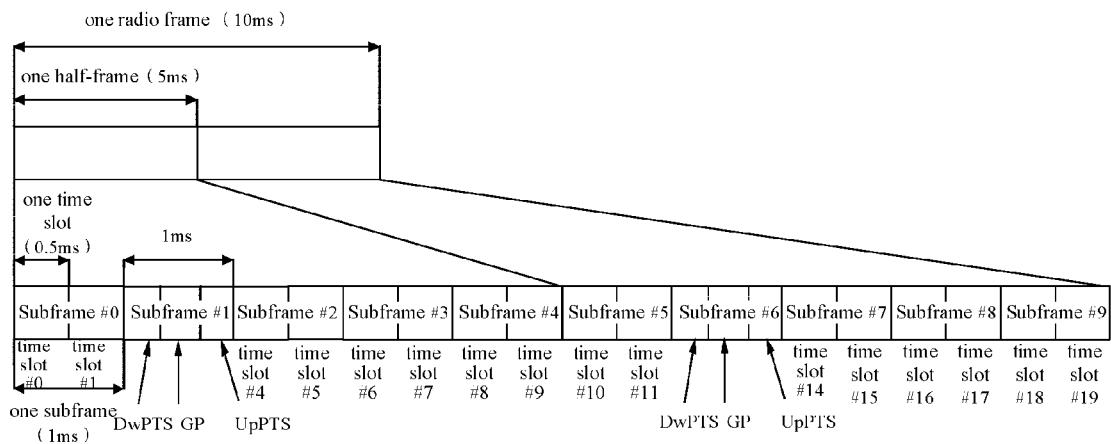
FIG. 1 is a schematic diagram showing a frame structure in the TDD mode of the LTE system in the relevant art.

For the radio frame structure as shown in FIG. 1, there are multiple options for the downlink uplink subframe ratios: 3:1, 2:2, 1:3, 5:3, 1:8, 2:7, and 3:6.

Figure 3:
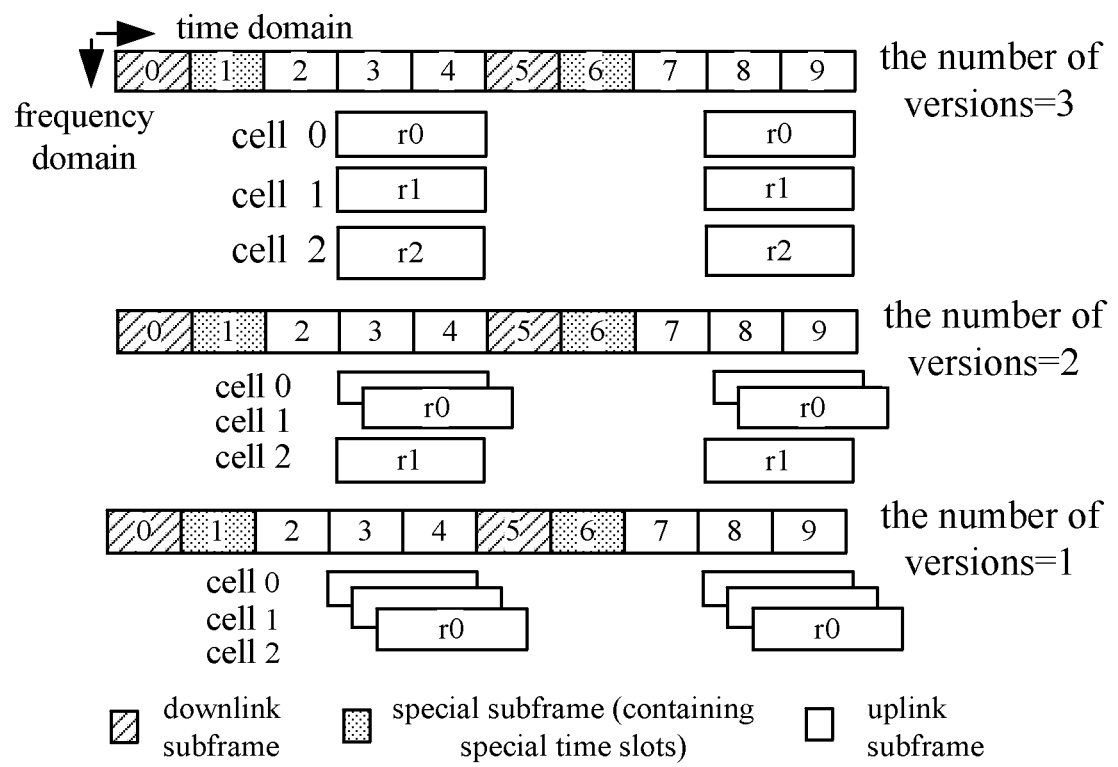
FIG. 3 is a schematic diagram showing scattered PRACHs of respective cells managed by a base station.

For an example: when the base station manages three cells, for preamble format 1, in a case that the density D=2 PRACH/10 ms, and the ratio of downlink subframe to uplink subframe=1:3, the greatest number of versions is needed. Therefore, it is only needed to determine the smallest number of versions needed in this case. Herein, R=1 or 2 or 3, and thus the effects of scattering in the time domain are the same. As shown in FIG. 3, Cell 0, Cell 1, and Cell 2 are three cells managed by the same base station. It can be seen that, no matter R=1 or R=2 or R=3, the base station needs to process three PRACHs at the same time. Therefore, the smallest number of versions R is equal to 1 at this time. Thus, it can be determined that, for preamble format 1, in a case that the density D=2 PRACH/10 ms, in order to enable the PRACHs of the three cells managed by the same base station to be distributed uniformly in time, the number of versions needed is determined as R=1.

According to method A1, in the LTE system, when each base station manages three cells, the number of versions R needed for each preamble format and the density supported by each preamble format is determined as follows:

for preamble format 0, R=3 for all the densities;
for preamble format 1 or 2, R=3 if the density D is 0.5 PRACH/10 ms; R=2 if D is 1, 3, 5 PRACH/10 ms; and R=1 if the density D is 2 PRACH/10 ms;
for preamble format 3, R=3 if D=0.5 PRACH/10 ms; R=2 if D=1, 3, 5 PRACH/10 ms; R=1 if the density D is 2 PRACH/10 ms; and
for preamble format 4, R=3 if D=0.5 PRACH/10 ms; R=2 if D=1, 3, 5 PRACH/10 ms; and R=1 if the density D is 2 PRACH/10 ms.

According to method A1, in the LTE system, when each base station manages four cells, the number of versions R needed for each preamble format and the density supported by each preamble format is determined as follows:

for preamble format 0, R=4 if D=0.5 and R=3 for other densities;
for preamble format 1 or 2, R=4 if the density D=0.5 PRACH/10 ms; R=2 if D=1, 3, 5 PRACH/10 ms; and R=1 if the density D=2 PRACH/10 ms;
for preamble format 3, R=4 if D=0.5 PRACH/10 ms; R=2 if D=1, 3, 5 PRACH/10 ms, and R=1 if the density D=2 PRACH/10 ms; and
for preamble format 4, R=4 if D=0.5 PRACH/10 ms; R=2 if D=1, 3, 5 PRACH/10 ms; and R=1 if the density D=2, 10 PRACH/10 ms.

(2) Method A2, in order to enable the PRACHs of all the cells managed by the same base station to be distributed uniformly in time, the number of versions R can be determined according to the following formula, the result of which is applicable to all the densities:

$$R = \left\lfloor \frac{N_{RA}^{BW} \cdot N_{SP}}{D} \right\rfloor \qquad \text{Formula (1)}$$

wherein $N_{RA}^{BW}$ denotes the number of the PRACHs supported by the system in the frequency domain, $N_{SP}$ denotes the number of switching points within 10 ms, and D denotes the density of the PRACHs;

for example, if $N_{RA}^{BW}=6$, $N_{SP}=2$, and D=1, then $$R = \left\lfloor \frac{N_{RA}^{BW} \cdot N_{SP}}{D} \right\rfloor = 12.$$

In this method, R varies with the variety of the system configuration, for example, R varies with $N_{RA}^{BW}$ and $N_{SP}$. The benefits for setting in this way lie in that: the more the number of the PRACHs supported by the system in the frequency domain is, the more the number of versions provided is, the less the opportunities for transmitting the PRACHs of different cells in the same time frequency are. Therefore, the interference can be reduced.

When this method is used to determine the number of versions, a large number of the number of versions may be obtained. If they can not be all placed into a configuration set, it is needed that the base station and the terminal compute the number of versions by themselves.

(3) Method A3, when the base station manages n cells, the number of versions R=n (1≤n≤4). The number of versions determined using this method is also to enable the PRACHs of all the cells managed by the same base station to be distributed uniformly in time, the result of which is applicable to all the densities.

For example, if the base station manages three cells, the number of versions R is 3 for a certain combination of the preamble format and the density.

(4) Method A4, the number of versions $$R = \min\left(\left\lfloor \frac{N_{RA}^{BW} \cdot N_{SP}}{D} \right\rfloor, 3\right),$$

the result of which is applicable to all the densities.

(5) Method A5, when the density range is 0.5, 1, 2, 3, 4, 5, 6, and 10 PRACH/10 ms, the maximum value of the smallest number of versions needed for enabling the PRACHs of all the cells managed by the same base station to be distributed uniformly in time is determined according to respective PRACH formats, the densities supported by the respective PRACH formats, and the uplink downlink subframe ratios. Case (1) that the numbers of the PRACHs contained by two half-frames in the time domain are not equal shall be considered separately from case (2) the numbers of the PRACHs contained by two half-frames in the time domain are equal. D=3, 5 is used for case (1), and D=4, 6 is used for case (2), and other densities are used for the above two cases.

for preamble format 0, R=2 if D=6 and R=3 for other densities;

for preamble format 1 or 2, R=3 if the density D=0.5 PRACH/10 ms; R=2 if the density D=1 PRACH/10 ms; and R=1 if D=2, 3, 4, 5, 6 PRACH/10 ms;

for preamble format 3, R=3 if D=0.5 PRACH/10 ms; R=2 if D=1 PRACH/10 ms; and R=1 if the density D=2, 3, 4 PRACH/10 ms; and for preamble format 4, R=3 if D=0.5 PRACH/10 ms; R=2 if D=1 PRACH/10 ms; and R=1 if the density D=2, 3, 4, 5, 6, 10 PRACH/10 ms;

(6) Method A6, when the density range is 0.5, 1, 2, 4, 6, and 10 PRACH/10 ms, the maximum value of the smallest number of versions needed for enabling the PRACHs of all the cells managed by the same base station to be distributed uniformly in time is determined according to respective PRACH formats and the densities supported by the respective PRACH formats and the uplink downlink subframe ratios.

As for preamble format 0, R=3 for all the densities;

As for preamble format 1, 2, 3 or 4, R=3 if the density D=0.5 PRACH/10 ms; R=2 if the density D=1 PRACH/10 ms; and R=1 if the density D=2, 4, 6, 10 PRACH/10 ms;

Step 3, stores respective PRACH formats and the version number information and/or the densities supported by the respective PRACH formats in the PRACH configuration set.

The PRACH format is combined with its supported densities and then stored in the PRACH configuration set.

A corresponding number of version numbers are allocated selectively for the PRACH format and its supported density according to the number of versions; for the PRACH format and the density allocated with a version number, a corresponding relationship between the PRACH format and a combination of the density and the version number is recorded in the PRACH configuration set.

One of the following methods is used for allocation:

(1) Method B1, a corresponding number of version numbers r are allocated according to the number of versions and recorded correspondingly in the PRACH set, for example: r may be 0, 1, ..., R−1.

If the number of versions R for a certain combination of the preamble format and the density is obtained by method A1 or A3 or A5 or A6 or A7 in Step 220, method B1 is preferably used to obtain the version number. By means of marking the version number, high flexibility is granted when the base station configures a channel version and/or density for the terminal, and the configuration is more convenient and rapid.

(2) Method B2, the version number is not specified from the PRACH configuration set but computed by the terminal when it is configured, for example, the following formula is used to compute:

$$r = N_{ID}^{cell} \bmod R \qquad \text{Formula (2)}$$

wherein $N_{ID}^{cell}$ denotes the ID value of the cell, and the base station informs the terminal of $N_{ID}^{cell}$ through signaling.

When there are a large number of the numbers of versions, this method is preferably used to obtain the version number. For example, if the number of versions R for a certain combination of the preamble format and the density is obtained by the method A2 or A4 in the previous step, since the number of versions is relatively large, this method may be used. The terminal computes to obtain the number of versions R by the obtained system parameters and above Formula (1) and then obtains the version number according to Formula (2).

If the version numbers of all the PRACH formats are computed by the terminal, only respective PRACH formats and the densities supported by the respective PRACH formats are stored in a PRACH table.

The following embodiments are taken as examples for explaining the configuration sets that are possibly generated for respective PRACH formats in a case that different densities and the version numbers are given. The finally generated configuration sets may be combinations in the following respective cases.

Examples for Configuration Sets of Preamble Format 0

Embodiment 1

The supported densities are: 0.5, 1, 2, 3, 5, 10 PRACH/10 ms; the number of versions is determined using method A1 (the base station manages three cells); and the version number is allocated using method B1; and the configuration result is as shown in the following Table 1.

TABLE 1

| Preamble format | Density (D) | Version number (r) |
|---|---|---|
| 0 | 0.5 | 0 |
| 0 | 0.5 | 1 |
| 0 | 0.5 | 2 |
| 0 | 1 | 0 |
| 0 | 1 | 1 |

TABLE 1-continued

| Preamble format | Density (D) | Version number (r) |
|---|---|---|
| 0 | 1 | 2 |
| 0 | 2 | 0 |
| 0 | 2 | 1 |
| 0 | 2 | 2 |
| 0 | 3 | 0 |
| 0 | 3 | 1 |
| 0 | 3 | 2 |
| 0 | 5 | 0 |
| 0 | 5 | 1 |
| 0 | 5 | 2 |
| 0 | 10 | 0 |
| 0 | 10 | 1 |
| 0 | 10 | 2 |

Embodiment 2

The supported densities are: 0.5, 1, 2, 3, 5 PRACH/10 ms; the number of versions is determined using method A1 (the base station manages three cells); and the version number is allocated using method B1; and the configuration result is as shown in the following Table 2.

TABLE 2

| Preamble format | Density (D) | Version number (r) |
|---|---|---|
| 0 | 0.5 | 0 |
| 0 | 0.5 | 1 |
| 0 | 0.5 | 2 |
| 0 | 1 | 0 |
| 0 | 1 | 1 |
| 0 | 1 | 2 |
| 0 | 2 | 0 |
| 0 | 2 | 1 |
| 0 | 2 | 2 |
| 0 | 3 | 0 |
| 0 | 3 | 1 |
| 0 | 3 | 2 |
| 0 | 5 | 0 |
| 0 | 5 | 1 |
| 0 | 5 | 2 |

Embodiment 3

The supported densities are: 0.5, 1, 2, 3 PRACH/10 ms; the number of versions is determined using method A1 (the base station manages three cells); and the version number is allocated using method B1; and the configuration result is as shown in the following Table 3.

TABLE 3

| Preamble format | Density (D) | Version number (r) |
|---|---|---|
| 0 | 0.5 | 0 |
| 0 | 0.5 | 1 |
| 0 | 0.5 | 2 |
| 0 | 1 | 0 |
| 0 | 1 | 1 |
| 0 | 1 | 2 |
| 0 | 2 | 0 |
| 0 | 2 | 1 |
| 0 | 2 | 2 |
| 0 | 3 | 0 |
| 0 | 3 | 1 |
| 0 | 3 | 2 |

Embodiment 4

The supported densities are: 1, 2, 3 PRACH/10 ms; the number of versions is determined using method A1 (the base station manages three cells); and the version number is allocated using method B1; and the configuration result is as shown in the following Table 4.

TABLE 4

| Preamble format | Density (D) | Version number (r) |
|---|---|---|
| 0 | 1 | 0 |
| 0 | 1 | 1 |
| 0 | 1 | 2 |
| 0 | 2 | 0 |
| 0 | 2 | 1 |
| 0 | 2 | 2 |
| 0 | 3 | 0 |
| 0 | 3 | 1 |
| 0 | 3 | 2 |

Embodiment 5

The supported densities are: 1, 2 PRACH/10 ms; the number of versions is determined using method A1 (the base station manages three cells); and the version number is allocated using method B1; and the configuration result is as shown in the following Table 5.

TABLE 5

| Preamble format | Density (D) | Version number (r) |
|---|---|---|
| 0 | 1 | 0 |
| 0 | 1 | 1 |
| 0 | 1 | 2 |
| 0 | 2 | 0 |
| 0 | 2 | 1 |
| 0 | 2 | 2 |

Embodiment 6

The supported densities are: 1, 2, 3, 5, 10 PRACH/10 ms; the number of versions is determined using method A1 (the base station manages three cells); and the version number is allocated using method B1; and the configuration result is as shown in the following Table 6.

TABLE 6

| Preamble format | Density (D) | Version number (r) |
|---|---|---|
| 0 | 1 | 0 |
| 0 | 1 | 1 |
| 0 | 1 | 2 |
| 0 | 2 | 0 |
| 0 | 2 | 1 |
| 0 | 2 | 2 |
| 0 | 3 | 0 |
| 0 | 3 | 1 |
| 0 | 3 | 2 |
| 0 | 5 | 0 |
| 0 | 5 | 1 |
| 0 | 5 | 2 |
| 0 | 10 | 0 |
| 0 | 10 | 1 |
| 0 | 10 | 2 |

Embodiment 7

The supported densities are: 1, 2, 3, 5 PRACH/10 ms; the number of versions is determined using method A1 (the base station manages three cells); and the version number is allocated using method B1; and the configuration result is as shown in the following Table 7.

TABLE 7

| Preamble format | Density (D) | Version number (r) |
|---|---|---|
| 0 | 1 | 0 |
| 0 | 1 | 1 |
| 0 | 1 | 2 |
| 0 | 2 | 0 |
| 0 | 2 | 1 |
| 0 | 2 | 2 |
| 0 | 3 | 0 |
| 0 | 3 | 1 |
| 0 | 3 | 2 |
| 0 | 5 | 0 |
| 0 | 5 | 1 |
| 0 | 5 | 2 |

Embodiment 8

The supported densities are: 0.5, 1, 2, 3, 5, 10 PRACH/10 ms; the number of versions is determined using method A1 (the base station manages four cells); and the version number is allocated using method B1; and the configuration result is as shown in the following Table 8.

TABLE 8

| Preamble format | Density (D) | Version number (r) |
|---|---|---|
| 0 | 0.5 | 0 |
| 0 | 0.5 | 1 |
| 0 | 0.5 | 2 |
| 0 | 0.5 | 3 |
| 0 | 1 | 0 |
| 0 | 1 | 1 |
| 0 | 1 | 2 |
| 0 | 2 | 0 |
| 0 | 2 | 1 |
| 0 | 2 | 2 |
| 0 | 3 | 0 |
| 0 | 3 | 1 |
| 0 | 3 | 2 |
| 0 | 5 | 0 |
| 0 | 5 | 1 |
| 0 | 5 | 2 |
| 0 | 10 | 0 |
| 0 | 10 | 1 |
| 0 | 10 | 2 |

Embodiment 9

The supported densities are: 0.5, 1, 2, 3, 5 PRACH/10 ms; the number of versions is determined using method A1 (the base station manages four cells); and the version number is allocated using method B1; and the configuration result is as shown in the following Table 9.

TABLE 9

| Preamble format | Density (D) | Version number (r) |
|---|---|---|
| 0 | 0.5 | 0 |
| 0 | 0.5 | 1 |
| 0 | 0.5 | 2 |
| 0 | 0.5 | 3 |
| 0 | 1 | 0 |
| 0 | 1 | 1 |
| 0 | 1 | 2 |
| 0 | 2 | 0 |
| 0 | 2 | 1 |
| 0 | 2 | 2 |
| 0 | 3 | 0 |
| 0 | 3 | 1 |
| 0 | 3 | 2 |
| 0 | 5 | 0 |
| 0 | 5 | 1 |
| 0 | 5 | 2 |

Embodiment 10

The supported densities are: 0.5, 1, 2, 3 PRACH/10 ms; the number of versions is determined using method A1 (the base station manages four cells); and the version number is allocated using method B1; and the configuration result is as shown in the following Table 10.

TABLE 10

| Preamble format | Density (D) | Version number (r) |
|---|---|---|
| 0 | 0.5 | 0 |
| 0 | 0.5 | 1 |
| 0 | 0.5 | 2 |
| 0 | 0.5 | 3 |
| 0 | 1 | 0 |
| 0 | 1 | 1 |
| 0 | 1 | 2 |
| 0 | 2 | 0 |
| 0 | 2 | 1 |
| 0 | 2 | 2 |
| 0 | 3 | 0 |
| 0 | 3 | 1 |
| 0 | 3 | 2 |

Embodiment 11

The supported densities are: 0.5, 1, 2, 3, 5, 10 PRACH/10 ms; the number of versions is determined using method A3, R=3; and the version number is allocated using method B2; and the configuration result is as shown in the following Table 11.

TABLE 11

| Preamble format | Density (D) | Version number (r) |
|---|---|---|
| 0 | 0.5 | \ |
| 0 | 1 | \ |
| 0 | 2 | \ |
| 0 | 3 | \ |
| 0 | 5 | \ |
| 0 | 10 | \ |

Embodiment 12

The supported densities are: 0.5, 1, 2, 3, 5 PRACH/10 ms; the number of versions is determined using method A3, R=3;

and the version number is allocated using method B2; and the configuration result is as shown in the following Table 12.

TABLE 12

| Preamble format | Density (D) | Version number (r) |
|---|---|---|
| 0 | 0.5 | \ |
| 0 | 1 | \ |
| 0 | 2 | \ |
| 0 | 3 | \ |
| 0 | 5 | \ |

Embodiment 13

The supported densities are: 0.5, 1, 2, 3 PRACH/10 ms; the number of versions is determined using method A3, R=3; and the version number is allocated using method B2; and the configuration result is as shown in the following Table 13.

TABLE 13

| Preamble format | Density (D) | Version number (r) |
|---|---|---|
| 0 | 0.5 | \ |
| 0 | 1 | \ |
| 0 | 2 | \ |
| 0 | 3 | \ |

Embodiment 14

The supported densities are: 1, 2, 3 PRACH/10 ms; the number of versions is determined using method A3, R=3; and the version number is allocated using method B2; and the configuration result is as shown in the following Table 14.

TABLE 14

| Preamble format | Density (D) | Version number (r) |
|---|---|---|
| 0 | 1 | \ |
| 0 | 2 | \ |
| 0 | 3 | \ |

Embodiment 15

The supported densities are: 1, 2 PRACH/10 ms; the number of versions is determined using method A3, R=3; and the version number is allocated using method B2; and the configuration result is as shown in the following Table 15.

TABLE 15

| Preamble format | Density (D) | Version number (r) |
|---|---|---|
| 0 | 1 | \ |
| 0 | 2 | |

Embodiment 16

The supported densities are: 1, 2, 3, 5, 10 PRACH/10 ms; the number of versions is determined using method A3, R=3; and the version number is allocated using method B2; and the configuration result is as shown in the following Table 16.

TABLE 16

| Preamble format | Density (D) | Version number (r) |
|---|---|---|
| 0 | 1 | \ |
| 0 | 2 | \ |
| 0 | 3 | \ |
| 0 | 5 | \ |
| 0 | 10 | \ |

Embodiment 17

The supported densities are: 1, 2, 3, 5 PRACH/10 ms; the number of versions is determined using method A3, R=3; and the version number is allocated using method B2; and the configuration result is as shown in the following Table 17.

TABLE 17

| Preamble format | Density (D) | Version number (r) |
|---|---|---|
| 0 | 1 | \ |
| 0 | 2 | \ |
| 0 | 3 | \ |
| 0 | 5 | \ |

Embodiment 18

The supported densities are: 0.5, 1, 2, 3, 4, 5, 6, 10 PRACH/10 ms; the number of versions is determined using method A5; and the version number is allocated using method B1; and the configuration result is as shown in the following Table 18.

TABLE 18

| Preamble format | Density (D) | Version number (r) |
|---|---|---|
| 0 | 0.5 | 0 |
| 0 | 0.5 | 1 |
| 0 | 0.5 | 2 |
| 0 | 1 | 0 |
| 0 | 1 | 1 |
| 0 | 1 | 2 |
| 0 | 2 | 0 |
| 0 | 2 | 1 |
| 0 | 2 | 2 |
| 0 | 3 | 0 |
| 0 | 3 | 1 |
| 0 | 3 | 2 |
| 0 | 4 | 0 |
| 0 | 4 | 1 |
| 0 | 4 | 2 |
| 0 | 5 | 0 |
| 0 | 5 | 1 |
| 0 | 5 | 2 |
| 0 | 6 | 0 |
| 0 | 6 | 1 |
| 0 | 10 | 0 |
| 0 | 10 | 1 |
| 0 | 10 | 2 |

Embodiment 19

The supported densities are: 0.5, 1, 2, 3, 4, 5, 6 PRACH/10 ms; the number of versions is determined using method A5; and the version number is allocated using method B1; and the configuration result is as shown in the following Table 19.

TABLE 19

| Preamble format | Density (D) | Version number (r) |
|---|---|---|
| 0 | 0.5 | 0 |
| 0 | 0.5 | 1 |
| 0 | 0.5 | 2 |
| 0 | 1 | 0 |
| 0 | 1 | 1 |
| 0 | 1 | 2 |
| 0 | 2 | 0 |
| 0 | 2 | 1 |
| 0 | 2 | 2 |
| 0 | 3 | 0 |
| 0 | 3 | 1 |
| 0 | 3 | 2 |
| 0 | 4 | 0 |
| 0 | 4 | 1 |
| 0 | 4 | 2 |
| 0 | 5 | 0 |
| 0 | 5 | 1 |
| 0 | 5 | 2 |
| 0 | 6 | 0 |
| 0 | 6 | 1 |

Embodiment 20

The supported densities are: 0.5, 1, 2, 4, 6, 10 PRACH/10 ms; the number of versions is determined using method A6; and the version number is allocated using method B1; and the configuration result is as shown in the following Table 20.

TABLE 20

| Preamble format | Density (D) | Version number (r) |
|---|---|---|
| 0 | 0.5 | 0 |
| 0 | 0.5 | 1 |
| 0 | 0.5 | 2 |
| 0 | 1 | 0 |
| 0 | 1 | 1 |
| 0 | 1 | 2 |
| 0 | 2 | 0 |
| 0 | 2 | 1 |
| 0 | 2 | 2 |
| 0 | 4 | 0 |
| 0 | 4 | 1 |
| 0 | 4 | 2 |
| 0 | 6 | 0 |
| 0 | 6 | 1 |
| 0 | 6 | 2 |
| 0 | 10 | 0 |
| 0 | 10 | 1 |
| 0 | 10 | 2 |

Embodiments for configuration sets of preamble format 1

Embodiment 1

The supported densities are: 0.5, 1, 2, 3, 5 PRACH/10 ms; the number of versions is determined using method A1 (the base station manages three cells); and the version number is allocated using method B1; and the configuration result is as shown in the following Table 21.

TABLE 21

| Preamble format | Density (D) | Version number (r) |
|---|---|---|
| 1 | 0.5 | 0 |
| 1 | 0.5 | 1 |

TABLE 21-continued

| Preamble format | Density (D) | Version number (r) |
|---|---|---|
| 1 | 0.5 | 2 |
| 1 | 1 | 0 |
| 1 | 1 | 1 |
| 1 | 2 | 0 |
| 1 | 3 | 0 |
| 1 | 3 | 1 |
| 1 | 5 | 0 |
| 1 | 5 | 1 |

Embodiment 2

The supported densities are: 0.5, 1, 2, 3 PRACH/10 ms; the number of versions is determined using method A1 (the base station manages three cells); and the version number is allocated using method B1; and the configuration result is as shown in the following Table 22.

TABLE 22

| Preamble format | Density (D) | Version number (r) |
|---|---|---|
| 1 | 0.5 | 0 |
| 1 | 0.5 | 1 |
| 1 | 0.5 | 2 |
| 1 | 1 | 0 |
| 1 | 1 | 1 |
| 1 | 2 | 0 |
| 1 | 3 | 0 |
| 1 | 3 | 1 |

Embodiment 3

The supported densities are: 0.5, 1, 2 PRACH/10 ms; the number of versions is determined using method A1 (the base station manages three cells); and the version number is allocated using method B1; and the configuration result is as shown in the following Table 23.

TABLE 23

| Preamble format | Density (D) | Version number (r) |
|---|---|---|
| 1 | 0.5 | 0 |
| 1 | 0.5 | 1 |
| 1 | 0.5 | 2 |
| 1 | 1 | 0 |
| 1 | 1 | 1 |
| 1 | 2 | 0 |

Embodiment 4

The supported densities are: 1, 2 PRACH/10 ms; the number of versions is determined using method A1 (the base station manages three cells); and the version number is allocated using method B1; and the configuration result is as shown in the following Table 24.

TABLE 24

| Preamble format | Density (D) | Version number (r) |
|---|---|---|
| 1 | 1 | 0 |
| 1 | 1 | 1 |
| 1 | 2 | 0 |

Embodiment 5

The supported densities are: 1, 2, 3, 5 PRACH/10 ms; the number of versions is determined using method A1 (the base station manages three cells); and the version number is allocated using method B1; and the configuration result is as shown in the following Table 25.

TABLE 25

| Preamble format | Density (D) | Version number (r) |
|---|---|---|
| 1 | 1 | 0 |
| 1 | 1 | 1 |
| 1 | 2 | 0 |
| 1 | 3 | 0 |
| 1 | 3 | 1 |
| 1 | 5 | 0 |
| 1 | 5 | 1 |

Embodiment 6

The supported densities are: 1, 2, 3 PRACH/10 ms; the number of versions is determined using method A1 (the base station manages three cells); and the version number is allocated using method B1; and the configuration result is as shown in the following Table 26.

TABLE 26

| Preamble format | Density (D) | Version number (r) |
|---|---|---|
| 1 | 1 | 0 |
| 1 | 1 | 1 |
| 1 | 2 | 0 |
| 1 | 3 | 0 |
| 1 | 3 | 1 |

Embodiment 7

The supported densities are: 0.5, 1 PRACH/10 ms; the number of versions is determined using method A1 (the base station manages three cells); and the version number is allocated using method B1; and the configuration result is as shown in the following Table 27.

TABLE 27

| Preamble format | Density (D) | Version number (r) |
|---|---|---|
| 1 | 0.5 | 0 |
| 1 | 0.5 | 1 |
| 1 | 0.5 | 2 |
| 1 | 1 | 0 |
| 1 | 1 | 1 |

Embodiment 8

The supported densities are: 0.5, 1, 2, 3, 5 PRACH/10 ms; the number of versions is determined using method A1 (the base station manages four cells); and the version number is allocated using method B1; and the configuration result is as shown in the following Table 28.

TABLE 28

| Preamble format | Density (D) | Version number (r) |
|---|---|---|
| 1 | 0.5 | 0 |
| 1 | 0.5 | 1 |
| 1 | 0.5 | 2 |
| 1 | 0.5 | 3 |
| 1 | 1 | 0 |
| 1 | 1 | 1 |
| 1 | 2 | 0 |
| 1 | 3 | 0 |
| 1 | 3 | 1 |
| 1 | 5 | 0 |
| 1 | 5 | 1 |

Embodiment 9

The supported densities are: 0.5, 1, 2, 3 PRACH/10 ms; the number of versions is determined using method A1 (the base station manages four cells); and the version number is allocated using method B1; and the configuration result is as shown in the following Table 29.

TABLE 29

| Preamble format | Density (D) | Version number (r) |
|---|---|---|
| 1 | 0.5 | 0 |
| 1 | 0.5 | 1 |
| 1 | 0.5 | 2 |
| 1 | 0.5 | 3 |
| 1 | 1 | 0 |
| 1 | 1 | 1 |
| 1 | 2 | 0 |
| 1 | 3 | 0 |
| 1 | 3 | 1 |

Embodiment 10

The supported densities are: 0.5, 1, 2 PRACH/10 ms; the number of versions is determined using method A1 (the base station manages four cells); and the version number is allocated using method B1; and the configuration result is as shown in the following Table 30.

TABLE 30

| Preamble format | Density (D) | Version number (r) |
|---|---|---|
| 1 | 0.5 | 0 |
| 1 | 0.5 | 1 |
| 1 | 0.5 | 2 |
| 1 | 0.5 | 3 |
| 1 | 1 | 0 |
| 1 | 1 | 1 |
| 1 | 2 | 0 |

Embodiment 11

The supported densities are: 0.5, 1 PRACH/10 ms; the number of versions is determined using method A1 (the base station manages four cells); and the version number is allocated using method B1; and the configuration result is as shown in the following Table 31.

TABLE 31

| Preamble format | Density (D) | Version number (r) |
|---|---|---|
| 1 | 0.5 | 0 |
| 1 | 0.5 | 1 |
| 1 | 0.5 | 2 |
| 1 | 0.5 | 3 |
| 1 | 1 | 0 |
| 1 | 1 | 1 |

Embodiment 12

The supported densities are: 0.5, 1, 2, 3, 5 PRACH/10 ms; the number of versions is determined using method A3 (the base station manages three cells); and the version number is allocated using method B1; and the configuration result is as shown in the following Table 32.

TABLE 32

| Preamble format | Density (D) | Version number (r) |
|---|---|---|
| 1 | 0.5 | 0 |
| 1 | 0.5 | 1 |
| 1 | 0.5 | 2 |
| 1 | 1 | 0 |
| 1 | 1 | 1 |
| 1 | 1 | 2 |
| 1 | 2 | 0 |
| 1 | 2 | 1 |
| 1 | 2 | 2 |
| 1 | 3 | 0 |
| 1 | 3 | 1 |
| 1 | 3 | 2 |
| 1 | 5 | 0 |
| 1 | 5 | 1 |
| 1 | 5 | 2 |

Embodiment 13

The supported densities are: 0.5, 1, 2, 3 PRACH/10 ms; the number of versions is determined using method A3 (the base station manages three cells); and the version number is allocated using method B1; and the configuration result is as shown in the following Table 33.

TABLE 33

| Preamble format | Density (D) | Version number (r) |
|---|---|---|
| 1 | 0.5 | 0 |
| 1 | 0.5 | 1 |
| 1 | 0.5 | 2 |
| 1 | 1 | 0 |
| 1 | 1 | 1 |
| 1 | 1 | 2 |
| 1 | 2 | 0 |
| 1 | 2 | 1 |
| 1 | 2 | 2 |
| 1 | 3 | 0 |
| 1 | 3 | 1 |
| 1 | 3 | 2 |

Embodiment 14

The supported densities are: 0.5, 1, 2 PRACH/10 ms; the number of versions is determined using method A3 (the base station manages three cells); and the version number is allocated using method B1; and the configuration result is as shown in the following Table 34.

TABLE 34

| Preamble format | Density (D) | Version number (r) |
|---|---|---|
| 1 | 0.5 | 0 |
| 1 | 0.5 | 1 |
| 1 | 0.5 | 2 |
| 1 | 1 | 0 |
| 1 | 1 | 1 |
| 1 | 1 | 2 |
| 1 | 2 | 0 |
| 1 | 2 | 1 |
| 1 | 2 | 2 |

Embodiment 15

The supported densities are: 1, 2 PRACH/10 ms; the number of versions is determined using method A3 (the base station manages three cells); and the version number is allocated using method B1; and the configuration result is as shown in the following Table 35.

TABLE 35

| Preamble format | Density (D) | Version number (r) |
|---|---|---|
| 1 | 1 | 0 |
| 1 | 1 | 1 |
| 1 | 1 | 2 |
| 1 | 2 | 0 |
| 1 | 2 | 1 |
| 1 | 2 | 2 |

Embodiment 16

The supported densities are: 1, 2, 3, 5 PRACH/10 ms; the number of versions is determined using method A3 (the base station manages three cells); and the version number is allocated using method B1; and the configuration result is as shown in the following Table 36.

TABLE 36

| Preamble format | Density (D) | Version number (r) |
|---|---|---|
| 1 | 1 | 0 |
| 1 | 1 | 1 |
| 1 | 1 | 2 |
| 1 | 2 | 0 |
| 1 | 2 | 1 |

TABLE 36-continued

| Preamble format | Density (D) | Version number (r) |
|---|---|---|
| 1 | 2 | 2 |
| 1 | 3 | 0 |
| 1 | 3 | 1 |
| 1 | 3 | 2 |
| 1 | 5 | 0 |
| 1 | 5 | 1 |
| 1 | 5 | 2 |

Embodiment 17

The supported densities are: 1, 2, 3 PRACH/10 ms; the number of versions is determined using method A3 (the base station manages three cells); and the version number is allocated using method B1; and the configuration result is as shown in the following Table 37.

TABLE 37

| Preamble format | Density (D) | Version number (r) |
|---|---|---|
| 1 | 1 | 0 |
| 1 | 1 | 1 |
| 1 | 1 | 2 |
| 1 | 2 | 0 |
| 1 | 2 | 1 |
| 1 | 2 | 2 |
| 1 | 3 | 0 |
| 1 | 3 | 1 |
| 1 | 3 | 2 |

Embodiment 18

The supported densities are: 0.5, 1 PRACH/10 ms; the number of versions is determined using method A3 (the base station manages three cells); and the version number is allocated using method B1; and the configuration result is as shown in the following Table 38.

TABLE 38

| Preamble format | Density (D) | Version number (r) |
|---|---|---|
| 1 | 0.5 | 0 |
| 1 | 0.5 | 1 |
| 1 | 0.5 | 2 |
| 1 | 1 | 0 |
| 1 | 1 | 1 |
| 1 | 1 | 2 |

Embodiment 19

The supported densities are: 0.5, 1, 2, 3, 5 PRACH/10 ms; the number of versions is determined using method A3, R=3; and the version number is allocated using method B2; and the configuration result is as shown in the following Table 39.

TABLE 39

| Preamble format | Density (D) | Version number (r) |
|---|---|---|
| 1 | 0.5 | \ |
| 1 | 1 | \ |

TABLE 39-continued

| Preamble format | Density (D) | Version number (r) |
|---|---|---|
| 1 | 2 | \ |
| 1 | 3 | \ |
| 1 | 5 | \ |

Embodiment 20

The supported densities are: 0.5, 1, 2, 3 PRACH/10 ms; the number of versions is determined using method A3, R=3; and the version number is allocated using method B2; and the configuration result is as shown in the following Table 40.

TABLE 40

| Preamble format | Density (D) | Version number (r) |
|---|---|---|
| 1 | 0.5 | \ |
| 1 | 1 | \ |
| 1 | 2 | \ |
| 1 | 3 | \ |

Embodiment 21

The supported densities are: 0.5, 1, 2 PRACH/10 ms; the number of versions is determined using method A3, R=3; and the version number is allocated using method B2; and the configuration result is as shown in the following Table 41.

TABLE 41

| Preamble format | Density (D) | Version number (r) |
|---|---|---|
| 1 | 0.5 | \ |
| 1 | 1 | \ |
| 1 | 2 | \ |

Embodiment 22

The supported densities are: 1, 2 PRACH/10 ms; the number of versions is determined using method A3, R=3; and the version number is allocated using method B2; and the configuration result is as shown in the following Table 42.

TABLE 42

| Preamble format | Density (D) | Version number (r) |
|---|---|---|
| 1 | 1 | \ |
| 1 | 2 | \ |

Embodiment 23

The supported densities are: 1, 2, 3, 5 PRACH/10 ms; the number of versions is determined using method A3, R=3; and the version number is allocated using method B2; and the configuration result is as shown in the following Table 43.

TABLE 43

| Preamble format | Density (D) | Version number (r) |
|---|---|---|
| 1 | 1 | \ |
| 1 | 2 | \ |
| 1 | 3 | \ |
| 1 | 5 | \ |

Embodiment 24

The supported densities are: 1, 2, 3 PRACH/10 ms; the number of versions is determined using method A3, R=3; and the version number is allocated using method B2; and the configuration result is as shown in the following Table 44.

TABLE 44

| Preamble format | Density (D) | Version number (r) |
|---|---|---|
| 1 | 1 | \ |
| 1 | 2 | \ |
| 1 | 3 | \ |

Embodiment 25

The supported densities are: 0.5, 1 PRACH/10 ms; the number of versions is determined using method A3, R=3; and the version number is allocated using method B2; and the configuration result is as shown in the following Table 45.

TABLE 45

| Preamble format | Density (D) | Version number (r) |
|---|---|---|
| 1 | 0.5 | \ |
| 1 | 1 | \ |

Embodiment 26

The supported densities are: 0.5, 1, 2, 3, 4, 5, 6 PRACH/10 ms; the number of versions is determined using method A5; and the version number is allocated using method B1; and the configuration result is as shown in the following Table 46.

TABLE 46

| Preamble format | Density (D) | Version number (r) |
|---|---|---|
| 1 | 0.5 | 0 |
| 1 | 0.5 | 1 |
| 1 | 0.5 | 2 |
| 1 | 1 | 0 |
| 1 | 1 | 1 |
| 1 | 2 | 0 |
| 1 | 3 | 0 |
| 1 | 4 | 0 |
| 1 | 5 | 0 |
| 1 | 6 | 1 |

Embodiment 27

The supported densities are: 0.5, 1, 2, 4, 6 PRACH/10 ms; the number of versions is determined using method A6; and the version number is allocated using method B1; and the configuration result is as shown in the following Table 47.

TABLE 47

| Preamble format | Density (D) | Version number (r) |
|---|---|---|
| 1 | 0.5 | 0 |
| 1 | 0.5 | 1 |
| 1 | 0.5 | 2 |
| 1 | 1 | 0 |
| 1 | 1 | 1 |
| 1 | 2 | 0 |
| 1 | 4 | 0 |
| 1 | 6 | 0 |

Embodiments for Configuration Sets of Preamble Format 2

Embodiment 1

The supported densities are: 0.5, 1, 2, 3, 5 PRACH/10 ms; the number of versions is determined using method A1 (the base station manages three cells); and the version number is allocated using method B1; and the configuration result is as shown in the following Table 48.

TABLE 48

| Preamble format | Density per 10 ms (D) | Version number (r) |
|---|---|---|
| 2 | 0.5 | 0 |
| 2 | 0.5 | 1 |
| 2 | 0.5 | 2 |
| 2 | 1 | 0 |
| 2 | 1 | 1 |
| 2 | 2 | 0 |
| 2 | 3 | 0 |
| 2 | 3 | 1 |
| 2 | 5 | 0 |
| 2 | 5 | 1 |

Embodiment 2

The supported densities are: 0.5, 1, 2, 3 PRACH/10 ms; the number of versions is determined using method A1 (the base station manages three cells); and the version number is allocated using method B1; and the configuration result is as shown in the following Table 49.

TABLE 49

| Preamble format | Density (D) | Version number (r) |
|---|---|---|
| 2 | 0.5 | 0 |
| 2 | 0.5 | 1 |
| 2 | 0.5 | 2 |
| 2 | 1 | 0 |
| 2 | 1 | 1 |
| 2 | 2 | 0 |
| 2 | 3 | 0 |
| 2 | 3 | 1 |

Embodiment 3

The supported densities are: 0.5, 1, 2 PRACH/10 ms; the number of versions is determined using method A1 (the base station manages three cells); and the version number is allocated using method B1; and the configuration result is as shown in the following Table 50.

TABLE 50

| Preamble format | Density (D) | Version number (r) |
|---|---|---|
| 2 | 0.5 | 0 |
| 2 | 0.5 | 1 |
| 2 | 0.5 | 2 |
| 2 | 1 | 0 |
| 2 | 1 | 1 |
| 2 | 2 | 0 |

Embodiment 4

The supported densities are: 1, 2 PRACH/10 ms; the number of versions is determined using method A1 (the base station manages three cells); and the version number is allocated using method B1; and the configuration result is as shown in the following Table 51.

TABLE 51

| Preamble format | Density (D) | Version number (r) |
|---|---|---|
| 2 | 1 | 0 |
| 2 | 1 | 1 |
| 2 | 2 | 0 |

Embodiment 5

The supported densities are: 1, 2, 3, 5 PRACH/10 ms; the number of versions is determined using method A1 (the base station manages three cells); and the version number is allocated using method B1; and the configuration result is as shown in the following Table 52.

TABLE 52

| Preamble format | Density (D) | Version number (r) |
|---|---|---|
| 2 | 1 | 0 |
| 2 | 1 | 1 |
| 2 | 2 | 0 |
| 2 | 3 | 0 |
| 2 | 3 | 1 |
| 2 | 5 | 0 |
| 2 | 5 | 1 |

Embodiment 6

The supported densities are: 1, 2, 3 PRACH/10 ms; the number of versions is determined using method A1 (the base station manages three cells); and the version number is allocated using method B1; and the configuration result is as shown in the following Table 53.

TABLE 53

| Preamble format | Density (D) | Version number (r) |
|---|---|---|
| 2 | 1 | 0 |
| 2 | 1 | 1 |
| 2 | 2 | 0 |

TABLE 53-continued

| Preamble format | Density (D) | Version number (r) |
|---|---|---|
| 2 | 3 | 0 |
| 2 | 3 | 1 |

Embodiment 7

The supported densities are: 0.5, 1 PRACH/10 ms; the number of versions is determined using method A1 (the base station manages three cells); and the version number is allocated using method B1; and the configuration result is as shown in the following Table 54.

TABLE 54

| Preamble format | Density per 10 ms (D) | Version number (r) |
|---|---|---|
| 2 | 0.5 | 0 |
| 2 | 0.5 | 1 |
| 2 | 0.5 | 2 |
| 2 | 1 | 0 |
| 2 | 1 | 1 |

Embodiment 8

The supported densities are: 0.5, 1, 2, 3, 5 PRACH/10 ms; the number of versions is determined using method A1 (the base station manages four cells); and the version number is allocated using method B1; and the configuration result is as shown in the following Table 55.

TABLE 55

| Preamble format | Density per 10 ms (D) | Version number (r) |
|---|---|---|
| 2 | 0.5 | 0 |
| 2 | 0.5 | 1 |
| 2 | 0.5 | 2 |
| 2 | 0.5 | 3 |
| 2 | 1 | 0 |
| 2 | 1 | 1 |
| 2 | 2 | 0 |
| 2 | 3 | 0 |
| 2 | 3 | 1 |
| 2 | 5 | 0 |
| 2 | 5 | 1 |

Embodiment 9

The supported densities are: 0.5, 1, 2, 3 PRACH/10 ms; the number of versions is determined using method A1 (the base station manages four cells); and the version number is allocated using method B1; and the configuration result is as shown in the following Table 56.

TABLE 56

| Preamble format | Density (D) | Version number (r) |
|---|---|---|
| 2 | 0.5 | 0 |
| 2 | 0.5 | 1 |
| 2 | 0.5 | 2 |
| 2 | 0.5 | 3 |

TABLE 56-continued

| Preamble format | Density (D) | Version number (r) |
|---|---|---|
| 2 | 1 | 0 |
| 2 | 1 | 1 |
| 2 | 2 | 0 |
| 2 | 3 | 0 |
| 2 | 3 | 1 |

Embodiment 10

The supported densities are: 0.5, 1, 2 PRACH/10 ms; the number of versions is determined using method A1 (the base station manages four cells); and the version number is allocated using method B1; and the configuration result is as shown in the following Table 57.

TABLE 57

| Preamble format | Density per 10 ms (D) | Version number (r) |
|---|---|---|
| 2 | 0.5 | 0 |
| 2 | 0.5 | 1 |
| 2 | 0.5 | 2 |
| 2 | 0.5 | 3 |
| 2 | 1 | 0 |
| 2 | 1 | 1 |
| 2 | 2 | 0 |

Embodiment 11

The supported densities are: 0.5, 1 PRACH/10 ms; the number of versions is determined using method A1 (the base station manages four cells); and the version number is allocated using method B1; and the configuration result is as shown in the following Table 58.

TABLE 58

| Preamble format | Density (D) | Version number (r) |
|---|---|---|
| 2 | 0.5 | 0 |
| 2 | 0.5 | 1 |
| 2 | 0.5 | 2 |
| 2 | 0.5 | 3 |
| 2 | 1 | 0 |
| 2 | 1 | 1 |

Embodiment 12

The supported densities are: 0.5, 1, 2, 3, 5 PRACH/10 ms; the number of versions is determined using method A3 (the base station manages three cells); and the version number is allocated using method B1; and the configuration result is as shown in the following Table 59.

TABLE 59

| Preamble format | Density (D) | Version number (r) |
|---|---|---|
| 2 | 0.5 | 0 |
| 2 | 0.5 | 1 |
| 2 | 0.5 | 2 |
| 2 | 1 | 0 |

TABLE 59-continued

| Preamble format | Density (D) | Version number (r) |
|---|---|---|
| 2 | 1 | 1 |
| 2 | 1 | 2 |
| 2 | 2 | 0 |
| 2 | 2 | 1 |
| 2 | 2 | 2 |
| 2 | 3 | 0 |
| 2 | 3 | 1 |
| 2 | 3 | 2 |
| 2 | 5 | 0 |
| 2 | 5 | 1 |
| 2 | 5 | 2 |

Embodiment 13

The supported densities are: 0.5, 1, 2, 3 PRACH/10 ms; the number of versions is determined using method A3 (the base station manages three cells); and the version number is allocated using method B1; and the configuration result is as shown in the following Table 60.

TABLE 60

| Preamble format | Density (D) | Version number (r) |
|---|---|---|
| 2 | 0.5 | 0 |
| 2 | 0.5 | 1 |
| 2 | 0.5 | 2 |
| 2 | 1 | 0 |
| 2 | 1 | 1 |
| 2 | 1 | 2 |
| 2 | 2 | 0 |
| 2 | 2 | 1 |
| 2 | 2 | 2 |
| 2 | 3 | 0 |
| 2 | 3 | 1 |
| 2 | 3 | 2 |

Embodiment 14

The supported densities are: 0.5, 1, 2 PRACH/10 ms; the number of versions is determined using method A3 (the base station manages three cells); and the version number is allocated using method B1; and the configuration result is as shown in the following Table 61.

TABLE 61

| Preamble format | Density (D) | Version number (r) |
|---|---|---|
| 2 | 0.5 | 0 |
| 2 | 0.5 | 1 |
| 2 | 0.5 | 2 |
| 2 | 1 | 0 |
| 2 | 1 | 1 |
| 2 | 1 | 2 |
| 2 | 2 | 0 |
| 2 | 2 | 1 |
| 2 | 2 | 2 |

Embodiment 15

The supported densities are: 1, 2 PRACH/10 ms; the number of versions is determined using method A3 (the base station manages three cells); and the version number is allocated using method B1; and the configuration result is as shown in the following Table 62.

TABLE 62

| Preamble format | Density (D) | Version number (r) |
|---|---|---|
| 2 | 1 | 0 |
| 2 | 1 | 1 |
| 2 | 1 | 2 |
| 2 | 2 | 0 |
| 2 | 2 | 1 |
| 2 | 2 | 2 |

Embodiment 16

The supported densities are: 1, 2, 3, 5 PRACH/10 ms; the number of versions is determined using method A3 (the base station manages three cells); and the version number is allocated using method B1; and the configuration result is as shown in the following Table 63.

TABLE 63

| Preamble format | Density (D) | Version number (r) |
|---|---|---|
| 2 | 1 | 0 |
| 2 | 1 | 1 |
| 2 | 1 | 2 |
| 2 | 2 | 0 |
| 2 | 2 | 1 |
| 2 | 2 | 2 |
| 2 | 3 | 0 |
| 2 | 3 | 1 |
| 2 | 3 | 2 |
| 2 | 5 | 0 |
| 2 | 5 | 1 |
| 2 | 5 | 2 |

Embodiment 17

The supported densities are: 1, 2, 3 PRACH/10 ms; the number of versions is determined using method A3 (the base station manages three cells); and the version number is allocated using method B1; and the configuration result is as shown in the following Table 64.

TABLE 64

| Preamble format | Density (D) | Version number (r) |
|---|---|---|
| 2 | 1 | 0 |
| 2 | 1 | 1 |
| 2 | 1 | 2 |
| 2 | 2 | 0 |
| 2 | 2 | 1 |
| 2 | 2 | 2 |
| 2 | 3 | 0 |
| 2 | 3 | 1 |
| 2 | 3 | 2 |

Embodiment 18

The supported densities are: 0.5, 1 PRACH/10 ms; the number of versions is determined using method A3 (the base station manages three cells); and the version number is allocated using method B1; and the configuration result is as shown in the following Table 65.

TABLE 65

| Preamble format | Density (D) | Version number (r) |
|---|---|---|
| 2 | 0.5 | 0 |
| 2 | 0.5 | 1 |
| 2 | 0.5 | 2 |
| 2 | 1 | 0 |
| 2 | 1 | 1 |
| 2 | 1 | 2 |

Embodiment 19

The supported densities are: 0.5, 1, 2, 3, 5 PRACH/10 ms; the number of versions is determined using method A3, R=3; and the version number is allocated using method B2; and the configuration result is as shown in the following Table 66.

TABLE 66

| Preamble format | Density (D) | Version number (r) |
|---|---|---|
| 2 | 0.5 | \ |
| 2 | 1 | \ |
| 2 | 2 | \ |
| 2 | 3 | \ |
| 2 | 5 | \ |

Embodiment 20

The supported densities are: 0.5, 1, 2, 3 PRACH/10 ms; the number of versions is determined using method A3, R=3; and the version number is allocated using method B2; and the configuration result is as shown in the following Table 67.

TABLE 67

| Preamble format | Density (D) | Version number (r) |
|---|---|---|
| 2 | 0.5 | \ |
| 2 | 1 | \ |
| 2 | 2 | \ |
| 2 | 3 | \ |

Embodiment 21

The supported densities are: 0.5, 1, 2 PRACH/10 ms; the number of versions is determined using method A3, R=3; and the version number is allocated using method B2; and the configuration result is as shown in the following Table 68.

TABLE 68

| Preamble format | Density (D) | Version number (r) |
|---|---|---|
| 2 | 0.5 | \ |
| 2 | 1 | \ |
| 2 | 2 | \ |

Embodiment 22

The supported densities are: 1, 2 PRACH/10 ms; the number of versions is determined using method A3, R=3; and the version number is allocated using method B2; and the configuration result is as shown in the following Table 69.

TABLE 69

| Preamble format | Density (D) | Version number (r) |
|---|---|---|
| 2 | 1 | \ |
| 2 | 2 | \ |

Embodiment 23

The supported densities are: 1, 2, 3, 5 PRACH/10 ms; the number of versions is determined using method A3, R=3; and the version number is allocated using method B2; and the configuration result is as shown in the following Table 70.

TABLE 70

| Preamble format | Density (D) | Version number (r) |
|---|---|---|
| 2 | 1 | \ |
| 2 | 2 | \ |
| 2 | 3 | \ |
| 2 | 5 | \ |

Embodiment 24

The supported densities are: 1, 2, 3 PRACH/10 ms; the number of versions is determined using method A3, R=3; and the version number is allocated using method B2; and the configuration result is as shown in the following Table 71.

TABLE 71

| Preamble format | Density (D) | Version number (r) |
|---|---|---|
| 2 | 1 | \ |
| 2 | 2 | \ |
| 2 | 3 | \ |

Embodiment 25

The supported densities are: 0.5, 1 PRACH/10 ms; the number of versions is determined using method A3, R=3; and the version number is allocated using method B2; and the configuration result is as shown in the following Table 72.

TABLE 72

| Preamble format | Density (D) | Version number (r) |
|---|---|---|
| 2 | 0.5 | \ |
| 2 | 1 | \ |

Embodiment 26

The supported densities are: 0.5, 1, 2, 3, 4, 5, 6 PRACH/10 ms; the number of versions is determined using method A5; and the version number is allocated using method B2; and the configuration result is as shown in the following Table 73.

TABLE 73

| Preamble format | Density (D) | Version number (r) |
|---|---|---|
| 2 | 0.5 | 0 |
| 2 | 0.5 | 1 |
| 2 | 0.5 | 2 |
| 2 | 1 | 0 |
| 2 | 1 | 1 |
| 2 | 2 | 0 |
| 2 | 3 | 0 |
| 2 | 4 | 0 |
| 2 | 5 | 0 |
| 2 | 6 | 1 |

Embodiment 27

The supported densities are: 0.5, 1, 2, 4, 6 PRACH/10 ms; the number of versions is determined using method A6; and the version number is allocated using method B1; and the configuration result is as shown in the following Table 74.

TABLE 74

| Preamble format | Density (D) | Version number (r) |
|---|---|---|
| 2 | 0.5 | 0 |
| 2 | 0.5 | 1 |
| 2 | 0.5 | 2 |
| 2 | 1 | 0 |
| 2 | 1 | 1 |
| 2 | 2 | 0 |
| 2 | 4 | 0 |
| 2 | 6 | 0 |

Embodiments for Configuration Sets of Preamble Format 3

Embodiment 1

The supported densities are: 0.5, 1, 2, 3 PRACH/10 ms; the number of versions is determined using method A1 (the base station manages three cells); and the version number is allocated using method B1; and the configuration result is as shown in the following Table 75.

TABLE 75

| Preamble format | Density (D) | Version number (r) |
|---|---|---|
| 3 | 0.5 | 0 |
| 3 | 0.5 | 1 |
| 3 | 0.5 | 2 |
| 3 | 1 | 0 |
| 3 | 1 | 1 |
| 3 | 2 | 0 |
| 3 | 3 | 0 |
| 3 | 3 | 1 |
| 3 | 5 | 0 |
| 3 | 5 | 1 |

Embodiment 2

The supported densities are: 0.5, 1, 2, 3 PRACH/10 ms; the number of versions is determined using method A1 (the base station manages three cells); and the version number is allocated using method B1; and the configuration result is as shown in the following Table 76.

TABLE 76

| Preamble format | Density (D) | Version number (r) |
|---|---|---|
| 3 | 0.5 | 0 |
| 3 | 0.5 | 1 |
| 3 | 0.5 | 2 |
| 3 | 1 | 0 |
| 3 | 1 | 1 |
| 3 | 2 | 0 |
| 3 | 3 | 0 |
| 3 | 3 | 1 |

Embodiment 3

The supported densities are: 0.5, 1, 2 PRACH/10 ms; the number of versions is determined using method A1 (the base station manages three cells); and the version number is allocated using method B1; and the configuration result is as shown in the following Table 77.

TABLE 77

| Preamble format | Density (D) | Version number (r) |
|---|---|---|
| 3 | 0.5 | 0 |
| 3 | 0.5 | 1 |
| 3 | 0.5 | 2 |
| 3 | 1 | 0 |
| 3 | 1 | 1 |
| 3 | 2 | 0 |

Embodiment 4

The supported densities are: 0.5 PRACH/10 ms; the number of versions is determined using method A1 (the base station manages three cells); and the version number is allocated using method B1; and the configuration result is as shown in the following Table 78.

TABLE 78

| Preamble format | Density (D) | Version number (r) |
|---|---|---|
| 3 | 0.5 | 0 |
| 3 | 0.5 | 1 |
| 3 | 0.5 | 2 |

Embodiment 5

The supported densities are: 1, 2 PRACH/10 ms; the number of versions is determined using method A1 (the base station manages three cells); and the version number is allocated using method B1; and the configuration result is as shown in the following Table 79.

TABLE 79

| Preamble format | Density (D) | Version number (r) |
|---|---|---|
| 3 | 1 | 0 |
| 3 | 1 | 1 |
| 3 | 2 | 0 |

Embodiment 6

The supported densities are: 1 PRACH/10 ms; the number of versions is determined using method A1 (the base station manages three cells); and the version number is allocated using method B1; and the configuration result is as shown in the following Table 80.

TABLE 80

| Preamble format | Density (D) | Version number (r) |
|---|---|---|
| 3 | 1 | 0 |
| 3 | 1 | 1 |

Embodiment 7

The supported densities are: 1, 2, 3, 5 PRACH/10 ms; the number of versions is determined using method A1 (the base station manages three cells); and the version number is allocated using method B1; and the configuration result is as shown in the following Table 81.

TABLE 81

| Preamble format | Density (D) | Version number (r) |
|---|---|---|
| 3 | 1 | 0 |
| 3 | 1 | 1 |
| 3 | 2 | 0 |
| 3 | 3 | 0 |
| 3 | 3 | 1 |
| 3 | 5 | 0 |
| 3 | 5 | 1 |

Embodiment 8

The supported densities are: 1, 2, 3 PRACH/10 ms; the number of versions is determined using method A1 (the base station manages three cells); and the version number is allocated using method B1; and the configuration result is as shown in the following Table 82.

TABLE 82

| Preamble format | Density (D) | Version number (r) |
|---|---|---|
| 3 | 1 | 0 |
| 3 | 1 | 1 |
| 3 | 2 | 0 |
| 3 | 3 | 0 |
| 3 | 3 | 1 |

Embodiment 9

The supported densities are: 0.5, 1 PRACH/10 ms; the number of versions is determined using method A1 (the base station manages three cells); and the version number is allocated using method B1; and the configuration result is as shown in the following Table 83.

TABLE 83

| Preamble format | Density (D) | Version number (r) |
| --- | --- | --- |
| 3 | 0.5 | 0 |
| 3 | 0.5 | 1 |
| 3 | 0.5 | 2 |
| 3 | 1 | 0 |
| 3 | 1 | 1 |

Embodiment 10

The supported densities are: 0.5, 1, 2, 3, 5 PRACH/10 ms; the number of versions is determined using method A1 (the base station manages four cells); and the version number is allocated using method B1; and the configuration result is as shown in the following Table 84.

TABLE 84

| Preamble format | Density (D) | Version number (r) |
| --- | --- | --- |
| 3 | 0.5 | 0 |
| 3 | 0.5 | 1 |
| 3 | 0.5 | 2 |
| 3 | 0.5 | 3 |
| 3 | 1 | 0 |
| 3 | 1 | 1 |
| 3 | 2 | 0 |
| 3 | 3 | 0 |
| 3 | 3 | 1 |
| 3 | 5 | 0 |
| 3 | 5 | 1 |

Embodiment 11

The supported densities are: 0.5, 1, 2, 3 PRACH/10 ms; the number of versions is determined using method A1 (the base station manages four cells); and the version number is allocated using method B1; and the configuration result is as shown in the following Table 85.

TABLE 85

| Preamble format | Density (D) | Version number (r) |
| --- | --- | --- |
| 3 | 0.5 | 0 |
| 3 | 0.5 | 1 |
| 3 | 0.5 | 2 |
| 3 | 0.5 | 3 |
| 3 | 1 | 0 |
| 3 | 1 | 1 |
| 3 | 2 | 0 |
| 3 | 3 | 0 |
| 3 | 3 | 1 |

Embodiment 12

The supported densities are: 0.5, 1, 2 PRACH/10 ms; the number of versions is determined using method A1 (the base station manages four cells); and the version number is allocated using method B1; and the configuration result is as shown in the following Table 86.

TABLE 86

| Preamble format | Density (D) | Version number (r) |
| --- | --- | --- |
| 3 | 0.5 | 0 |
| 3 | 0.5 | 1 |
| 3 | 0.5 | 2 |
| 3 | 0.5 | 3 |
| 3 | 1 | 0 |
| 3 | 1 | 1 |
| 3 | 2 | 0 |

Embodiment 13

The supported densities are: 0.5, 1 PRACH/10 ms; the number of versions is determined using method A1 (the base station manages four cells); and the version number is allocated using method B1; and the configuration result is as shown in the following Table 87.

TABLE 87

| Preamble format | Density (D) | Version number (r) |
| --- | --- | --- |
| 3 | 0.5 | 0 |
| 3 | 0.5 | 1 |
| 3 | 0.5 | 2 |
| 3 | 0.5 | 3 |
| 3 | 1 | 0 |
| 3 | 1 | 1 |

Embodiment 14

The supported densities are: 0.5 PRACH/10 ms; the number of versions is determined using method A1 (the base station manages four cells); and the version number is allocated using method B1; and the configuration result is as shown in the following Table 88.

TABLE 88

| Preamble format | Density (D) | Version number (r) |
| --- | --- | --- |
| 3 | 0.5 | 0 |
| 3 | 0.5 | 1 |
| 3 | 0.5 | 2 |
| 3 | 0.5 | 3 |

Embodiment 15

The supported densities are: 0.5, 1, 2, 3, 5 PRACH/10 ms; the number of versions is determined using method A3 (the base station manages three cells); and the version number is allocated using method B1; and the configuration result is as shown in the following Table 89.

TABLE 89

| Preamble format | Density (D) | Version number (r) |
| --- | --- | --- |
| 3 | 0.5 | 0 |
| 3 | 0.5 | 1 |
| 3 | 0.5 | 2 |
| 3 | 1 | 0 |
| 3 | 1 | 1 |

TABLE 89-continued

| Preamble format | Density (D) | Version number (r) |
|---|---|---|
| 3 | 1 | 2 |
| 3 | 2 | 0 |
| 3 | 2 | 1 |
| 3 | 2 | 2 |
| 3 | 3 | 0 |
| 3 | 3 | 1 |
| 3 | 3 | 2 |
| 3 | 5 | 0 |
| 3 | 5 | 1 |
| 3 | 5 | 2 |

Embodiment 16

The supported densities are: 0.5, 1, 2, 3 PRACH/10 ms; the number of versions is determined using method A3 (the base station manages three cells); and the version number is allocated using method B1; and the configuration result is as shown in the following Table 90.

TABLE 90

| Preamble format | Density (D) | Version number (r) |
|---|---|---|
| 3 | 0.5 | 0 |
| 3 | 0.5 | 1 |
| 3 | 0.5 | 2 |
| 3 | 1 | 0 |
| 3 | 1 | 1 |
| 3 | 1 | 2 |
| 3 | 2 | 0 |
| 3 | 2 | 1 |
| 3 | 2 | 2 |
| 3 | 3 | 0 |
| 3 | 3 | 1 |
| 3 | 3 | 2 |

Embodiment 17

The supported densities are: 0.5, 1, 2 PRACH/10 ms; the number of versions is determined using method A3 (the base station manages three cells); and the version number is allocated using method B1; and the configuration result is as shown in the following Table 91.

TABLE 91

| Preamble format | Density (D) | Version number (r) |
|---|---|---|
| 3 | 0.5 | 0 |
| 3 | 0.5 | 1 |
| 3 | 0.5 | 2 |
| 3 | 1 | 0 |
| 3 | 1 | 1 |
| 3 | 1 | 2 |
| 3 | 2 | 0 |
| 3 | 2 | 1 |
| 3 | 2 | 2 |

Embodiment 18

The supported densities are: 1, 2 PRACH/10 ms; the number of versions is determined using method A3 (the base station manages three cells); and the version number is allocated using method B1; and the configuration result is as shown in the following Table 92.

TABLE 92

| Preamble format | Density (D) | Version number (r) |
|---|---|---|
| 3 | 1 | 0 |
| 3 | 1 | 1 |
| 3 | 1 | 2 |
| 3 | 2 | 0 |
| 3 | 2 | 1 |
| 3 | 2 | 2 |

Embodiment 19

The supported densities are: 1, 2, 3, 5 PRACH/10 ms; the number of versions is determined using method A3 (the base station manages three cells); and the version number is allocated using method B1; and the configuration result is as shown in the following Table 93.

TABLE 93

| Preamble format | Density (D) | Version number (r) |
|---|---|---|
| 3 | 1 | 0 |
| 3 | 1 | 1 |
| 3 | 1 | 2 |
| 3 | 2 | 0 |
| 3 | 2 | 1 |
| 3 | 2 | 2 |
| 3 | 3 | 0 |
| 3 | 3 | 1 |
| 3 | 3 | 2 |
| 3 | 5 | 0 |
| 3 | 5 | 1 |
| 3 | 5 | 2 |

Embodiment 20

The supported densities are: 1, 2, 3 PRACH/10 ms; the number of versions is determined using method A3 (the base station manages three cells); and the version number is allocated using method B1; and the configuration result is as shown in the following Table 94.

TABLE 94

| Preamble format | Density (D) | Version number (r) |
|---|---|---|
| 3 | 1 | 0 |
| 3 | 1 | 1 |
| 3 | 1 | 2 |
| 3 | 2 | 0 |
| 3 | 2 | 1 |
| 3 | 2 | 2 |
| 3 | 3 | 0 |
| 3 | 3 | 1 |
| 3 | 3 | 2 |

Embodiment 21

The supported densities are: 0.5, 1 PRACH/10 ms; the number of versions is determined using method A3 (the base station manages three cells); and the version number is allocated using method B1; and the configuration result is as shown in the following Table 95.

TABLE 95

| Preamble format | Density (D) | Version number (r) |
|---|---|---|
| 3 | 0.5 | 0 |
| 3 | 0.5 | 1 |
| 3 | 0.5 | 2 |
| 3 | 1 | 0 |
| 3 | 1 | 1 |
| 3 | 1 | 2 |

Embodiment 22

The supported densities are: 1 PRACH/10 ms; the number of versions is determined using method A3 (the base station manages three cells); and the version number is allocated using method B1; and the configuration result is as shown in the following Table 96.

TABLE 96

| Preamble format | Density (D) | Version number (r) |
|---|---|---|
| 3 | 1 | 0 |
| 3 | 1 | 1 |
| 3 | 1 | 2 |

Embodiment 23

The supported densities are: 0.5, 1, 2, 3, 5 PRACH/10 ms; the number of versions is determined using method A3, R=3; and the version number is allocated using method B2; and the configuration result is as shown in the following Table 97.

TABLE 97

| Preamble format | Density (D) | Version number (r) |
|---|---|---|
| 3 | 0.5 | \ |
| 3 | 1 | \ |
| 3 | 2 | \ |
| 3 | 3 | \ |
| 3 | 5 | \ |

Embodiment 24

The supported densities are: 0.5, 1, 2, 3 PRACH/10 ms; the number of versions is determined using method A3, R=3; and the version number is allocated using method B2; and the configuration result is as shown in the following Table 98.

TABLE 98

| Preamble format | Density (D) | Version number (r) |
|---|---|---|
| 3 | 0.5 | \ |
| 3 | 1 | \ |
| 3 | 2 | \ |
| 3 | 3 | \ |

Embodiment 25

The supported densities are: 0.5, 1, 2 PRACH/10 ms; the number of versions is determined using method A3, R=3; and the version number is allocated using method B2; and the configuration result is as shown in the following Table 99.

TABLE 99

| Preamble format | Density (D) | Version number (r) |
|---|---|---|
| 3 | 0.5 | \ |
| 3 | 1 | \ |
| 3 | 2 | \ |

Embodiment 26

The supported densities are: 1, 2 PRACH/10 ms; the number of versions is determined using method A3, R=3; and the version number is allocated using method B2; and the configuration result is as shown in the following Table 100.

TABLE 100

| Preamble format | Density (D) | Version number (r) |
|---|---|---|
| 3 | 1 | \ |
| 3 | 2 | \ |

Embodiment 27

The supported densities are: 1, 2, 3, 5 PRACH/10 ms; the number of versions is determined using method A3, R=3; and the version number is allocated using method B2; and the configuration result is as shown in the following Table 101.

TABLE 101

| Preamble format | Density (D) | Version number (r) |
|---|---|---|
| 3 | 1 | \ |
| 3 | 2 | \ |
| 3 | 3 | \ |
| 3 | 5 | \ |

Embodiment 28

The supported densities are: 1, 2, 3 PRACH/10 ms; the number of versions is determined using method A3, R=3; and the version number is allocated using method B2; and the configuration result is as shown in the following Table 102.

TABLE 102

| Preamble format | Density (D) | Version number (r) |
|---|---|---|
| 3 | 1 | \ |
| 3 | 2 | \ |
| 3 | 3 | \ |

Embodiment 29

The supported densities are: 0.5, 1 PRACH/10 ms; the number of versions is determined using method A3, R=3; and the version number is allocated using method B2; and the configuration result is as shown in the following Table 103.

TABLE 103

| Preamble format | Density (D) | Version number (r) |
|---|---|---|
| 3 | 0.5 | \ |
| 3 | 1 | \ |

Embodiment 30

The supported density is: 0.5 PRACH/10 ms; the number of versions is determined using method A3, R=3; and the version number is allocated using method B2; and the configuration result is as shown in the following Table 104.

TABLE 104

| Preamble format | Density (D) | Version number (r) |
|---|---|---|
| 3 | 0.5 | \ |

Embodiment 31

The supported density is: 1 PRACH/10 ms; the number of versions is determined using method A3, R=3; and the version number is allocated using method B2; and the configuration result is as shown in the following Table 105.

TABLE 105

| Preamble format | Density (D) | Version number (r) |
|---|---|---|
| 3 | 1 | \ |

Embodiment 32

The supported densities are: 0.5, 1, 2, 3, 4 PRACH/10 ms; the number of versions is determined using method A5; and the version number is allocated using method B1; and the configuration result is as shown in the following Table 106.

TABLE 106

| Preamble format | Density (D) | Version number (r) |
|---|---|---|
| 3 | 0.5 | 0 |
| 3 | 0.5 | 1 |
| 3 | 0.5 | 2 |
| 3 | 1 | 0 |
| 3 | 1 | 1 |
| 3 | 2 | 0 |
| 3 | 3 | 0 |
| 3 | 4 | 0 |

Embodiment 33

The supported densities are: 0.5, 1, 2, 4 PRACH/10 ms; the number of versions is determined using method A6; and the version number is allocated using method B1; and the configuration result is as shown in the following Table 107.

TABLE 107

| Preamble format | Density (D) | Version number (r) |
|---|---|---|
| 3 | 0.5 | 0 |
| 3 | 0.5 | 1 |
| 3 | 0.5 | 2 |
| 3 | 1 | 0 |
| 3 | 1 | 1 |
| 3 | 2 | 0 |
| 3 | 4 | 0 |

Embodiments for Configuration Sets of Preamble Format 4

Embodiment 1

The supported densities are: 0.5, 1, 2, 3, 5, 10 PRACH/10 ms; the number of versions is determined using method A1 (the base station manages three cells); and the version number is allocated using method B1; and the configuration result is as shown in the following Table 108.

TABLE 108

| Preamble format | Density (D) | Version number (r) |
|---|---|---|
| 4 | 0.5 | 0 |
| 4 | 0.5 | 1 |
| 4 | 0.5 | 2 |
| 4 | 1 | 0 |
| 4 | 1 | 1 |
| 4 | 2 | 0 |
| 4 | 3 | 0 |
| 4 | 3 | 1 |
| 4 | 5 | 0 |
| 4 | 5 | 1 |
| 4 | 10 | 0 |

Embodiment 2

The supported densities are: 0.5, 1, 2, 3, 5 PRACH/10 ms; the number of versions is determined using method A1 (the base station manages three cells); and the version number is allocated using method B1; and the configuration result is as shown in the following Table 109.

TABLE 109

| Preamble format | Density (D) | Version number (r) |
|---|---|---|
| 4 | 0.5 | 0 |
| 4 | 0.5 | 1 |
| 4 | 0.5 | 2 |
| 4 | 1 | 0 |
| 4 | 1 | 1 |
| 4 | 2 | 0 |
| 4 | 3 | 0 |
| 4 | 3 | 1 |
| 4 | 5 | 0 |
| 4 | 5 | 1 |

Embodiment 3

The supported densities are: 0.5, 1, 2, 3 PRACH/10 ms; the number of versions is determined using method A1 (the base station manages three cells); and the version number is allocated using method B1; and the configuration result is as shown in the following Table 110.

TABLE 110

| Preamble format | Density (D) | Version number (r) |
|---|---|---|
| 4 | 0.5 | 0 |
| 4 | 0.5 | 1 |
| 4 | 0.5 | 2 |
| 4 | 1 | 0 |
| 4 | 1 | 1 |
| 4 | 2 | 0 |
| 4 | 3 | 0 |
| 4 | 3 | 1 |

Embodiment 4

The supported densities are: 1, 2, 3 PRACH/10 ms; the number of versions is determined using method A1 (the base station manages three cells); and the version number is allocated using method B1; and the configuration result is as shown in the following Table 111.

TABLE 111

| Preamble format | Density (D) | Version number (r) |
|---|---|---|
| 4 | 1 | 0 |
| 4 | 1 | 1 |
| 4 | 2 | 0 |
| 4 | 3 | 0 |
| 4 | 3 | 1 |

Embodiment 5

The supported densities are: 1, 2 PRACH/10 ms; the number of versions is determined using method A1 (the base station manages three cells); and the version number is allocated using method B1; and the configuration result is as shown in the following Table 112.

TABLE 112

| Preamble format | Density (D) | Version number (r) |
|---|---|---|
| 4 | 1 | 0 |
| 4 | 1 | 1 |
| 4 | 2 | 0 |

Embodiment 6

The supported densities are: 1, 2, 3, 5, 10 PRACH/10 ms; the number of versions is determined using method A1 (the base station manages three cells); and the version number is allocated using method B1; and the configuration result is as shown in the following Table 113.

TABLE 113

| Preamble format | Density (D) | Version number (r) |
|---|---|---|
| 4 | 1 | 0 |
| 4 | 1 | 1 |
| 4 | 2 | 0 |

TABLE 113-continued

| Preamble format | Density (D) | Version number (r) |
|---|---|---|
| 4 | 3 | 0 |
| 4 | 3 | 1 |
| 4 | 5 | 0 |
| 4 | 5 | 1 |
| 4 | 10 | 0 |

Embodiment 7

The supported densities are: 1, 2, 3, 5 PRACH/10 ms; the number of versions is determined using method A1 (the base station manages three cells); and the version number is allocated using method B1; and the configuration result is as shown in the following Table 114.

TABLE 114

| Preamble format | Density (D) | Version number (r) |
|---|---|---|
| 4 | 1 | 0 |
| 4 | 1 | 1 |
| 4 | 2 | 0 |
| 4 | 3 | 0 |
| 4 | 3 | 1 |
| 4 | 5 | 0 |
| 4 | 5 | 1 |

Embodiment 8

The supported densities are: 0.5, 1, 2, 3, 5, 10 PRACH/10 ms; the number of versions is determined using method A1 (the base station manages four cells); and the version number is allocated using method B1; and the configuration result is as shown in the following Table 115.

TABLE 115

| Preamble format | Density (D) | Version number (r) |
|---|---|---|
| 4 | 0.5 | 0 |
| 4 | 0.5 | 1 |
| 4 | 0.5 | 2 |
| 4 | 0.5 | 3 |
| 4 | 1 | 0 |
| 4 | 1 | 1 |
| 4 | 2 | 0 |
| 4 | 3 | 0 |
| 4 | 3 | 1 |
| 4 | 5 | 0 |
| 4 | 5 | 1 |
| 4 | 10 | 0 |

Embodiment 9

The supported densities are: 0.5, 1, 2, 3, 5 PRACH/10 ms; the number of versions is determined using method A1 (the base station manages four cells); and the version number is allocated using method B1; and the configuration result is as shown in the following Table 116.

TABLE 116

| Preamble format | Density (D) | Version number (r) |
|---|---|---|
| 4 | 0.5 | 0 |
| 4 | 0.5 | 1 |
| 4 | 0.5 | 2 |
| 4 | 0.5 | 3 |
| 4 | 1 | 0 |
| 4 | 1 | 1 |
| 4 | 2 | 0 |
| 4 | 3 | 0 |
| 4 | 3 | 1 |
| 4 | 5 | 0 |
| 4 | 5 | 1 |

Embodiment 10

The supported densities are: 0.5, 1, 2, 3 PRACH/10 ms; the number of versions is determined using method A1 (the base station manages four cells); and the version number is allocated using method B1; and the configuration result is as shown in the following Table 117.

TABLE 117

| Preamble format | Density (D) | Version number (r) |
|---|---|---|
| 4 | 0.5 | 0 |
| 4 | 0.5 | 1 |
| 4 | 0.5 | 2 |
| 4 | 0.5 | 3 |
| 4 | 1 | 0 |
| 4 | 1 | 1 |
| 4 | 2 | 0 |
| 4 | 3 | 0 |
| 4 | 3 | 1 |

Embodiment 11

The supported densities are: 0.5, 1, 2, 3, 5, 10 PRACH/10 ms; the number of versions is determined using method A2; and the version number is allocated using method B2; and the configuration result is as shown in the following Table 118.

TABLE 118

| Preamble format | Density (D) | Version number (r) |
|---|---|---|
| 4 | 0.5 | \ |
| 4 | 1 | \ |
| 4 | 2 | \ |
| 4 | 3 | \ |
| 4 | 5 | \ |
| 4 | 10 | \ |

Embodiment 12

The supported densities are: 0.5, 1, 2, 3, 5 PRACH/10 ms; the number of versions is determined using method A2; and the version number is allocated using method B2; and the configuration result is as shown in the following Table 119.

TABLE 119

| Preamble format | Density (D) | Version number (r) |
|---|---|---|
| 4 | 0.5 | \ |
| 4 | 1 | \ |
| 4 | 2 | \ |
| 4 | 3 | \ |
| 4 | 5 | \ |

Embodiment 13

The supported densities are: 0.5, 1, 2, 3 PRACH/10 ms; the number of versions is determined using method A2; and the version number is allocated using method B2; and the configuration result is as shown in the following Table 120.

TABLE 120

| Preamble format | Density (D) | Version number (r) |
|---|---|---|
| 4 | 0.5 | \ |
| 4 | 1 | \ |
| 4 | 2 | \ |
| 4 | 3 | \ |

Embodiment 14

The supported densities are: 1, 2, 3 PRACH/10 ms; the number of versions is determined using method A2; and the version number is allocated using method B2; and the configuration result is as shown in the following Table 121.

TABLE 121

| Preamble format | Density (D) | Version number (r) |
|---|---|---|
| 4 | 1 | \ |
| 4 | 2 | \ |
| 4 | 3 | \ |

Embodiment 15

The supported densities are: 1, 2 PRACH/10 ms; the number of versions is determined using method A2; and the version number is allocated using method B2; and the configuration result is as shown in the following Table 122.

TABLE 122

| Preamble format | Density (D) | Version number (r) |
|---|---|---|
| 4 | 1 | \ |
| 4 | 2 | \ |

Embodiment 16

The supported densities are: 1, 2, 3, 5, 10 PRACH/10 ms; the number of versions is determined using method A2; and the version number is allocated using method B2; and the configuration result is as shown in the following Table 123.

TABLE 123

| Preamble format | Density (D) | Version number (r) |
|---|---|---|
| 4 | 1 | \ |
| 4 | 2 | \ |
| 4 | 3 | \ |
| 4 | 5 | \ |
| 4 | 10 | \ |

Embodiment 17

The supported densities are: 1, 2, 3, 5 PRACH/10 ms; the number of versions is determined using method A2; and the version number is allocated using method B2; and the configuration result is as shown in the following Table 124.

TABLE 124

| Preamble format | Density (D) | Version number (r) |
|---|---|---|
| 4 | 1 | \ |
| 4 | 2 | \ |
| 4 | 3 | \ |
| 4 | 5 | \ |

Embodiment 18

The supported densities are: 0.5, 1, 2, 3, 5, 6, 10 PRACH/10 ms; the number of versions is determined using method A4; and the version number is allocated using method B2; and the configuration result is as shown in the following Table 125.

TABLE 125

| Preamble format | Density (D) | Version number (r) |
|---|---|---|
| 4 | 0.5 | \ |
| 4 | 1 | \ |
| 4 | 2 | \ |
| 4 | 3 | \ |
| 4 | 4 | \ |
| 4 | 5 | \ |
| 4 | 6 | \ |
| 4 | 10 | \ |

Embodiment 19

The supported densities are: 0.5, 1, 2, 3, 5, 6, 10 PRACH/10 ms; the number of versions is determined using method A4; and the version number is allocated using method B2; and the configuration result is as shown in the following Table 126.

TABLE 126

| Preamble format | Density (D) | Version number (r) |
|---|---|---|
| 4 | 0.5 | \ |
| 4 | 1 | \ |
| 4 | 2 | \ |
| 4 | 3 | \ |
| 4 | 4 | \ |
| 4 | 5 | \ |
| 4 | 6 | \ |

Embodiment 20

The supported densities are: 0.5, 1, 2, 4, 6, 10 PRACH/10 ms; the number of versions is determined using method A6; and the version number is allocated using method B1; and the configuration result is as shown in the following Table 127.

TABLE 127

| Preamble format | Density (D) | Version number (r) |
|---|---|---|
| 4 | 0.5 | 0 |
| 4 | 0.5 | 1 |
| 4 | 0.5 | 2 |
| 4 | 1 | 0 |
| 4 | 1 | 1 |
| 4 | 2 | 0 |
| 4 | 4 | 0 |
| 4 | 6 | 0 |
| 4 | 10 | 0 |

Embodiment 21

The supported densities are: 0.5, 1, 2, 4, 6, 10 PRACH/10 ms; the number of versions is determined using method A4; and the version number is allocated using method B1; and the configuration result is as shown in the following Table 128.

TABLE 128

| Preamble format | Density (D) | Version number (r) |
|---|---|---|
| 4 | 0.5 | 0 |
| 4 | 0.5 | 1 |
| 4 | 0.5 | 2 |
| 4 | 1 | 0 |
| 4 | 1 | 1 |
| 4 | 1 | 2 |
| 4 | 2 | 0 |
| 4 | 2 | 1 |
| 4 | 2 | 2 |
| 4 | 4 | 0 |
| 4 | 4 | 1 |
| 4 | 4 | 2 |
| 4 | 6 | 0 |
| 4 | 6 | 1 |
| 4 | 6 | 2 |
| 4 | 10 | 0 |
| 4 | 10 | 1 |
| 4 | 10 | 2 |

Embodiment 22

The supported densities are: 0.5, 1, 2, 3, 4, 5, 6, 10 PRACH/10 ms; the number of versions is determined using method A5; and the version number is allocated using method B1; and the configuration result is as shown in the following Table 129.

Embodiment 23

The supported densities are: 0.5, 1, 2, 3, 4, 5, 6 PRACH/10 ms; the number of versions is determined using method A5; and the version number is allocated using method B1; and the configuration result is as shown in the following Table 130.

TABLE 130

| Preamble format | Density (D) | Version number (r) |
|---|---|---|
| 4 | 0.5 | 0 |
| 4 | 0.5 | 1 |
| 4 | 0.5 | 2 |
| 4 | 1 | 0 |
| 4 | 1 | 1 |
| 4 | 2 | 0 |
| 4 | 3 | 0 |
| 4 | 4 | 0 |
| 4 | 5 | 0 |
| 4 | 6 | 0 |

Embodiment 24

The supported densities are: 0.5, 1, 2, 3, 4, 5, 6, 10 PRACH/10 ms; the number of versions is determined using method A7; and the version number is allocated using method B1; and the configuration result is as shown in the following Table 131.

TABLE 131

| Preamble format | Density per 10 ms (D) | Version number (r) |
|---|---|---|
| 4 | 0.5 | 0 |
| 4 | 0.5 | 1 |
| 4 | 0.5 | 2 |
| 4 | 1 | 0 |
| 4 | 1 | 1 |
| 4 | 2 | 0 |
| 4 | 3 | 0 |
| 4 | 3 | 1 |
| 4 | 4 | 0 |
| 4 | 5 | 0 |
| 4 | 5 | 1 |
| 4 | 6 | 0 |
| 4 | 10 | 0 |

Embodiment 25

The supported densities are: 0.5, 1, 2, 3, 4, 5, 6 PRACH/10 ms; the number of versions is determined using method A7; and the version number is allocated using method B1; and the configuration result is as shown in the following Table 132.

TABLE 132

| Preamble format | Density (D) | Version number (r) |
|---|---|---|
| 4 | 0.5 | 0 |
| 4 | 0.5 | 1 |
| 4 | 0.5 | 2 |
| 4 | 1 | 0 |
| 4 | 1 | 1 |
| 4 | 2 | 0 |
| 4 | 3 | 0 |
| 4 | 3 | 1 |
| 4 | 4 | 0 |
| 4 | 5 | 0 |
| 4 | 5 | 1 |
| 4 | 6 | 0 |

For the LTE TDD system, five types of preamble formats all need to be supported. The above configuration sets of preamble formats 0, 1, 2, 3, 4 are combined together to form final configuration sets, and to ensure that the total number of the configuration sets does not exceed N, N being the maximum configuration number limited by the system (N=16, 32, or 64).

Based on the above descriptions, examples for specific applications according to the present invention will be further described as follows.

Application Example 1, assume that N=64, if the configuration set of Embodiment 1 is selected for preamble 0; the configuration set of Embodiment 1 is selected for preamble 1; the configuration set of Embodiment 1 is selected for preamble 2; the configuration set of Embodiment 2 is selected for preamble 3; and the configuration set of Embodiment 11 is selected for preamble 4, then the PRACH configuration set is as shown in the following Table 133.

TABLE 133

| Configuration index | Preamble format | Density (D) | Version number (r) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 5 | 0 |
| 13 | 0 | 5 | 1 |
| 14 | 0 | 5 | 2 |
| 15 | 0 | 10 | 0 |
| 16 | 0 | 10 | 1 |
| 17 | 0 | 10 | 2 |
| 18 | 1 | 0.5 | 0 |
| 19 | 1 | 0.5 | 1 |
| 20 | 1 | 0.5 | 2 |
| 21 | 1 | 1 | 0 |
| 22 | 1 | 1 | 1 |
| 23 | 1 | 2 | 0 |
| 24 | 1 | 3 | 0 |
| 25 | 1 | 3 | 1 |
| 26 | 1 | 5 | 0 |
| 27 | 1 | 5 | 1 |
| 28 | 2 | 0.5 | 0 |
| 29 | 2 | 0.5 | 1 |
| 30 | 2 | 0.5 | 2 |
| 31 | 2 | 1 | 0 |
| 32 | 2 | 1 | 1 |
| 33 | 2 | 2 | 0 |
| 34 | 2 | 3 | 0 |
| 35 | 2 | 3 | 1 |
| 36 | 2 | 5 | 0 |
| 37 | 2 | 5 | 1 |
| 38 | 3 | 0.5 | 0 |
| 39 | 3 | 0.5 | 1 |
| 40 | 3 | 0.5 | 2 |
| 41 | 3 | 1 | 0 |
| 42 | 3 | 1 | 1 |
| 43 | 3 | 2 | 0 |
| 44 | 3 | 3 | 0 |
| 45 | 3 | 3 | 1 |
| 46 | 4 | 0.5 | \ |
| 47 | 4 | 1 | \ |
| 48 | 4 | 2 | \ |
| 49 | 4 | 3 | \ |
| 50 | 4 | 5 | \ |
| 51 | 4 | 10 | \ |
| 52 | | | |
| 53 | | | |
| 54 | | | |
| 55 | | | |
| 56 | | | |

TABLE 133-continued

| Configuration index | Preamble format | Density (D) | Version number (r) |
|---|---|---|---|
| 57 | | | |
| 58 | | | |
| 59 | | | |
| 60 | | | |
| 61 | | | |
| 62 | | | |
| 63 | | | |

Application Example 2, assume that N=64, if the configuration set of Embodiment 2 is selected for preamble 0; the configuration set of Embodiment 19 is selected for preamble 1; the configuration set of Embodiment 2 is selected for preamble 2; the configuration set of Embodiment 3 is selected for preamble 3; and the configuration set of Embodiment 12 is selected for preamble 4, then the PRACH configuration set is as shown in the following Table 134.

TABLE 134

| Configuration index | Preamble format | Density (D) | Version number (r) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 5 | 0 |
| 13 | 0 | 5 | 1 |
| 14 | 0 | 5 | 2 |
| 15 | 1 | 0.5 | 0 |
| 16 | 1 | 0.5 | 1 |
| 17 | 1 | 0.5 | 2 |
| 18 | 1 | 1 | 0 |
| 19 | 1 | 1 | 1 |
| 20 | 1 | 2 | 0 |
| 21 | 1 | 3 | 0 |
| 22 | 1 | 3 | 1 |
| 23 | 2 | 0.5 | 0 |
| 24 | 2 | 0.5 | 1 |
| 25 | 2 | 0.5 | 2 |
| 26 | 2 | 1 | 0 |
| 27 | 2 | 1 | 1 |
| 28 | 2 | 2 | 0 |
| 29 | 2 | 3 | 0 |
| 30 | 2 | 3 | 1 |
| 31 | 3 | 0.5 | 0 |
| 32 | 3 | 0.5 | 1 |
| 33 | 3 | 0.5 | 2 |
| 34 | 3 | 1 | 0 |
| 35 | 3 | 1 | 1 |
| 36 | 3 | 2 | 0 |
| 37 | 4 | 0.5 | \ |
| 38 | 4 | 1 | \ |
| 39 | 4 | 2 | \ |
| 40 | 4 | 3 | \ |
| 41 | 4 | 5 | \ |
| 42 | | | |
| 43 | | | |
| 44 | | | |
| 45 | | | |
| 46 | | | |
| 47 | | | |
| 48 | | | |
| 49 | | | |
| 50 | | | |
| 51 | | | |
| 52 | | | |
| 53 | | | |
| 54 | | | |
| 55 | | | |
| 56 | | | |
| 57 | | | |
| 58 | | | |
| 59 | | | |
| 60 | | | |
| 61 | | | |
| 62 | | | |
| 63 | | | |

Application Example 3, assume that N=64, if the configuration set of Embodiment 2 is selected for preamble 0; the configuration set of Embodiment 2 is selected for preamble 1; the configuration set of Embodiment 1 is selected for preamble 2; the configuration set of Embodiment 9 is selected for preamble 3; and the configuration set of Embodiment 12 is selected for preamble 4; then the PRACH configuration set is as shown in the following Table 135.

TABLE 135

| Configuration index | Preamble format | Density (D) | Version number (r) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 5 | 0 |
| 13 | 0 | 5 | 1 |
| 14 | 0 | 5 | 2 |
| 15 | 1 | 0.5 | 0 |
| 16 | 1 | 0.5 | 1 |
| 17 | 1 | 0.5 | 2 |
| 18 | 1 | 1 | 0 |
| 19 | 1 | 1 | 1 |
| 20 | 1 | 2 | 0 |
| 21 | 1 | 3 | 0 |
| 22 | 1 | 3 | 1 |
| 23 | 2 | 0.5 | 0 |
| 24 | 2 | 0.5 | 1 |
| 25 | 2 | 0.5 | 2 |
| 26 | 2 | 1 | 0 |
| 27 | 2 | 1 | 1 |
| 28 | 2 | 2 | 0 |
| 29 | 2 | 3 | 0 |
| 30 | 2 | 3 | 1 |
| 31 | 2 | 5 | 0 |
| 32 | 2 | 5 | 1 |
| 33 | 3 | 0.5 | 0 |
| 34 | 3 | 0.5 | 1 |
| 35 | 3 | 0.5 | 2 |
| 36 | 3 | 1 | 0 |
| 37 | 3 | 1 | 1 |
| 38 | 4 | 0.5 | \ |
| 39 | 4 | 1 | \ |
| 40 | 4 | 2 | \ |

TABLE 135-continued

| Configuration index | Preamble format | Density (D) | Version number (r) |
|---|---|---|---|
| 41 | 4 | 3 | \ |
| 42 | 4 | 5 | \ |
| 43 | | | |
| 44 | | | |
| 45 | | | |
| 46 | | | |
| 47 | | | |
| 48 | | | |
| 49 | | | |
| 50 | | | |
| 51 | | | |
| 52 | | | |
| 53 | | | |
| 54 | | | |
| 55 | | | |
| 56 | | | |
| 57 | | | |
| 58 | | | |
| 59 | | | |
| 60 | | | |
| 61 | | | |
| 62 | | | |
| 63 | | | |

Application Example 4, assume that N=64, if the configuration set of Embodiment 2 is selected for preamble 0; the configuration set of Embodiment 12 is selected for preamble 1; the configuration set of Embodiment 12 is selected for preamble 2; the configuration set of Embodiment 16 is selected for preamble 3; and the configuration set of Embodiment 11 is selected for preamble 4; then the PRACH configuration set is as shown in the following Table 136.

TABLE 136

| Configuration index | Preamble format | Density (D) | Version number (r) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 5 | 0 |
| 13 | 0 | 5 | 1 |
| 14 | 0 | 5 | 2 |
| 15 | 1 | 0.5 | 0 |
| 16 | 1 | 0.5 | 1 |
| 17 | 1 | 0.5 | 2 |
| 18 | 1 | 1 | 0 |
| 19 | 1 | 1 | 1 |
| 20 | 1 | 1 | 2 |
| 21 | 1 | 2 | 0 |
| 22 | 1 | 2 | 1 |
| 23 | 1 | 2 | 2 |
| 24 | 1 | 3 | 0 |
| 25 | 1 | 3 | 1 |
| 26 | 1 | 3 | 2 |
| 27 | 1 | 5 | 0 |
| 28 | 1 | 5 | 1 |
| 29 | 1 | 5 | 2 |
| 30 | 2 | 0.5 | 0 |
| 31 | 2 | 0.5 | 1 |
| 32 | 2 | 0.5 | 2 |

TABLE 136-continued

| Configuration index | Preamble format | Density (D) | Version number (r) |
|---|---|---|---|
| 33 | 2 | 1 | 0 |
| 34 | 2 | 1 | 1 |
| 35 | 2 | 1 | 2 |
| 36 | 2 | 2 | 0 |
| 37 | 2 | 2 | 1 |
| 38 | 2 | 2 | 2 |
| 39 | 2 | 3 | 0 |
| 40 | 2 | 3 | 1 |
| 41 | 2 | 3 | 2 |
| 42 | 2 | 5 | 0 |
| 43 | 2 | 5 | 1 |
| 44 | 2 | 5 | 2 |
| 45 | 3 | 0.5 | 0 |
| 46 | 3 | 0.5 | 1 |
| 47 | 3 | 0.5 | 2 |
| 48 | 3 | 1 | 0 |
| 49 | 3 | 1 | 1 |
| 50 | 3 | 1 | 2 |
| 51 | 3 | 2 | 0 |
| 52 | 3 | 2 | 1 |
| 53 | 3 | 2 | 2 |
| 54 | 3 | 3 | 0 |
| 55 | 3 | 3 | 1 |
| 56 | 3 | 3 | 2 |
| 57 | 4 | 0.5 | \ |
| 58 | 4 | 1 | \ |
| 59 | 4 | 2 | \ |
| 60 | 4 | 3 | \ |
| 61 | 4 | 5 | \ |
| 62 | 4 | 10 | \ |
| 63 | | | |

Application Example 5, assume that N=64, if the configuration set of Embodiment 2 is selected for preamble 0; the configuration set of Embodiment 2 is selected for preamble 1; the configuration set of Embodiment 1 is selected for preamble 2; the configuration set of Embodiment 2 is selected for preamble 3; and the configuration set of Embodiment 12 is selected for preamble 4; then the PRACH configuration set is as shown in the following Table 137.

TABLE 137

| Configuration index | Preamble format | Density (D) | Version number (r) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 5 | 0 |
| 13 | 0 | 5 | 1 |
| 14 | 0 | 5 | 2 |
| 15 | 1 | 0.5 | 0 |
| 16 | 1 | 0.5 | 1 |
| 17 | 1 | 0.5 | 2 |
| 18 | 1 | 1 | 0 |
| 19 | 1 | 1 | 1 |
| 20 | 1 | 2 | 0 |
| 21 | 1 | 3 | 0 |
| 22 | 1 | 3 | 1 |
| 23 | 2 | 0.5 | 0 |
| 24 | 2 | 0.5 | 1 |

TABLE 137-continued

| Configuration index | Preamble format | Density (D) | Version number (r) |
|---|---|---|---|
| 25 | 2 | 0.5 | 2 |
| 26 | 2 | 1 | 0 |
| 27 | 2 | 1 | 1 |
| 28 | 2 | 2 | 0 |
| 29 | 2 | 3 | 0 |
| 30 | 2 | 3 | 1 |
| 31 | 2 | 5 | 0 |
| 32 | 2 | 5 | 1 |
| 33 | 3 | 0.5 | 0 |
| 34 | 3 | 0.5 | 1 |
| 35 | 3 | 0.5 | 2 |
| 36 | 3 | 1 | 0 |
| 37 | 3 | 1 | 1 |
| 38 | 3 | 2 | 0 |
| 39 | 3 | 3 | 0 |
| 40 | 3 | 3 | 1 |
| 41 | 4 | 0.5 | \ |
| 42 | 4 | 1 | \ |
| 43 | 4 | 2 | \ |
| 44 | 4 | 3 | \ |
| 45 | 4 | 5 | \ |
| 46 | | | |
| 47 | | | |
| 48 | | | |
| 49 | | | |
| 50 | | | |
| 51 | | | |
| 52 | | | |
| 53 | | | |
| 54 | | | |
| 55 | | | |
| 56 | | | |
| 57 | | | |
| 58 | | | |
| 59 | | | |
| 60 | | | |
| 61 | | | |
| 62 | | | |
| 63 | | | |

Application Example 6, assume that N=64, if the configuration set of Embodiment 2 is selected for preamble 0; the configuration set of Embodiment 13 is selected for preamble 1; the configuration set of Embodiment 12 is selected for preamble 2; the configuration set of Embodiment 16 is selected for preamble 3; and the configuration set of Embodiment 12 is selected for preamble 4; then the PRACH configuration set is as shown in the following Table 138.

TABLE 138

| Configuration index | Preamble format | Density (D) | Version number (r) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 5 | 0 |
| 13 | 0 | 5 | 1 |
| 14 | 0 | 5 | 2 |
| 15 | 1 | 0.5 | 0 |
| 16 | 1 | 0.5 | 1 |
| 17 | 1 | 0.5 | 2 |
| 18 | 1 | 1 | 0 |
| 19 | 1 | 1 | 1 |
| 20 | 1 | 1 | 2 |
| 21 | 1 | 2 | 0 |
| 22 | 1 | 2 | 1 |
| 23 | 1 | 2 | 2 |
| 24 | 1 | 3 | 0 |
| 25 | 1 | 3 | 1 |
| 26 | 1 | 3 | 2 |
| 27 | 2 | 0.5 | 0 |
| 28 | 2 | 0.5 | 1 |
| 29 | 2 | 0.5 | 2 |
| 30 | 2 | 1 | 0 |
| 31 | 2 | 1 | 1 |
| 32 | 2 | 1 | 2 |
| 33 | 2 | 2 | 0 |
| 34 | 2 | 2 | 1 |
| 35 | 2 | 2 | 2 |
| 36 | 2 | 3 | 0 |
| 37 | 2 | 3 | 1 |
| 38 | 2 | 3 | 2 |
| 39 | 2 | 5 | 0 |
| 40 | 2 | 5 | 1 |
| 41 | 2 | 5 | 2 |
| 42 | 3 | 0.5 | 0 |
| 43 | 3 | 0.5 | 1 |
| 44 | 3 | 0.5 | 2 |
| 45 | 3 | 1 | 0 |
| 46 | 3 | 1 | 1 |
| 47 | 3 | 1 | 2 |
| 48 | 3 | 2 | 0 |
| 49 | 3 | 2 | 1 |
| 50 | 3 | 2 | 2 |
| 51 | 3 | 3 | 0 |
| 52 | 3 | 3 | 1 |
| 53 | 3 | 3 | 2 |
| 54 | 4 | 0.5 | \ |
| 55 | 4 | 1 | \ |
| 56 | 4 | 2 | \ |
| 57 | 4 | 3 | \ |
| 58 | 4 | 5 | \ |
| 59 | | | |
| 60 | | | |
| 61 | | | |
| 62 | | | |
| 63 | | | |

Application Example 7, assume that N=64, if the configuration set of Embodiment 8 is selected for preamble 0; the configuration set of Embodiment 8 is selected for preamble 1; the configuration set of Embodiment 8 is selected for preamble 2; the configuration set of Embodiment 11 is selected for preamble 3; and the configuration set of Embodiment 11 is selected for preamble 4; then the PRACH configuration set is as shown in the following Table 139.

TABLE 139

| Configuration index | Preamble format | Density (D) | Version number (r) |
|---|---|---|---|
| 0 | 0 | 0.5 | 0 |
| 1 | 0 | 0.5 | 1 |
| 2 | 0 | 0.5 | 2 |
| 3 | 0 | 0.5 | 3 |
| 4 | 0 | 1 | 0 |
| 5 | 0 | 1 | 1 |
| 6 | 0 | 1 | 2 |
| 7 | 0 | 2 | 0 |
| 8 | 0 | 2 | 1 |

TABLE 139-continued

| Configuration index | Preamble format | Density (D) | Version number (r) |
|---|---|---|---|
| 9 | 0 | 2 | 2 |
| 10 | 0 | 3 | 0 |
| 11 | 0 | 3 | 1 |
| 12 | 0 | 3 | 2 |
| 13 | 0 | 5 | 0 |
| 14 | 0 | 5 | 1 |
| 15 | 0 | 5 | 2 |
| 16 | 0 | 10 | 0 |
| 17 | 0 | 10 | 1 |
| 18 | 0 | 10 | 2 |
| 19 | 1 | 0.5 | 0 |
| 20 | 1 | 0.5 | 1 |
| 21 | 1 | 0.5 | 2 |
| 22 | 1 | 0.5 | 3 |
| 23 | 1 | 1 | 0 |
| 24 | 1 | 1 | 1 |
| 25 | 1 | 2 | 0 |
| 26 | 1 | 3 | 0 |
| 27 | 1 | 3 | 1 |
| 28 | 1 | 5 | 0 |
| 29 | 1 | 5 | 1 |
| 30 | 2 | 0.5 | 0 |
| 31 | 2 | 0.5 | 1 |
| 32 | 2 | 0.5 | 2 |
| 33 | 2 | 0.5 | 3 |
| 34 | 2 | 1 | 0 |
| 35 | 2 | 1 | 1 |
| 36 | 2 | 2 | 0 |
| 37 | 2 | 3 | 0 |
| 38 | 2 | 3 | 1 |
| 39 | 2 | 5 | 0 |
| 40 | 2 | 5 | 1 |
| 41 | 3 | 0.5 | 0 |
| 42 | 3 | 0.5 | 1 |
| 43 | 3 | 0.5 | 2 |
| 44 | 3 | 0.5 | 3 |
| 45 | 3 | 1 | 0 |
| 46 | 3 | 1 | 1 |
| 47 | 3 | 2 | 0 |
| 48 | 3 | 3 | 0 |
| 49 | 3 | 3 | 1 |
| 50 | 4 | 0.5 | \ |
| 51 | 4 | 1 | \ |
| 52 | 4 | 2 | \ |
| 53 | 4 | 3 | \ |
| 54 | 4 | 5 | \ |
| 55 | 4 | 10 | \ |
| 56 | | | |
| 57 | | | |
| 58 | | | |
| 59 | | | |
| 60 | | | |
| 61 | | | |
| 62 | | | |
| 63 | | | |

Application Example 8, assume that N=64, if the configuration set of Embodiment 18 is selected for preamble 0; the configuration set of Embodiment 26 is selected for preamble 1; the configuration set of Embodiment 26 is selected for preamble 2; the configuration set of Embodiment 32 is selected for preamble 3; and the configuration set of Embodiment 18 is selected for preamble 4; then the PRACH configuration set is as shown in the following Table 140.

TABLE 140

| Configuration index | Preamble format | Density (D) | Version number (r) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 0 | 10 | 0 |
| 21 | 0 | 10 | 1 |
| 22 | 0 | 10 | 2 |
| 23 | 1 | 0.5 | 0 |
| 24 | 1 | 0.5 | 1 |
| 25 | 1 | 0.5 | 2 |
| 26 | 1 | 1 | 0 |
| 27 | 1 | 1 | 1 |
| 28 | 1 | 2 | 0 |
| 29 | 1 | 3 | 0 |
| 30 | 1 | 4 | 0 |
| 31 | 1 | 5 | 0 |
| 32 | 1 | 6 | 0 |
| 33 | 2 | 0.5 | 0 |
| 34 | 2 | 0.5 | 1 |
| 35 | 2 | 0.5 | 2 |
| 36 | 2 | 1 | 0 |
| 37 | 2 | 1 | 1 |
| 38 | 2 | 2 | 0 |
| 39 | 2 | 3 | 0 |
| 40 | 2 | 4 | 0 |
| 41 | 2 | 5 | 0 |
| 42 | 2 | 6 | 0 |
| 43 | 3 | 0.5 | 0 |
| 44 | 3 | 0.5 | 1 |
| 45 | 3 | 0.5 | 2 |
| 46 | 3 | 1 | 0 |
| 47 | 3 | 1 | 1 |
| 48 | 3 | 2 | 0 |
| 49 | 3 | 3 | 0 |
| 50 | 3 | 4 | 0 |
| 51 | 4 | 0.5 | \ |
| 52 | 4 | 1 | \ |
| 53 | 4 | 2 | \ |
| 54 | 4 | 3 | \ |
| 55 | 4 | 4 | \ |
| 56 | 4 | 5 | \ |
| 57 | 4 | 6 | \ |
| 58 | 4 | 10 | \ |
| 59 | | | |
| 60 | | | |
| 61 | | | |
| 62 | | | |
| 63 | | | |

Application Example 9, assume that N=64, if the configuration set of Embodiment 19 is selected for preamble 0; the configuration set of Embodiment 26 is selected for preamble 1; the configuration set of Embodiment 26 is selected for preamble 2; the configuration set of Embodiment 32 is selected for preamble 3; and the configuration set of Embodiment 19 is selected for preamble 4; then the PRACH configuration set is as shown in the following Table 141.

TABLE 141

| Configuration index | Preamble format | Density (D) | Version number (r) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |
| 32 | 2 | 0.5 | 2 |
| 33 | 2 | 1 | 0 |
| 34 | 2 | 1 | 1 |
| 35 | 2 | 2 | 0 |
| 36 | 2 | 3 | 0 |
| 37 | 2 | 4 | 0 |
| 38 | 2 | 5 | 0 |
| 39 | 2 | 6 | 0 |
| 40 | 3 | 0.5 | 0 |
| 41 | 3 | 0.5 | 1 |
| 42 | 3 | 0.5 | 2 |
| 43 | 3 | 1 | 0 |
| 44 | 3 | 1 | 1 |
| 45 | 3 | 2 | 0 |
| 46 | 3 | 3 | 0 |
| 47 | 3 | 4 | 0 |
| 48 | 4 | 0.5 | \ |
| 49 | 4 | 1 | \ |
| 50 | 4 | 2 | \ |
| 51 | 4 | 3 | \ |
| 52 | 4 | 4 | \ |
| 53 | 4 | 5 | \ |
| 54 | 4 | 6 | \ |
| 55 | | | |
| 56 | | | |
| 57 | | | |
| 58 | | | |
| 59 | | | |
| 60 | | | |
| 61 | | | |
| 62 | | | |
| 63 | | | |

Application Example 10, assume that N=64, if the configuration set of Embodiment 20 is selected for preamble 0; the configuration set of Embodiment 27 is selected for preamble 1; the configuration set of Embodiment 27 is selected for preamble 2; the configuration set of Embodiment 33 is selected for preamble 3; and the configuration set of Embodiment 20 is selected for preamble 4; then the PRACH configuration set is as shown in the following Table 142.

TABLE 142

| Configuration index | Preamble format | Density (D) | Version number (r) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 4 | 0 |
| 10 | 0 | 4 | 1 |
| 11 | 0 | 4 | 2 |
| 12 | 0 | 6 | 0 |
| 13 | 0 | 6 | 1 |
| 14 | 0 | 6 | 2 |
| 15 | 0 | 10 | 0 |
| 16 | 0 | 10 | 1 |
| 17 | 0 | 10 | 2 |
| 18 | 1 | 0.5 | 0 |
| 19 | 1 | 0.5 | 1 |
| 20 | 1 | 0.5 | 2 |
| 21 | 1 | 1 | 0 |
| 22 | 1 | 1 | 1 |
| 23 | 1 | 2 | 0 |
| 24 | 1 | 4 | 0 |
| 25 | 1 | 6 | 0 |
| 26 | 2 | 0.5 | 0 |
| 27 | 2 | 0.5 | 1 |
| 28 | 2 | 0.5 | 2 |
| 29 | 2 | 1 | 0 |
| 30 | 2 | 1 | 1 |
| 31 | 2 | 2 | 0 |
| 32 | 2 | 4 | 0 |
| 33 | 2 | 6 | 0 |
| 34 | 3 | 0.5 | 0 |
| 35 | 3 | 0.5 | 1 |
| 36 | 3 | 0.5 | 2 |
| 37 | 3 | 1 | 0 |
| 38 | 3 | 1 | 1 |
| 39 | 3 | 2 | 0 |
| 40 | 3 | 4 | 0 |
| 41 | 4 | 0.5 | 0 |
| 42 | 4 | 0.5 | 1 |
| 43 | 4 | 0.5 | 2 |
| 44 | 4 | 1 | 0 |
| 45 | 4 | 1 | 1 |
| 46 | 4 | 2 | 0 |
| 47 | 4 | 4 | 0 |
| 48 | 4 | 6 | 0 |
| 49 | 4 | 10 | 0 |
| 50 | | | |
| 51 | | | |
| 52 | | | |
| 53 | | | |
| 54 | | | |
| 55 | | | |
| 56 | | | |
| 57 | | | |
| 58 | | | |
| 59 | | | |
| 60 | | | |
| 61 | | | |
| 62 | | | |
| 63 | | | |

Application Example 11, assume that N=64, if the configuration set of Embodiment 20 is selected for preamble 0; the configuration set of Embodiment 27 is selected for preamble 1; the configuration set of Embodiment 27 is selected for preamble 2; the configuration set of Embodiment 33 is selected for preamble 3; and the configuration set of Embodiment 21 is selected for preamble 4; then the PRACH configuration set is as shown in the following Table 143.

TABLE 143

| Configuration index | Preamble format | Density (D) | Version number (r) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 4 | 0 |
| 10 | 0 | 4 | 1 |
| 11 | 0 | 4 | 2 |
| 12 | 0 | 6 | 0 |
| 13 | 0 | 6 | 1 |
| 14 | 0 | 6 | 2 |
| 15 | 0 | 10 | 0 |
| 16 | 0 | 10 | 1 |
| 17 | 0 | 10 | 2 |
| 18 | 1 | 0.5 | 0 |
| 19 | 1 | 0.5 | 1 |
| 20 | 1 | 0.5 | 2 |
| 21 | 1 | 1 | 0 |
| 22 | 1 | 1 | 1 |
| 23 | 1 | 2 | 0 |
| 24 | 1 | 4 | 0 |
| 25 | 1 | 6 | 0 |
| 26 | 2 | 0.5 | 0 |
| 27 | 2 | 0.5 | 1 |
| 28 | 2 | 0.5 | 2 |
| 29 | 2 | 1 | 0 |
| 30 | 2 | 1 | 1 |
| 31 | 2 | 2 | 0 |
| 32 | 2 | 4 | 0 |
| 33 | 2 | 6 | 0 |
| 34 | 3 | 0.5 | 0 |
| 35 | 3 | 0.5 | 1 |
| 36 | 3 | 0.5 | 2 |
| 37 | 3 | 1 | 0 |
| 38 | 3 | 1 | 1 |
| 39 | 3 | 2 | 0 |
| 40 | 3 | 4 | 0 |
| 41 | 4 | 0.5 | 0 |
| 42 | 4 | 0.5 | 1 |
| 43 | 4 | 0.5 | 2 |
| 44 | 4 | 1 | 0 |
| 45 | 4 | 1 | 1 |
| 46 | 4 | 1 | 2 |
| 47 | 4 | 2 | 0 |
| 48 | 4 | 2 | 1 |
| 49 | 4 | 2 | 2 |
| 50 | 4 | 4 | 0 |
| 51 | 4 | 4 | 1 |
| 52 | 4 | 4 | 2 |
| 53 | 4 | 6 | 0 |
| 54 | 4 | 6 | 1 |
| 55 | 4 | 6 | 2 |
| 56 | 4 | 10 | 0 |
| 57 | 4 | 10 | 1 |
| 58 | 4 | 10 | 2 |
| 59 | | | |
| 60 | | | |
| 61 | | | |
| 62 | | | |
| 63 | | | |

Application Example 12, assume that N=64, if the configuration set of Embodiment 18 is selected for preamble 0; the configuration set of Embodiment 26 is selected for preamble 1; the configuration set of Embodiment 26 is selected for preamble 2; the configuration set of Embodiment 32 is selected for preamble 3; and the configuration set of Embodiment 19 is selected for preamble 4; then the PRACH configuration set is as shown in the following Table 144.

TABLE 144

| Configuration index | Preamble format | Density (D) | Version number (r) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 0 | 10 | 0 |
| 21 | 0 | 10 | 1 |
| 22 | 0 | 10 | 2 |
| 23 | 1 | 0.5 | 0 |
| 24 | 1 | 0.5 | 1 |
| 25 | 1 | 0.5 | 2 |
| 26 | 1 | 1 | 0 |
| 27 | 1 | 1 | 1 |
| 28 | 1 | 2 | 0 |
| 29 | 1 | 3 | 0 |
| 30 | 1 | 4 | 0 |
| 31 | 1 | 5 | 0 |
| 32 | 1 | 6 | 0 |
| 33 | 2 | 0.5 | 0 |
| 34 | 2 | 0.5 | 1 |
| 35 | 2 | 0.5 | 2 |
| 36 | 2 | 1 | 0 |
| 37 | 2 | 1 | 1 |
| 38 | 2 | 2 | 0 |
| 39 | 2 | 3 | 0 |
| 40 | 2 | 4 | 0 |
| 41 | 2 | 5 | 0 |
| 42 | 2 | 6 | 0 |
| 43 | 3 | 0.5 | 0 |
| 44 | 3 | 0.5 | 1 |
| 45 | 3 | 0.5 | 2 |
| 46 | 3 | 1 | 0 |
| 47 | 3 | 1 | 1 |
| 48 | 3 | 2 | 0 |
| 49 | 3 | 3 | 0 |
| 50 | 3 | 4 | 0 |
| 51 | 4 | 0.5 | \ |
| 52 | 4 | 1 | \ |
| 53 | 4 | 2 | \ |
| 54 | 4 | 3 | \ |
| 55 | 4 | 4 | \ |
| 56 | 4 | 5 | \ |
| 57 | 4 | 6 | \ |
| 58 | | | |
| 59 | | | |
| 60 | | | |
| 61 | | | |
| 62 | | | |
| 63 | | | |

Application Example 13, assume that N=64, if the configuration set of Embodiment 18 is selected for preamble 0; the configuration set of Embodiment 26 is selected for preamble 1; the configuration set of Embodiment 26 is selected for preamble 2; the configuration set of Embodiment 32 is selected for preamble 3; and the configuration set of Embodiment 24 is selected for preamble 4; then the PRACH configuration set is as shown in the following Table 145.

TABLE 145

| Configuration index | Preamble format | Density (D) | Version number (r) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 0 | 10 | 0 |
| 21 | 0 | 10 | 1 |
| 22 | 0 | 10 | 2 |
| 23 | 1 | 0.5 | 0 |
| 24 | 1 | 0.5 | 1 |
| 25 | 1 | 0.5 | 2 |
| 26 | 1 | 1 | 0 |
| 27 | 1 | 1 | 1 |
| 28 | 1 | 2 | 0 |
| 29 | 1 | 3 | 0 |
| 30 | 1 | 4 | 0 |
| 31 | 1 | 5 | 0 |
| 32 | 1 | 6 | 0 |
| 33 | 2 | 0.5 | 0 |
| 34 | 2 | 0.5 | 1 |
| 35 | 2 | 0.5 | 2 |
| 36 | 2 | 1 | 0 |
| 37 | 2 | 1 | 1 |
| 38 | 2 | 2 | 0 |
| 39 | 2 | 3 | 0 |
| 40 | 2 | 4 | 0 |
| 41 | 2 | 5 | 0 |
| 42 | 2 | 6 | 0 |
| 43 | 3 | 0.5 | 0 |
| 44 | 3 | 0.5 | 1 |
| 45 | 3 | 0.5 | 2 |
| 46 | 3 | 1 | 0 |
| 47 | 3 | 1 | 1 |
| 48 | 3 | 2 | 0 |
| 49 | 3 | 3 | 0 |
| 50 | 3 | 4 | 0 |
| 51 | 4 | 0.5 | 0 |
| 52 | 4 | 0.5 | 1 |
| 53 | 4 | 0.5 | 2 |
| 54 | 4 | 1 | 0 |
| 55 | 4 | 1 | 1 |
| 56 | 4 | 2 | 0 |
| 57 | 4 | 3 | 0 |
| 58 | 4 | 3 | 1 |
| 59 | 4 | 4 | 0 |
| 60 | 4 | 5 | 0 |
| 61 | 4 | 5 | 1 |
| 62 | 4 | 6 | 0 |
| 63 | 4 | 10 | 0 |

TABLE 146

| Configuration index | Preamble format | Density (D) | Version number (r) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 0 | 10 | 0 |
| 21 | 0 | 10 | 1 |
| 22 | 0 | 10 | 2 |
| 23 | 1 | 0.5 | 0 |
| 24 | 1 | 0.5 | 1 |
| 25 | 1 | 0.5 | 2 |
| 26 | 1 | 1 | 0 |
| 27 | 1 | 1 | 1 |
| 28 | 1 | 2 | 0 |
| 29 | 1 | 3 | 0 |
| 30 | 1 | 4 | 0 |
| 31 | 1 | 5 | 0 |
| 32 | 1 | 6 | 0 |
| 33 | 2 | 0.5 | 0 |
| 34 | 2 | 0.5 | 1 |
| 35 | 2 | 0.5 | 2 |
| 36 | 2 | 1 | 0 |
| 37 | 2 | 1 | 1 |
| 38 | 2 | 2 | 0 |
| 39 | 2 | 3 | 0 |
| 40 | 2 | 4 | 0 |
| 41 | 2 | 5 | 0 |
| 42 | 2 | 6 | 0 |
| 43 | 3 | 0.5 | 0 |
| 44 | 3 | 0.5 | 1 |
| 45 | 3 | 0.5 | 2 |
| 46 | 3 | 1 | 0 |
| 47 | 3 | 1 | 1 |
| 48 | 3 | 2 | 0 |
| 49 | 3 | 3 | 0 |
| 50 | 3 | 4 | 0 |
| 51 | 4 | 0.5 | 0 |
| 52 | 4 | 0.5 | 1 |
| 53 | 4 | 0.5 | 2 |
| 54 | 4 | 1 | 0 |
| 55 | 4 | 1 | 1 |
| 56 | 4 | 2 | 0 |
| 57 | 4 | 3 | 0 |
| 58 | 4 | 4 | 0 |
| 59 | 4 | 5 | 0 |
| 60 | 4 | 6 | 0 |
| 61 | 4 | 10 | 0 |
| 62 | | | |
| 63 | | | |

Application Example 14, assume that N=64, if the configuration set of Embodiment 18 is selected for preamble 0; the configuration set of Embodiment 26 is selected for preamble 1; the configuration set of Embodiment 26 is selected for preamble 2; the configuration set of Embodiment 32 is selected for preamble 3; and the configuration set of Embodiment 22 is selected for preamble 4; then the PRACH configuration set is as shown in the following Table 146.

Application Example 15, assume that N=64, if the configuration set of Embodiment 19 is selected for preamble 0; the configuration set of Embodiment 26 is selected for preamble 1; the configuration set of Embodiment 26 is selected for preamble 2; the configuration set of Embodiment 32 is selected for preamble 3; and the configuration set of Embodiment 25 is selected as for preamble 4; then the PRACH configuration set is as shown in the following Table 147.

TABLE 147

| Configuration index | Preamble format | Density (D) | Version number (r) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |
| 32 | 2 | 0.5 | 2 |
| 33 | 2 | 1 | 0 |
| 34 | 2 | 1 | 1 |
| 35 | 2 | 2 | 0 |
| 36 | 2 | 3 | 0 |
| 37 | 2 | 4 | 0 |
| 38 | 2 | 5 | 0 |
| 39 | 2 | 6 | 0 |
| 40 | 3 | 0.5 | 0 |
| 41 | 3 | 0.5 | 1 |
| 42 | 3 | 0.5 | 2 |
| 43 | 3 | 1 | 0 |
| 44 | 3 | 1 | 1 |
| 45 | 3 | 2 | 0 |
| 46 | 3 | 3 | 0 |
| 47 | 3 | 4 | 0 |
| 48 | 4 | 0.5 | 0 |
| 49 | 4 | 0.5 | 1 |
| 50 | 4 | 0.5 | 2 |
| 51 | 4 | 1 | 0 |
| 52 | 4 | 1 | 1 |
| 53 | 4 | 2 | 0 |
| 54 | 4 | 3 | 0 |
| 55 | 4 | 3 | 1 |
| 56 | 4 | 4 | 0 |
| 57 | 4 | 5 | 0 |
| 58 | 4 | 5 | 1 |
| 59 | 4 | 6 | 0 |
| 60 | | | |
| 61 | | | |
| 62 | | | |
| 63 | | | |

Application Example 16, assume that N=64, if the configuration set of Embodiment 19 is selected for preamble 0; the configuration set of Embodiment 26 is selected for preamble 1; the configuration set of Embodiment 26 is selected for preamble 2; the configuration set of Embodiment 32 is selected for preamble 3; and the configuration set of Embodiment 23 is selected for preamble 4; then the PRACH configuration set is as shown in the following Table 148.

TABLE 148

| Configuration index | Preamble format | Density (D) | Version number (r) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |
| 32 | 2 | 0.5 | 2 |
| 33 | 2 | 1 | 0 |
| 34 | 2 | 1 | 1 |
| 35 | 2 | 2 | 0 |
| 36 | 2 | 3 | 0 |
| 37 | 2 | 4 | 0 |
| 38 | 2 | 5 | 0 |
| 39 | 2 | 6 | 0 |
| 40 | 3 | 0.5 | 0 |
| 41 | 3 | 0.5 | 1 |
| 42 | 3 | 0.5 | 2 |
| 43 | 3 | 1 | 0 |
| 44 | 3 | 1 | 1 |
| 45 | 3 | 2 | 0 |
| 46 | 3 | 3 | 0 |
| 47 | 3 | 4 | 0 |
| 48 | 4 | 0.5 | 0 |
| 49 | 4 | 0.5 | 1 |
| 50 | 4 | 0.5 | 2 |
| 51 | 4 | 1 | 0 |
| 52 | 4 | 1 | 1 |
| 53 | 4 | 2 | 0 |
| 54 | 4 | 3 | 0 |
| 55 | 4 | 4 | 0 |
| 56 | 4 | 5 | 0 |
| 57 | 4 | 6 | 0 |
| 58 | | | |
| 59 | | | |
| 60 | | | |
| 61 | | | |
| 62 | | | |
| 63 | | | |

Application Example 17, assume that N=64, if the configuration set of Embodiment 18 is selected for preamble 0; the configuration set of Embodiment 26 is selected for preamble 1; the configuration set of Embodiment 26 is selected for preamble 2; the configuration set of Embodiment 32 is selected for preamble 3; and the configuration set of Embodiment 25 is selected for preamble 4; then the PRACH configuration set is as shown in the following Table 149.

TABLE 149

| Configuration index | Preamble format | Density (D) | Version number (r) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 0 | 10 | 0 |
| 21 | 0 | 10 | 1 |
| 22 | 0 | 10 | 2 |
| 23 | 1 | 0.5 | 0 |
| 24 | 1 | 0.5 | 1 |
| 25 | 1 | 0.5 | 2 |
| 26 | 1 | 1 | 0 |
| 27 | 1 | 1 | 1 |
| 28 | 1 | 2 | 0 |
| 29 | 1 | 3 | 0 |
| 30 | 1 | 4 | 0 |
| 31 | 1 | 5 | 0 |
| 32 | 1 | 6 | 0 |
| 33 | 2 | 0.5 | 0 |
| 34 | 2 | 0.5 | 1 |
| 35 | 2 | 0.5 | 2 |
| 36 | 2 | 1 | 0 |
| 37 | 2 | 1 | 1 |
| 38 | 2 | 2 | 0 |
| 39 | 2 | 3 | 0 |
| 40 | 2 | 4 | 0 |
| 41 | 2 | 5 | 0 |
| 42 | 2 | 6 | 0 |
| 43 | 3 | 0.5 | 0 |
| 44 | 3 | 0.5 | 1 |
| 45 | 3 | 0.5 | 2 |
| 46 | 3 | 1 | 0 |
| 47 | 3 | 1 | 1 |
| 48 | 3 | 2 | 0 |
| 49 | 3 | 3 | 0 |
| 50 | 3 | 4 | 0 |
| 51 | 4 | 0.5 | 0 |
| 52 | 4 | 0.5 | 1 |
| 53 | 4 | 0.5 | 2 |
| 54 | 4 | 1 | 0 |
| 55 | 4 | 1 | 1 |
| 56 | 4 | 2 | 0 |
| 57 | 4 | 3 | 0 |
| 58 | 4 | 3 | 1 |
| 59 | 4 | 4 | 0 |
| 60 | 4 | 5 | 0 |
| 61 | 4 | 5 | 1 |
| 62 | 4 | 6 | 0 |
| 63 | | | |

TABLE 150

| Configuration index | Preamble format | Density (D) | Version number (r) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 0 | 10 | 0 |
| 21 | 0 | 10 | 1 |
| 22 | 0 | 10 | 2 |
| 23 | 1 | 0.5 | 0 |
| 24 | 1 | 0.5 | 1 |
| 25 | 1 | 0.5 | 2 |
| 26 | 1 | 1 | 0 |
| 27 | 1 | 1 | 1 |
| 28 | 1 | 2 | 0 |
| 29 | 1 | 3 | 0 |
| 30 | 1 | 4 | 0 |
| 31 | 1 | 5 | 0 |
| 32 | 1 | 6 | 0 |
| 33 | 2 | 0.5 | 0 |
| 34 | 2 | 0.5 | 1 |
| 35 | 2 | 0.5 | 2 |
| 36 | 2 | 1 | 0 |
| 37 | 2 | 1 | 1 |
| 38 | 2 | 2 | 0 |
| 39 | 2 | 3 | 0 |
| 40 | 2 | 4 | 0 |
| 41 | 2 | 5 | 0 |
| 42 | 2 | 6 | 0 |
| 43 | 3 | 0.5 | 0 |
| 44 | 3 | 0.5 | 1 |
| 45 | 3 | 0.5 | 2 |
| 46 | 3 | 1 | 0 |
| 47 | 3 | 1 | 1 |
| 48 | 3 | 2 | 0 |
| 49 | 3 | 3 | 0 |
| 50 | 3 | 4 | 0 |
| 51 | 4 | 0.5 | 0 |
| 52 | 4 | 0.5 | 1 |
| 53 | 4 | 0.5 | 2 |
| 54 | 4 | 1 | 0 |
| 55 | 4 | 1 | 1 |
| 56 | 4 | 2 | 0 |
| 57 | 4 | 3 | 0 |
| 58 | 4 | 4 | 0 |
| 59 | 4 | 5 | 0 |
| 60 | 4 | 6 | 0 |
| 61 | | | |
| 62 | | | |
| 63 | | | |

Application Example 18, assume that N=64, if the configuration set of Embodiment 18 is selected for preamble 0; the configuration set of Embodiment 26 is selected for preamble 1; the configuration set of Embodiment 26 is selected for preamble 2; the configuration set of Embodiment 32 is selected for preamble 3; and the configuration set of Embodiment 23 is selected for preamble 4; then the PRACH configuration set is as shown in the following Table 150.

Application Example 19, assume that N=64, if the configuration set of Embodiment 19 is selected for preamble 0; the configuration set of Embodiment 26 is selected for preamble 1; the configuration set of Embodiment 26 is selected for preamble 2; the configuration set of Embodiment 32 is selected for preamble 3; and the configuration set of Embodiment 24 is selected for preamble 4; then the PRACH configuration set is as shown in the following Table 151.

TABLE 151

| Configuration index | Preamble format | Density (D) | Version number (r) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |
| 32 | 2 | 0.5 | 2 |
| 33 | 2 | 1 | 0 |
| 34 | 2 | 1 | 1 |
| 35 | 2 | 2 | 0 |
| 36 | 2 | 3 | 0 |
| 37 | 2 | 4 | 0 |
| 38 | 2 | 5 | 0 |
| 39 | 2 | 6 | 0 |
| 40 | 3 | 0.5 | 0 |
| 41 | 3 | 0.5 | 1 |
| 42 | 3 | 0.5 | 2 |
| 43 | 3 | 1 | 0 |
| 44 | 3 | 1 | 1 |
| 45 | 3 | 2 | 0 |
| 46 | 3 | 3 | 0 |
| 47 | 3 | 4 | 0 |
| 48 | 4 | 0.5 | 0 |
| 49 | 4 | 0.5 | 1 |
| 50 | 4 | 0.5 | 2 |
| 51 | 4 | 1 | 0 |
| 52 | 4 | 1 | 1 |
| 53 | 4 | 2 | 0 |
| 54 | 4 | 3 | 0 |
| 55 | 4 | 3 | 1 |
| 56 | 4 | 4 | 0 |
| 57 | 4 | 5 | 0 |
| 58 | 4 | 5 | 1 |
| 59 | 4 | 6 | 0 |
| 60 | 4 | 10 | 0 |
| 61 | | | |
| 62 | | | |
| 63 | | | |

Application Example 20, assume that N=64, if the configuration set of Embodiment 19 is selected for preamble 0; the configuration set of Embodiment 26 is selected for preamble 1; the configuration set of Embodiment 26 is selected for preamble 2; the configuration set of Embodiment 32 is selected for preamble 3; and the configuration set of Embodiment 22 is selected for preamble 4; then the PRACH configuration set is as shown in the following Table 152.

TABLE 152

| Configuration index | Preamble format | Density (D) | Version number (r) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |
| 32 | 2 | 0.5 | 2 |
| 33 | 2 | 1 | 0 |
| 34 | 2 | 1 | 1 |
| 35 | 2 | 2 | 0 |
| 36 | 2 | 3 | 0 |
| 37 | 2 | 4 | 0 |
| 38 | 2 | 5 | 0 |
| 39 | 2 | 6 | 0 |
| 40 | 3 | 0.5 | 0 |
| 41 | 3 | 0.5 | 1 |
| 42 | 3 | 0.5 | 2 |
| 43 | 3 | 1 | 0 |
| 44 | 3 | 1 | 1 |
| 45 | 3 | 2 | 0 |
| 46 | 3 | 3 | 0 |
| 47 | 3 | 4 | 0 |
| 48 | 4 | 0.5 | 0 |
| 49 | 4 | 0.5 | 1 |
| 50 | 4 | 0.5 | 2 |
| 51 | 4 | 1 | 0 |
| 52 | 4 | 1 | 1 |
| 53 | 4 | 2 | 0 |
| 54 | 4 | 3 | 0 |
| 55 | 4 | 4 | 0 |
| 56 | 4 | 5 | 0 |
| 57 | 4 | 6 | 0 |
| 58 | 4 | 10 | 0 |
| 59 | | | |
| 60 | | | |
| 61 | | | |
| 62 | | | |
| 63 | | | |

One good configuration set can provide enough density types for various PRACH formats in order to meet the requirements of different system loads, and meanwhile can provide enough version types for each combination of format and density to decrease the processing load of the base station and reduce the inter-cell interference.

The descriptions above are only embodiments of the present invention, which are not used to restrict the present invention. For those skilled in the art, the present invention may have various changes and variations. Any amendments, equivalent substitutions, improvements etc. within the spirit and principle of the present invention are all concluded in the scope of the claims of the present invention.

What is claimed is:

1. A method for configuring and indicating Physical Random Access Channel, PRACH, parameter in a Time Division Duplex system, suitable for the Long Term Evolution, LTE, system, wherein a same PRACH configuration set is stored in a base station and a terminal respectively; when performing a PRACH configuration, the terminal inquires the PRACH configuration set according to configuration information to obtain a configuration parameter, and/or the terminal computes to obtain the configuration parameter according to a system parameter; wherein the configuration parameter of the PRACH includes one or more of the following: density, PRACH format, and version number;

wherein the terminal computing to obtain the configuration parameter according to the system parameter computation refers to the terminal obtaining a version number according to the system parameter, comprising:

the terminal computes the number of versions according to the following formula:

$$R = \left\lfloor \frac{N_{RA}^{BW} \cdot N_{SP}}{D} \right\rfloor,$$

wherein R is the number of versions, $N_{RA}^{BW}$ is the number of the PRACHs supported by the system in frequency domain, $N_{SP}$ is the number of switch points within 10 ms, and D is the density of the PRACHs;

the terminal computes the version number according to the following formula:

$r = N_{ID}^{cell} \bmod R$, wherein $N_{ID}^{cell}$ represents the ID value of the cell, and R is the number of versions;

wherein the configuration set is one of the following sets:

| Configuration Index | Preamble Format | Density(D) | Version Number(r) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 5 | 0 |
| 13 | 0 | 5 | 1 |
| 14 | 0 | 5 | 2 |
| 15 | 0 | 10 | 0 |
| 16 | 0 | 10 | 1 |
| 17 | 0 | 10 | 2 |
| 18 | 1 | 0.5 | 0 |
| 19 | 1 | 0.5 | 1 |
| 20 | 1 | 0.5 | 2 |
| 21 | 1 | 1 | 0 |
| 22 | 1 | 1 | 1 |
| 23 | 1 | 2 | 0 |
| 24 | 1 | 3 | 0 |
| 25 | 1 | 3 | 1 |
| 26 | 1 | 5 | 0 |
| 27 | 1 | 5 | 1 |
| 28 | 2 | 0.5 | 0 |
| 29 | 2 | 0.5 | 1 |
| 30 | 2 | 0.5 | 2 |
| 31 | 2 | 1 | 0 |
| 32 | 2 | 1 | 1 |
| 33 | 2 | 2 | 0 |
| 34 | 2 | 3 | 0 |
| 35 | 2 | 3 | 1 |
| 36 | 2 | 5 | 0 |
| 37 | 2 | 5 | 1 |
| 38 | 3 | 0.5 | 0 |
| 39 | 3 | 0.5 | 1 |
| 40 | 3 | 0.5 | 2 |
| 41 | 3 | 1 | 0 |
| 42 | 3 | 1 | 1 |
| 43 | 3 | 2 | 0 |
| 44 | 3 | 3 | 0 |
| 45 | 3 | 3 | 1 |
| 46 | 4 | 0.5 | \ |
| 47 | 4 | 1 | \ |
| 48 | 4 | 2 | \ |
| 49 | 4 | 3 | \ |
| 50 | 4 | 5 | \ |
| 51 | 4 | 10 | \ |
| 52 | | | |
| 53 | | | |
| 54 | | | |
| 55 | | | |
| 56 | | | |
| 57 | | | |
| 58 | | | |
| 59 | | | |
| 60 | | | |
| 61 | | | |
| 62 | | | |
| 63, | | | |
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 5 | 0 |
| 13 | 0 | 5 | 1 |
| 14 | 0 | 5 | 2 |
| 15 | 1 | 0.5 | 0 |
| 16 | 1 | 0.5 | 1 |
| 17 | 1 | 0.5 | 2 |
| 18 | 1 | 1 | 0 |
| 19 | 1 | 1 | 1 |
| 20 | 1 | 2 | 0 |
| 21 | 1 | 3 | 0 |
| 22 | 1 | 3 | 1 |
| 23 | 2 | 0.5 | 0 |
| 24 | 2 | 0.5 | 1 |
| 25 | 2 | 0.5 | 2 |
| 26 | 2 | 1 | 0 |
| 27 | 2 | 1 | 1 |
| 28 | 2 | 2 | 0 |
| 29 | 2 | 3 | 0 |
| 30 | 2 | 3 | 1 |
| 31 | 3 | 0.5 | 0 |
| 32 | 3 | 0.5 | 1 |
| 33 | 3 | 0.5 | 2 |
| 34 | 3 | 1 | 0 |
| 35 | 3 | 1 | 1 |
| 36 | 3 | 2 | 0 |
| 37 | 4 | 0.5 | \ |
| 38 | 4 | 1 | \ |
| 39 | 4 | 2 | \ |
| 40 | 4 | 3 | \ |
| 41 | 4 | 5 | \ |

-continued

| Configuration Index | Preamble Format | Density(D) | Version Number(r) |
| --- | --- | --- | --- |
| 42 | | | |
| 43 | | | |
| 44 | | | |
| 45 | | | |
| 46 | | | |
| 47 | | | |
| 48 | | | |
| 49 | | | |
| 50 | | | |
| 51 | | | |
| 52 | | | |
| 53 | | | |
| 54 | | | |
| 55 | | | |
| 56 | | | |
| 57 | | | |
| 58 | | | |
| 59 | | | |
| 60 | | | |
| 61 | | | |
| 62 | | | |
| 63, | | | |
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 5 | 0 |
| 13 | 0 | 5 | 1 |
| 14 | 0 | 5 | 2 |
| 15 | 1 | 0.5 | 0 |
| 16 | 1 | 0.5 | 1 |
| 17 | 1 | 0.5 | 2 |
| 18 | 1 | 1 | 0 |
| 19 | 1 | 1 | 1 |
| 20 | 1 | 2 | 0 |
| 21 | 1 | 3 | 0 |
| 22 | 1 | 3 | 1 |
| 23 | 2 | 0.5 | 0 |
| 24 | 2 | 0.5 | 1 |
| 25 | 2 | 0.5 | 2 |
| 26 | 2 | 1 | 0 |
| 27 | 2 | 1 | 1 |
| 28 | 2 | 2 | 0 |
| 29 | 2 | 3 | 0 |
| 30 | 2 | 3 | 1 |
| 31 | 2 | 5 | 0 |
| 32 | 2 | 5 | 1 |
| 33 | 3 | 0.5 | 0 |
| 34 | 3 | 0.5 | 1 |
| 35 | 3 | 0.5 | 2 |
| 36 | 3 | 1 | 0 |
| 37 | 3 | 1 | 1 |
| 38 | 4 | 0.5 | \ |
| 39 | 4 | 1 | \ |
| 40 | 4 | 2 | \ |
| 41 | 4 | 3 | \ |
| 42 | 4 | 5 | \ |
| 43 | | | |
| 44 | | | |
| 45 | | | |
| 46 | | | |
| 47 | | | |
| 48 | | | |
| 49 | | | |
| 50 | | | |
| 51 | | | |
| 52 | | | |
| 53 | | | |
| 54 | | | |
| 55 | | | |
| 56 | | | |
| 57 | | | |
| 58 | | | |
| 59 | | | |
| 60 | | | |
| 61 | | | |
| 62 | | | |
| 63, | | | |
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 5 | 0 |
| 13 | 0 | 5 | 1 |
| 14 | 0 | 5 | 2 |
| 15 | 1 | 0.5 | 0 |
| 16 | 1 | 0.5 | 1 |
| 17 | 1 | 0.5 | 2 |
| 18 | 1 | 1 | 0 |
| 19 | 1 | 1 | 1 |
| 20 | 1 | 1 | 2 |
| 21 | 1 | 2 | 0 |
| 22 | 1 | 2 | 1 |
| 23 | 1 | 2 | 2 |
| 24 | 1 | 3 | 0 |
| 25 | 1 | 3 | 1 |
| 26 | 1 | 3 | 2 |
| 27 | 1 | 5 | 0 |
| 28 | 1 | 5 | 1 |
| 29 | 1 | 5 | 2 |
| 30 | 2 | 0.5 | 0 |
| 31 | 2 | 0.5 | 1 |
| 32 | 2 | 0.5 | 2 |
| 33 | 2 | 1 | 0 |
| 34 | 2 | 1 | 1 |
| 35 | 2 | 1 | 2 |
| 36 | 2 | 2 | 0 |
| 37 | 2 | 2 | 1 |
| 38 | 2 | 2 | 2 |
| 39 | 2 | 3 | 0 |
| 40 | 2 | 3 | 1 |
| 41 | 2 | 3 | 2 |
| 42 | 2 | 5 | 0 |
| 43 | 2 | 5 | 1 |
| 44 | 2 | 5 | 2 |
| 45 | 3 | 0.5 | 0 |
| 46 | 3 | 0.5 | 1 |
| 47 | 3 | 0.5 | 2 |
| 48 | 3 | 1 | 0 |
| 49 | 3 | 1 | 1 |
| 50 | 3 | 1 | 2 |
| 51 | 3 | 2 | 0 |
| 52 | 3 | 2 | 1 |
| 53 | 3 | 2 | 2 |
| 54 | 3 | 3 | 0 |
| 55 | 3 | 3 | 1 |
| 56 | 3 | 3 | 2 |
| 57 | 4 | 0.5 | \ |
| 58 | 4 | 1 | \ |
| 59 | 4 | 2 | \ |
| 60 | 4 | 3 | \ |
| 61 | 4 | 5 | \ |
| 62 | 4 | 10 | \ |
| 63, | | | |
| 0 | 0 | 0.5 | 0 |
| 1 | 0 | 0.5 | 1 |
| 2 | 0 | 0.5 | 2 |
| 3 | 0 | 1 | 0 |

75
-continued

| Configuration Index | Preamble Format | Density(D) | Version Number(r) |
|---|---|---|---|
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 5 | 0 |
| 13 | 0 | 5 | 1 |
| 14 | 0 | 5 | 2 |
| 15 | 1 | 0.5 | 0 |
| 16 | 1 | 0.5 | 1 |
| 17 | 1 | 0.5 | 2 |
| 18 | 1 | 1 | 0 |
| 19 | 1 | 1 | 1 |
| 20 | 1 | 2 | 0 |
| 21 | 1 | 3 | 0 |
| 22 | 1 | 3 | 1 |
| 23 | 2 | 0.5 | 0 |
| 24 | 2 | 0.5 | 1 |
| 25 | 2 | 0.5 | 2 |
| 26 | 2 | 1 | 0 |
| 27 | 2 | 1 | 1 |
| 28 | 2 | 2 | 0 |
| 29 | 2 | 3 | 0 |
| 30 | 2 | 3 | 1 |
| 31 | 2 | 5 | 0 |
| 32 | 2 | 5 | 1 |
| 33 | 3 | 0.5 | 0 |
| 34 | 3 | 0.5 | 1 |
| 35 | 3 | 0.5 | 2 |
| 36 | 3 | 1 | 0 |
| 37 | 3 | 1 | 1 |
| 38 | 3 | 2 | 0 |
| 39 | 3 | 3 | 0 |
| 40 | 3 | 3 | 1 |
| 41 | 4 | 0.5 | \ |
| 42 | 4 | 1 | \ |
| 43 | 4 | 2 | \ |
| 44 | 4 | 3 | \ |
| 45 | 4 | 5 | \ |
| 46 | | | |
| 47 | | | |
| 48 | | | |
| 49 | | | |
| 50 | | | |
| 51 | | | |
| 52 | | | |
| 53 | | | |
| 54 | | | |
| 55 | | | |
| 56 | | | |
| 57 | | | |
| 58 | | | |
| 59 | | | |
| 60 | | | |
| 61 | | | |
| 62 | | | |
| 63, | | | |
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 5 | 0 |
| 13 | 0 | 5 | 1 |
| 14 | 0 | 5 | 2 |
| 15 | 1 | 0.5 | 0 |
| 16 | 1 | 0.5 | 1 |

76
-continued

| Configuration Index | Preamble Format | Density(D) | Version Number(r) |
|---|---|---|---|
| 17 | 1 | 0.5 | 2 |
| 18 | 1 | 1 | 0 |
| 19 | 1 | 1 | 1 |
| 20 | 1 | 1 | 2 |
| 21 | 1 | 2 | 0 |
| 22 | 1 | 2 | 1 |
| 23 | 1 | 2 | 2 |
| 24 | 1 | 3 | 0 |
| 25 | 1 | 3 | 1 |
| 26 | 1 | 3 | 2 |
| 27 | 2 | 0.5 | 0 |
| 28 | 2 | 0.5 | 1 |
| 29 | 2 | 0.5 | 2 |
| 30 | 2 | 1 | 0 |
| 31 | 2 | 1 | 1 |
| 32 | 2 | 1 | 2 |
| 33 | 2 | 2 | 0 |
| 34 | 2 | 2 | 1 |
| 35 | 2 | 2 | 2 |
| 36 | 2 | 3 | 0 |
| 37 | 2 | 3 | 1 |
| 38 | 2 | 3 | 2 |
| 39 | 2 | 5 | 0 |
| 40 | 2 | 5 | 1 |
| 41 | 2 | 5 | 2 |
| 42 | 3 | 0.5 | 0 |
| 43 | 3 | 0.5 | 1 |
| 44 | 3 | 0.5 | 2 |
| 45 | 3 | 1 | 0 |
| 46 | 3 | 1 | 1 |
| 47 | 3 | 1 | 2 |
| 48 | 3 | 2 | 0 |
| 49 | 3 | 2 | 1 |
| 50 | 3 | 2 | 2 |
| 51 | 3 | 3 | 0 |
| 52 | 3 | 3 | 1 |
| 53 | 3 | 3 | 2 |
| 54 | 4 | 0.5 | \ |
| 55 | 4 | 1 | \ |
| 56 | 4 | 2 | \ |
| 57 | 4 | 3 | \ |
| 58 | 4 | 5 | \ |
| 59 | | | |
| 60 | | | |
| 61 | | | |
| 62 | | | |
| 63, | | | |
| 0 | 0 | 0.5 | 0 |
| 1 | 0 | 0.5 | 1 |
| 2 | 0 | 0.5 | 2 |
| 3 | 0 | 0.5 | 3 |
| 4 | 0 | 1 | 0 |
| 5 | 0 | 1 | 1 |
| 6 | 0 | 1 | 2 |
| 7 | 0 | 2 | 0 |
| 8 | 0 | 2 | 1 |
| 9 | 0 | 2 | 2 |
| 10 | 0 | 3 | 0 |
| 11 | 0 | 3 | 1 |
| 12 | 0 | 3 | 2 |
| 13 | 0 | 5 | 0 |
| 14 | 0 | 5 | 1 |
| 15 | 0 | 5 | 2 |
| 16 | 0 | 10 | 0 |
| 17 | 0 | 10 | 1 |
| 18 | 0 | 10 | 2 |
| 19 | 1 | 0.5 | 0 |
| 20 | 1 | 0.5 | 1 |
| 21 | 1 | 0.5 | 2 |
| 22 | 1 | 0.5 | 3 |
| 23 | 1 | 1 | 0 |
| 24 | 1 | 1 | 1 |
| 25 | 1 | 2 | 0 |
| 26 | 1 | 3 | 0 |
| 27 | 1 | 3 | 1 |
| 28 | 1 | 5 | 0 |
| 29 | 1 | 5 | 1 |

-continued

| Configuration Index | Preamble Format | Density(D) | Version Number(r) |
|---|---|---|---|
| 30 | 2 | .5 | 0 |
| 31 | 2 | .5 | 1 |
| 32 | 2 | 0.5 | 2 |
| 33 | 2 | 0.5 | 3 |
| 34 | 2 | 1 | 0 |
| 35 | 2 | 1 | 1 |
| 36 | 2 | 2 | 0 |
| 37 | 2 | 3 | 0 |
| 38 | 2 | 3 | 1 |
| 39 | 2 | 5 | 0 |
| 40 | 2 | 5 | 1 |
| 41 | 3 | 0.5 | 0 |
| 42 | 3 | 0.5 | 1 |
| 43 | 3 | 0.5 | 2 |
| 44 | 3 | 0.5 | 3 |
| 45 | 3 | 1 | 0 |
| 46 | 3 | 1 | 1 |
| 47 | 3 | 2 | 0 |
| 48 | 3 | 3 | 0 |
| 49 | 3 | 3 | 1 |
| 50 | 4 | 0.5 | \ |
| 51 | 4 | 1 | \ |
| 52 | 4 | 2 | \ |
| 53 | 4 | 3 | \ |
| 54 | 4 | 5 | \ |
| 55 | 4 | 10 | \ |
| 56 | | | |
| 57 | | | |
| 58 | | | |
| 59 | | | |
| 60 | | | |
| 61 | | | |
| 62 | | | |
| 63, | | | |
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 0 | 10 | 0 |
| 21 | 0 | 10 | 1 |
| 22 | 0 | 10 | 2 |
| 23 | 1 | 0.5 | 0 |
| 24 | 1 | 0.5 | 1 |
| 25 | 1 | 0.5 | 2 |
| 26 | 1 | 1 | 0 |
| 27 | 1 | 1 | 1 |
| 28 | 1 | 2 | 0 |
| 29 | 1 | 3 | 0 |
| 30 | 1 | 4 | 0 |
| 31 | 1 | 5 | 0 |
| 32 | 1 | 6 | 0 |
| 33 | 2 | 0.5 | 0 |
| 34 | 2 | 0.5 | 1 |
| 35 | 2 | 0.5 | 2 |
| 36 | 2 | 1 | 0 |
| 37 | 2 | 1 | 1 |
| 38 | 2 | 2 | 0 |
| 39 | 2 | 3 | 0 |
| 40 | 2 | 4 | 0 |
| 41 | 2 | 5 | 0 |
| 42 | 2 | 6 | 0 |

-continued

| Configuration Index | Preamble Format | Density(D) | Version Number(r) |
|---|---|---|---|
| 43 | 3 | 0.5 | 0 |
| 44 | 3 | 0.5 | 1 |
| 45 | 3 | 0.5 | 2 |
| 46 | 3 | 1 | 0 |
| 47 | 3 | 1 | 1 |
| 48 | 3 | 2 | 0 |
| 49 | 3 | 3 | 0 |
| 50 | 3 | 4 | 0 |
| 51 | 4 | 0.5 | \ |
| 52 | 4 | 1 | \ |
| 53 | 4 | 2 | \ |
| 54 | 4 | 3 | \ |
| 55 | 4 | 4 | \ |
| 56 | 4 | 5 | \ |
| 57 | 4 | 6 | \ |
| 58 | 4 | 10 | \ |
| 59 | | | |
| 60 | | | |
| 61 | | | |
| 62 | | | |
| 63, | | | |
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |
| 32 | 2 | 0.5 | 2 |
| 33 | 2 | 1 | 0 |
| 34 | 2 | 1 | 1 |
| 35 | 2 | 2 | 0 |
| 36 | 2 | 3 | 0 |
| 37 | 2 | 4 | 0 |
| 38 | 2 | 5 | 0 |
| 39 | 2 | 6 | 0 |
| 40 | 3 | 0.5 | 0 |
| 41 | 3 | 0.5 | 1 |
| 42 | 3 | 0.5 | 2 |
| 43 | 3 | 1 | 0 |
| 44 | 3 | 1 | 1 |
| 45 | 3 | 2 | 0 |
| 46 | 3 | 3 | 0 |
| 47 | 3 | 4 | 0 |
| 48 | 4 | 0.5 | \ |
| 49 | 4 | 1 | \ |
| 50 | 4 | 2 | \ |
| 51 | 4 | 3 | \ |
| 52 | 4 | 4 | \ |
| 53 | 4 | 5 | \ |
| 54 | 4 | 6 | \ |
| 55 | | | |

-continued

| Configuration Index | Preamble Format | Density(D) | Version Number(r) |
|---|---|---|---|
| 56 | | | |
| 57 | | | |
| 58 | | | |
| 59 | | | |
| 60 | | | |
| 61 | | | |
| 62 | | | |
| 63, | | | |
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 4 | 0 |
| 10 | 0 | 4 | 1 |
| 11 | 0 | 4 | 2 |
| 12 | 0 | 6 | 0 |
| 13 | 0 | 6 | 1 |
| 14 | 0 | 6 | 2 |
| 15 | 0 | 10 | 0 |
| 16 | 0 | 10 | 1 |
| 17 | 0 | 10 | 2 |
| 18 | 1 | 0.5 | 0 |
| 19 | 1 | 0.5 | 1 |
| 20 | 1 | 0.5 | 2 |
| 21 | 1 | 1 | 0 |
| 22 | 1 | 1 | 1 |
| 23 | 1 | 2 | 0 |
| 24 | 1 | 4 | 0 |
| 25 | 1 | 6 | 0 |
| 26 | 2 | 0.5 | 0 |
| 27 | 2 | 0.5 | 1 |
| 28 | 2 | 0.5 | 2 |
| 29 | 2 | 1 | 0 |
| 30 | 2 | 1 | 1 |
| 31 | 2 | 2 | 0 |
| 32 | 2 | 4 | 0 |
| 33 | 2 | 6 | 0 |
| 34 | 3 | 0.5 | 0 |
| 35 | 3 | 0.5 | 1 |
| 36 | 3 | 0.5 | 2 |
| 37 | 3 | 1 | 0 |
| 38 | 3 | 1 | 1 |
| 39 | 3 | 2 | 0 |
| 40 | 3 | 4 | 0 |
| 41 | 4 | 0.5 | 0 |
| 42 | 4 | 0.5 | 1 |
| 43 | 4 | 0.5 | 2 |
| 44 | 4 | 1 | 0 |
| 45 | 4 | 1 | 1 |
| 46 | 4 | 2 | 0 |
| 47 | 4 | 4 | 0 |
| 48 | 4 | 6 | 0 |
| 49 | 4 | 10 | 0 |
| 50 | | | |
| 51 | | | |
| 52 | | | |
| 53 | | | |
| 54 | | | |
| 55 | | | |
| 56 | | | |
| 57 | | | |
| 58 | | | |
| 59 | | | |
| 60 | | | |
| 61 | | | |
| 62 | | | |
| 63, | | | |
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 4 | 0 |
| 10 | 0 | 4 | 1 |
| 11 | 0 | 4 | 2 |
| 12 | 0 | 6 | 0 |
| 13 | 0 | 6 | 1 |
| 14 | 0 | 6 | 2 |
| 15 | 0 | 10 | 0 |
| 16 | 0 | 10 | 1 |
| 17 | 0 | 10 | 2 |
| 18 | 1 | 0.5 | 0 |
| 19 | 1 | 0.5 | 1 |
| 20 | 1 | 0.5 | 2 |
| 21 | 1 | 1 | 0 |
| 22 | 1 | 1 | 1 |
| 23 | 1 | 2 | 0 |
| 24 | 1 | 4 | 0 |
| 25 | 1 | 6 | 0 |
| 26 | 2 | 0.5 | 0 |
| 27 | 2 | 0.5 | 1 |
| 28 | 2 | 0.5 | 2 |
| 29 | 2 | 1 | 0 |
| 30 | 2 | 1 | 1 |
| 31 | 2 | 2 | 0 |
| 32 | 2 | 4 | 0 |
| 33 | 2 | 6 | 0 |
| 34 | 3 | 0.5 | 0 |
| 35 | 3 | 0.5 | 1 |
| 36 | 3 | 0.5 | 2 |
| 37 | 3 | 1 | 0 |
| 38 | 3 | 1 | 1 |
| 39 | 3 | 2 | 0 |
| 40 | 3 | 4 | 0 |
| 41 | 4 | 0.5 | 0 |
| 42 | 4 | 0.5 | 1 |
| 43 | 4 | 0.5 | 2 |
| 44 | 4 | 1 | 0 |
| 45 | 4 | 1 | 1 |
| 46 | 4 | 1 | 2 |
| 47 | 4 | 2 | 0 |
| 48 | 4 | 2 | 1 |
| 49 | 4 | 2 | 2 |
| 50 | 4 | 4 | 0 |
| 51 | 4 | 4 | 1 |
| 52 | 4 | 4 | 2 |
| 53 | 4 | 6 | 0 |
| 54 | 4 | 6 | 1 |
| 55 | 4 | 6 | 2 |
| 56 | 4 | 10 | 0 |
| 57 | 4 | 10 | 1 |
| 58 | 4 | 10 | 2 |
| 59 | | | |
| 60 | | | |
| 61 | | | |
| 62 | | | |
| 63, | | | |
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |

-continued

| Configuration Index | Preamble Format | Density(D) | Version Number(r) |
|---|---|---|---|
| 18 | 0 | 6 | 0 |
| 19 | 0 | 6 | 1 |
| 20 | 0 | 10 | 0 |
| 21 | 0 | 10 | 1 |
| 22 | 0 | 10 | 2 |
| 23 | 1 | 0.5 | 0 |
| 24 | 1 | 0.5 | 1 |
| 25 | 1 | 0.5 | 2 |
| 26 | 1 | 1 | 0 |
| 27 | 1 | 1 | 1 |
| 28 | 1 | 2 | 0 |
| 29 | 1 | 3 | 0 |
| 30 | 1 | 4 | 0 |
| 31 | 1 | 5 | 0 |
| 32 | 1 | 6 | 0 |
| 33 | 2 | 0.5 | 0 |
| 34 | 2 | 0.5 | 1 |
| 35 | 2 | 0.5 | 2 |
| 36 | 2 | 1 | 0 |
| 37 | 2 | 1 | 1 |
| 38 | 2 | 2 | 0 |
| 39 | 2 | 3 | 0 |
| 40 | 2 | 4 | 0 |
| 41 | 2 | 5 | 0 |
| 42 | 2 | 6 | 0 |
| 43 | 3 | 0.5 | 0 |
| 44 | 3 | 0.5 | 1 |
| 45 | 3 | 0.5 | 2 |
| 46 | 3 | 1 | 0 |
| 47 | 3 | 1 | 1 |
| 48 | 3 | 2 | 0 |
| 49 | 3 | 3 | 0 |
| 50 | 3 | 4 | 0 |
| 51 | 4 | 0.5 | \ |
| 52 | 4 | 1 | \ |
| 53 | 4 | 2 | \ |
| 54 | 4 | 3 | \ |
| 55 | 4 | 4 | \ |
| 56 | 4 | 5 | \ |
| 57 | 4 | 6 | \ |
| 58 | | | |
| 59 | | | |
| 60 | | | |
| 61 | | | |
| 62 | | | |
| 63, | | | |
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 0 | 10 | 0 |
| 21 | 0 | 10 | 1 |
| 22 | 0 | 10 | 2 |
| 23 | 1 | 0.5 | 0 |
| 24 | 1 | 0.5 | 1 |
| 25 | 1 | 0.5 | 2 |
| 26 | 1 | 1 | 0 |
| 27 | 1 | 1 | 1 |
| 28 | 1 | 2 | 0 |
| 29 | 1 | 3 | 0 |
| 30 | 1 | 4 | 0 |

-continued

| Configuration Index | Preamble Format | Density(D) | Version Number(r) |
|---|---|---|---|
| 31 | 1 | 5 | 0 |
| 32 | 1 | 6 | 0 |
| 33 | 2 | 0.5 | 0 |
| 34 | 2 | 0.5 | 1 |
| 35 | 2 | 0.5 | 2 |
| 36 | 2 | 1 | 0 |
| 37 | 2 | 1 | 1 |
| 38 | 2 | 2 | 0 |
| 39 | 2 | 3 | 0 |
| 40 | 2 | 4 | 0 |
| 41 | 2 | 5 | 0 |
| 42 | 2 | 6 | 0 |
| 43 | 3 | 0.5 | 0 |
| 44 | 3 | 0.5 | 1 |
| 45 | 3 | 0.5 | 2 |
| 46 | 3 | 1 | 0 |
| 47 | 3 | 1 | 1 |
| 48 | 3 | 2 | 0 |
| 49 | 3 | 3 | 0 |
| 50 | 3 | 4 | 0 |
| 51 | 4 | 0.5 | 0 |
| 52 | 4 | 0.5 | 1 |
| 53 | 4 | 0.5 | 2 |
| 54 | 4 | 1 | 0 |
| 55 | 4 | 1 | 1 |
| 56 | 4 | 2 | 0 |
| 57 | 4 | 3 | 0 |
| 58 | 4 | 3 | 1 |
| 59 | 4 | 4 | 0 |
| 60 | 4 | 5 | 0 |
| 61 | 4 | 5 | 1 |
| 62 | 4 | 6 | 0 |
| 63 | 4 | 10 | 0, |
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 0 | 10 | 0 |
| 21 | 0 | 10 | 1 |
| 22 | 0 | 10 | 2 |
| 23 | 1 | 0.5 | 0 |
| 24 | 1 | 0.5 | 1 |
| 25 | 1 | 0.5 | 2 |
| 26 | 1 | 1 | 0 |
| 27 | 1 | 1 | 1 |
| 28 | 1 | 2 | 0 |
| 29 | 1 | 3 | 0 |
| 30 | 1 | 4 | 0 |
| 31 | 1 | 5 | 0 |
| 32 | 1 | 6 | 0 |
| 33 | 2 | 0.5 | 0 |
| 34 | 2 | 0.5 | 1 |
| 35 | 2 | 0.5 | 2 |
| 36 | 2 | 1 | 0 |
| 37 | 2 | 1 | 1 |
| 38 | 2 | 2 | 0 |
| 39 | 2 | 3 | 0 |
| 40 | 2 | 4 | 0 |
| 41 | 2 | 5 | 0 |
| 42 | 2 | 6 | 0 |
| 43 | 3 | 0.5 | 0 |

-continued

| Configuration Index | Preamble Format | Density(D) | Version Number(r) |
|---|---|---|---|
| 44 | 3 | 0.5 | 1 |
| 45 | 3 | 0.5 | 2 |
| 46 | 3 | 1 | 0 |
| 47 | 3 | 1 | 1 |
| 48 | 3 | 2 | 0 |
| 49 | 3 | 3 | 0 |
| 50 | 3 | 4 | 0 |
| 51 | 4 | 0.5 | 0 |
| 52 | 4 | 0.5 | 1 |
| 53 | 4 | 0.5 | 2 |
| 54 | 4 | 1 | 0 |
| 55 | 4 | 1 | 1 |
| 56 | 4 | 2 | 0 |
| 57 | 4 | 3 | 0 |
| 58 | 4 | 4 | 0 |
| 59 | 4 | 5 | 0 |
| 60 | 4 | 6 | 0 |
| 61 | 4 | 10 | 0 |
| 62 | | | |
| 63, | | | |
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |
| 32 | 2 | 0.5 | 2 |
| 33 | 2 | 1 | 0 |
| 34 | 2 | 1 | 1 |
| 35 | 2 | 2 | 0 |
| 36 | 2 | 3 | 0 |
| 37 | 2 | 4 | 0 |
| 38 | 2 | 5 | 0 |
| 39 | 2 | 6 | 0 |
| 40 | 3 | 0.5 | 0 |
| 41 | 3 | 0.5 | 1 |
| 42 | 3 | 0.5 | 2 |
| 43 | 3 | 1 | 0 |
| 44 | 3 | 1 | 1 |
| 45 | 3 | 2 | 0 |
| 46 | 3 | 3 | 0 |
| 47 | 3 | 4 | 0 |
| 48 | 4 | 0.5 | 0 |
| 49 | 4 | 0.5 | 1 |
| 50 | 4 | 0.5 | 2 |
| 51 | 4 | 1 | 0 |
| 52 | 4 | 1 | 1 |
| 53 | 4 | 2 | 0 |
| 54 | 4 | 3 | 0 |
| 55 | 4 | 3 | 1 |
| 56 | 4 | 4 | 0 |
| 57 | 4 | 5 | 0 |
| 58 | 4 | 5 | 1 |
| 59 | 4 | 6 | 0 |
| 60 | | | |
| 61 | | | |
| 62 | | | |
| 63, | | | |
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |

-continued

| Configuration Index | Preamble Format | Density(D) | Version Number(r) |
|---|---|---|---|
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 0 | 10 | 0 |
| 21 | 0 | 10 | 1 |
| 22 | 0 | 10 | 2 |
| 23 | 1 | 0.5 | 0 |
| 24 | 1 | 0.5 | 1 |
| 25 | 1 | 0.5 | 2 |
| 26 | 1 | 1 | 0 |
| 27 | 1 | 1 | 1 |
| 28 | 1 | 2 | 0 |
| 29 | 1 | 3 | 0 |
| 30 | 1 | 4 | 0 |
| 31 | 1 | 5 | 0 |
| 32 | 1 | 6 | 0 |
| 33 | 2 | 0.5 | 0 |
| 34 | 2 | 0.5 | 1 |
| 35 | 2 | 0.5 | 2 |
| 36 | 2 | 1 | 0 |
| 37 | 2 | 1 | 1 |
| 38 | 2 | 2 | 0 |
| 39 | 2 | 3 | 0 |
| 40 | 2 | 4 | 0 |
| 41 | 2 | 5 | 0 |
| 42 | 2 | 6 | 0 |
| 43 | 3 | 0.5 | 0 |
| 44 | 3 | 0.5 | 1 |
| 45 | 3 | 0.5 | 2 |
| 46 | 3 | 1 | 0 |
| 47 | 3 | 1 | 1 |
| 48 | 3 | 2 | 0 |
| 49 | 3 | 3 | 0 |
| 50 | 3 | 4 | 0 |
| 51 | 4 | 0.5 | 0 |
| 52 | 4 | 0.5 | 1 |
| 53 | 4 | 0.5 | 2 |
| 54 | 4 | 1 | 0 |
| 55 | 4 | 1 | 1 |
| 56 | 4 | 2 | 0 |
| 57 | 4 | 3 | 0 |
| 58 | 4 | 3 | 1 |
| 59 | 4 | 4 | 0 |
| 60 | 4 | 5 | 0 |
| 61 | 4 | 5 | 1 |
| 62 | 4 | 6 | 0 |
| 63, | | | |
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 0 | 10 | 0 |
| 21 | 0 | 10 | 1 |
| 22 | 0 | 10 | 2 |
| 23 | 1 | 0.5 | 0 |
| 24 | 1 | 0.5 | 1 |
| 25 | 1 | 0.5 | 2 |
| 26 | 1 | 1 | 0 |
| 27 | 1 | 1 | 1 |
| 28 | 1 | 2 | 0 |
| 29 | 1 | 3 | 0 |
| 30 | 1 | 4 | 0 |
| 31 | 1 | 5 | 0 |
| 32 | 1 | 6 | 0 |
| 33 | 2 | 0.5 | 0 |
| 34 | 2 | 0.5 | 1 |
| 35 | 2 | 0.5 | 2 |
| 36 | 2 | 1 | 0 |
| 37 | 2 | 1 | 1 |
| 38 | 2 | 2 | 0 |
| 39 | 2 | 3 | 0 |
| 40 | 2 | 4 | 0 |
| 41 | 2 | 5 | 0 |
| 42 | 2 | 6 | 0 |
| 43 | 3 | 0.5 | 0 |
| 44 | 3 | 0.5 | 1 |
| 45 | 3 | 0.5 | 2 |
| 46 | 3 | 1 | 0 |
| 47 | 3 | 1 | 1 |
| 48 | 3 | 2 | 0 |
| 49 | 3 | 3 | 0 |
| 50 | 3 | 4 | 0 |
| 51 | 4 | 0.5 | 0 |
| 52 | 4 | 0.5 | 1 |
| 53 | 4 | 0.5 | 2 |
| 54 | 4 | 1 | 0 |
| 55 | 4 | 1 | 1 |
| 56 | 4 | 2 | 0 |
| 57 | 4 | 3 | 0 |
| 58 | 4 | 4 | 0 |
| 59 | 4 | 5 | 0 |
| 60 | 4 | 6 | 0 |
| 61 | | | |
| 62 | | | |
| 63, | | | |
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |

-continued

| Configuration Index | Preamble Format | Density(D) | Version Number(r) |
|---|---|---|---|
| 32 | 2 | 0.5 | 2 |
| 33 | 2 | 1 | 0 |
| 34 | 2 | 1 | 1 |
| 35 | 2 | 2 | 0 |
| 36 | 2 | 3 | 0 |
| 37 | 2 | 4 | 0 |
| 38 | 2 | 5 | 0 |
| 39 | 2 | 6 | 0 |
| 40 | 3 | 0.5 | 0 |
| 41 | 3 | 0.5 | 1 |
| 42 | 3 | 0.5 | 2 |
| 43 | 3 | 1 | 0 |
| 44 | 3 | 1 | 1 |
| 45 | 3 | 2 | 0 |
| 46 | 3 | 3 | 0 |
| 47 | 3 | 4 | 0 |
| 48 | 4 | 0.5 | 0 |
| 49 | 4 | 0.5 | 1 |
| 50 | 4 | 0.5 | 2 |
| 51 | 4 | 1 | 0 |
| 52 | 4 | 1 | 1 |
| 53 | 4 | 2 | 0 |
| 54 | 4 | 3 | 0 |
| 55 | 4 | 3 | 1 |
| 56 | 4 | 4 | 0 |
| 57 | 4 | 5 | 0 |
| 58 | 4 | 5 | 1 |
| 59 | 4 | 6 | 0 |
| 60 | 4 | 10 | 0 |
| 61 | | | |
| 62 | | | |
| 63, and | | | |
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |
| 32 | 2 | 0.5 | 2 |
| 33 | 2 | 1 | 0 |
| 34 | 2 | 1 | 1 |
| 35 | 2 | 2 | 0 |
| 36 | 2 | 3 | 0 |
| 37 | 2 | 4 | 0 |
| 38 | 2 | 5 | 0 |
| 39 | 2 | 6 | 0 |
| 40 | 3 | 0.5 | 0 |
| 41 | 3 | 0.5 | 1 |
| 42 | 3 | 0.5 | 2 |
| 43 | 3 | 1 | 0 |
| 44 | 3 | 1 | 1 |
| 45 | 3 | 2 | 0 |
| 46 | 3 | 3 | 0 |
| 47 | 3 | 4 | 0 |
| 48 | 4 | 0.5 | 0 |
| 49 | 4 | 0.5 | 1 |
| 50 | 4 | 0.5 | 2 |
| 51 | 4 | 1 | 0 |
| 52 | 4 | 1 | 1 |
| 53 | 4 | 2 | 0 |
| 54 | 4 | 3 | 0 |
| 55 | 4 | 4 | 0 |
| 56 | 4 | 5 | 0 |
| 57 | 4 | 6 | 0 |
| 58 | 4 | 10 | 0 |
| 59 | | | |
| 60 | | | |
| 61 | | | |
| 62 | | | |
| 63. | | | |

2. The method according to claim 1, wherein a generating method of the PRACH configuration set is as follows: determining a density set supported by each kind of PRACH format; combining each PRACH format and the density supported by each PRACH format and determining one configuration index for each combination; and storing various kinds of combinations and configuration indexes in the PRACH configuration set.

3. The method according to claim 2, wherein in the generating method of the PRACH configuration set, computing the number of versions needed for the each kind of PRACH format to enable the PRACHs of all the cells managed by the same base station to be distributed uniformly in time at the density supported by the PRACH format, after determining the density set supported by each kind of PRACH format; selectively allocating corresponding number of version numbers for the PRACH format and the density supported by the PRACH format according to the number of versions; and storing combinations of the PRACH format, the density supported by the PRACH format, and the corresponding version number in the PRACH configuration set, and determining one configuration index for each kind of combination.

4. The method according to claim 2, wherein
the density sets supported by PRACH Format 0 are 0.5 PRACH/10 ms, 1 PRACH/10 ms, 2 PRACH/10 ms, 3 PRACH/10 ms, 5 PRACH/10 ms, 10 PRACH/10 ms; or 0.5 PRACH/10 ms, 1 PRACH/10 ms, 2 PRACH/10 ms, 3 PRACH/10 ms, 5 PRACH/10 ms; or 0.5 PRACH/10 ms, 1 PRACH/10 ms, 2 PRACH/10 ms, 3 PRACH/10 ms; or 1 PRACH/10 ms, 2 PRACH/10 ms, 3 PRACH/10 ms, 5 PRACH/10 ms, 10 PRACH/10 ms; or 1 PRACH/10 ms, 2 PRACH/10 ms, 3 PRACH/10 ms, 5 PRACH/10 ms; or 1 PRACH/10 ms, 2 PRACH/10 ms, 3 PRACH/10 ms; or 1 PRACH/10 ms, 2 PRACH/10 ms; or 0.5 PRACH/10 ms, 1 PRACH/10 ms, 2 PRACH/10 ms, 3 PRACH/10 ms, 4 PRACH/10 ms, 5 PRACH/10 ms, 6 PRACH/10 ms, 10 PRACH/10 ms; or 0.5 PRACH/10 ms, 1 PRACH/10 ms, 2 PRACH/10 ms, 3 PRACH/10 ms, 4 PRACH/10 ms, 5 PRACH/10 ms, 6 PRACH/10 ms; or 0.5 PRACH/10 ms, 1 PRACH/10 ms, 2 PRACH/10 ms, 4 PRACH/10 ms, 6 PRACH/10 ms, 10 PRACH/10 ms; or 0.5 PRACH/10 ms, 1 PRACH/10 ms, 2 PRACH/10 ms, 4 PRACH/10 ms, 6 PRACH/10 ms;
the density sets supported by PRACH Format 1 or 2 are 0.5 PRACH/10 ms, 1 PRACH/10 ms, 2 PRACH/10 ms, 3

PRACH/10 ms, 5 PRACH/10 ms; or 0.5 PRACH/10 ms, 1 PRACH/10 ms, 2 PRACH/10 ms, 3 PRACH/10 ms; or 0.5 PRACH/10 ms, 1 PRACH/10 ms, 2 PRACH/10 ms; or 0.5 PRACH/10 ms, 1 PRACH/10 ms; or 1 PRACH/10 ms, 2 PRACH/10 ms, 3 PRACH/10 ms, 5 PRACH/10 ms; or 1 PRACH/10 ms, 2 PRACH/10 ms, 3 PRACH/10 ms; or 1 PRACH/10 ms, 2 PRACH/10 ms; or 0.5 PRACH/10 ms, 1 PRACH/10 ms, 2 PRACH/10 ms, 3 PRACH/10 ms, 4 PRACH/10 ms, 5 PRACH/10 ms, 6 PRACH/10 ms; or 0.5 PRACH/10 ms, 1 PRACH/10 ms, 2 PRACH/10 ms, 4 PRACH/10 ms, 6 PRACH/10 ms; or 0.5 PRACH/10 ms, 1 PRACH/10 ms, 2 PRACH/10 ms, 4 PRACH/10 ms;

the densities or the density sets supported by PRACH Format 3 are 0.5 PRACH/10 ms, 1 PRACH/10 ms, 2 PRACH/10 ms, 3 PRACH/10 ms, 5 PRACH/10 ms; or 0.5 PRACH/10 ms, 1 PRACH/10 ms, 2 PRACH/10 ms, 3 PRACH/10 ms; or 0.5 PRACH/10 ms, 1 PRACH/10 ms, 2 PRACH/10 ms; or 0.5 PRACH/10 ms, 1 PRACH/10 ms; or 0.5 PRACH/10 ms; or 1 PRACH/10 ms, 2 PRACH/10 ms, 3 PRACH/10 ms, 5 PRACH/10 ms; or 1 PRACH/10 ms, 2 PRACH/10 ms, 3 PRACH/10 ms; or 1 PRACH/10 ms, 2 PRACH/10 ms; or 1 PRACH/10 ms; or 0.5 PRACH/10 ms, 1 PRACH/10 ms, 2 PRACH/10 ms, 3 PRACH/10 ms, 4 PRACH/10 ms; or 0.5 PRACH/10 ms, 1 PRACH/10 ms, 2 PRACH/10 ms, 4 PRACH/10 ms; or 0.5 PRACH/10 ms, 1 PRACH/10 ms, 2 PRACH/10 ms, 4 PRACH/10 ms, 6 PRACH/10 ms;

the density sets supported by PRACH Format 4 are 0.5 PRACH/10 ms, 1 PRACH/10 ms, 2 PRACH/10 ms, 3 PRACH/10 ms, 5 PRACH/10 ms, 10 PRACH/10 ms; or 0.5 PRACH/10 ms, 1 PRACH/10 ms, 2 PRACH/10 ms, 3 PRACH/10 ms, 5 PRACH/10 ms; or 0.5 PRACH/10 ms, 1 PRACH/10 ms, 2 PRACH/10 ms, 3 PRACH/10 ms; or 1 PRACH/10 ms, 2 PRACH/10 ms, 3 PRACH/10 ms, 5 PRACH/10 ms, 10 PRACH/10 ms; or 1 PRACH/10 ms, 2 PRACH/10 ms, 3 PRACH/10 ms, 5 PRACH/10 ms; or 1 PRACH/10 ms, 2 PRACH/10 ms, 3 PRACH/10 ms; or 1 PRACH/10 ms, 2 PRACH/10 ms; or 0.5 PRACH/10 ms, 1 PRACH/10 ms, 2 PRACH/10 ms, 3 PRACH/10 ms, 4 PRACH/10 ms, 5 PRACH/10 ms, 6 PRACH/10 ms, 10 PRACH/10 ms; or 0.5 PRACH/10 ms, 1 PRACH/10 ms, 2 PRACH/10 ms, 3 PRACH/10 ms, 4 PRACH/10 ms, 5 PRACH/10 ms, 6 PRACH/10 ms; or 0.5 PRACH/10 ms, 1 PRACH/10 ms, 2 PRACH/10 ms, 4 PRACH/10 ms, 6 PRACH/10 ms, 10 PRACH/10 ms; or 0.5 PRACH/10 ms, 1 PRACH/10 ms, 2 PRACH/10 ms, 4 PRACH/10 ms, 6 PRACH/10 ms.

5. The method according to claim 3, wherein the computing the number of versions needed for the density supported by each kind of PRACH format uses one of the following methods:

method A1, when the density range is 0.5, 1, 2, 3, 5, and 10 PRACH/10 ms, determining the maximum value of the smallest number of versions needed for enabling the PRACHs of all the cells managed by the same base station to be distributed uniformly in time according to the each kind of PRACH format, the density supported by the each kind of PRACH format and an uplink downlink subframe ratio;

method A2, the number of versions is $$R = \left\lfloor \frac{N_{RA}^{BW} \cdot N_{SP}}{D} \right\rfloor,$$

$N_{RA}^{BW}$ is the number of the PRACHs supported by the system in a frequency domain, $N_{SP}$ is the number of switch points within 10 ms, and D is the density of the PRACH;

method A3, when the base station manages n cells, the number of versions needed for each kind of PRACH format and its corresponding density set is n, wherein $1 <= n <= 4$;

method A4, the number of versions is $$R = \min\left( \left\lfloor \frac{N_{RA}^{BW} \cdot N_{SP}}{D} \right\rfloor, 3 \right);$$

method A5, when the density range is 0.5, 1, 2, 3, 4, 5, 6, and 10 PRACH/10 ms, determining the maximum value of the smallest number of versions needed for enabling the PRACHs of all the cells managed by the same base station to be distributed uniformly in time according to the each kind of PRACH format, the density supported by the each kind of PRACH format and the uplink downlink subframe ratio, wherein D=3, 5 is used for the case that the numbers of the PRACHs contained in two half frames in the time domain are unequal, D=4, 6 is used for the case that the numbers of the PRACHs contained in the two half frames in the time domain are equal, and D=0.5, 1, 2, 10 is used for two cases that the numbers of the PRACHs contained in the two half frames in the time domain are equal or unequal;

method A6, when the density range is 0.5, 1, 2, 4, 6, and 10 PRACH/10 ms, determining the maximum value of the smallest number of versions needed for enabling the PRACHs of all the cells managed by the same base station to be distributed uniformly in time according to the each kind of PRACH format, the density supported by the each kind of PRACH format and the uplink downlink subframe ratio;

method A7, when the density range is 0.5, 1, 2, 3, 4, 5, 6, and 10 PRACH/10 ms, determining the maximum value of the smallest number of version needed for enabling the PRACHs of all the cells managed by the same base station to be distributed uniformly in time according to the each kind of PRACH format, the density supported by the each kind of PRACH format and the uplink downlink subframe ratio.

6. The method according to claim 5, wherein when the base station manages three cells, the number of versions determined using method A1 is as follows:

when one of the each kind of PRACH format is preamble format 0, the number of versions R=3 as for various density sets;

when one of the each kind of PRACH format is preamble format 1 or 2, the number of versions R=3 if the density is 0.5 PRACH/10 ms; the number of versions R=2 if the density is 1 or 3 or 5 PRACH/10 ms; and the number of versions R=1 if the density is 2 PRACH/10 ms;

when one of the each kind of PRACH format is preamble format 3, the number of versions R=3 if the density is 0.5 PRACH/10 ms; the number of versions R=2 if the density is 1 or 3 or 5 PRACH/10 ms; the number of versions R=1 if the density is 2 PRACH/10 ms;

when one of the each kind of PRACH format is preamble format 4, the number of versions R=3 if the density is 0.5 PRACH/10 ms; the number of versions R=2 if the density is 1 or 3 or 5 PRACH/10 ms; the number of versions R=1 if the density is 2 or 10 PRACH/10 ms.

7. The method according to claim 5, wherein when the base station manages four cells, the number of versions determined using method A1 is as follows:

when one of the each kind of PRACH format is preamble format 0, the number of versions R=4 if the density is 0.5 PRACH/10 ms; for other various density sets the number of versions R=3;

when one of the each kind of PRACH format is preamble format 1 or 2, the number of versions R=4 if the density is 0.5 PRACH/10 ms; the number of versions R=2 if the density is 1 or 3 or 5 PRACH/10 ms; the number of versions R=1 if the density is 2 PRACH/10 ms;

when one of the each kind of PRACH format is preamble format 3, the number of versions R=4 if the density is 0.5 PRACH/10 ms; the number of versions R=2 if the density is 1 or 3 or 5 PRACH/10 ms; the number of versions R=1 if the density is 2 PRACH/10 ms;

when one of the each kind of PRACH format is preamble format 4, the number of versions R=4 if the density is 0.5 PRACH/10 ms; the number of versions R=2 if the density is 1 or 3 or 5 PRACH/10 ms; the number of versions R=1 if the density is 2 or 10 PRACH/10 ms.

8. The method according to claim 5, wherein the number of version determined using method A5 is as follows:

when one of the each kind of PRACH format is preamble format 0, the number of versions R=2 if the density is 6 PRACH/10 ms; and the number of versions R=3 as for other densities;

when one of the each kind of PRACH format is preamble format 1 or 2, the number of versions R=3 if the density is 0.5 PRACH/10 ms; the number of versions R=2 if the density is 1 PRACH/10 ms; the number of versions R=1 if the density is 2 or 3 or 4 or 5 or 6 PRACH/10 ms;

when one of the each kind of PRACH format is preamble format 3, the number of versions R=3 if the density is 0.5 PRACH/10 ms; the number of versions R=2 if the density is 1 PRACH/10 ms; the number of versions R=1 if the density is 2 or 3 or 4PRACH/10 ms;

when one of the each kind of PRACH format is preamble format 4, the number of versions R=3 if the density is 0.5 PRACH/10 ms; the number of versions R=2 if the density is 1 PRACH/10 ms; the number of versions R=1 if the density is 2 or 3 or 4 or 5 or 6 or 10 PRACH/10 ms.

9. The method according to claim 5, wherein the number of versions determined using method A6 is as follows:

regarding preamble format 0, R=3 for all the densities;

regarding preamble format 1, 2, 3 or 4, R=3 for the density D=0.5 PRACH/10 ms; R=2 for the density D=1 PRACH/10 ms; R=1 for D=2, 4, 6, 10 PRACH/10 ms.

10. The method according to claim 5, wherein the number of versions determined using method A7 is as follows:

when one of the each kind of PRACH format is preamble format 0, the number of versions R=3 for all the densities;

when one of the each kind of PRACH format is preamble format 1 or 2, the number of versions R=3 if the density is 0.5 PRACH/10 ms; the number of versions R=2 if the density is 1 or 3 or 5 PRACH/10 ms; the number of versions R=1 if the density is 2 or 4 or 6 PRACH/10 ms;

when one of the each kind of PRACH format is preamble format 3, the number of versions R=3 if the density is 0.5 PRACH/10 ms; the number of versions R=2 if the density is 1 or 3 PRACH/10 ms; the number of versions R=1 if the density is 2 or 4 PRACH/10 ms;

when one of the each kind of PRACH format is preamble format 4, the number of versions R=3 if the density is 0.5 PRACH/10 ms; the number of versions R=2 if the density is 1 or 3 or 5 PRACH/10 ms; the number of versions R=1 if the density is 2 or 4 or 6 or 10 PRACH/10 ms.

11. The method according to claim 5, wherein after determining the number of versions needed for the each kind of PRACH format and its corresponding density set using method A1 or A3 or A5 or A6, the version number is allocated for the each kind of PRACH format and the density set supported by the each kind of PRACH format according to the number of versions, that is, setting version numbers of the same quantity as the number of versions, and the corresponding relation between the version number and the each kind of PRACH format and its corresponding density set is stored in the PRACH configuration set;

when performing the PRACH configuration, the base station sends the configuration information, that is, the indexes of the configuration parameters, to the terminal according to the contents of the PRACH configuration set, and the terminal inquires the PRACH configuration set according to the configuration indexes to obtain the configuration parameters; or, the terminal computes to obtain the number of versions according to the system parameter and computes to obtain the version number according to the number of versions and the ID value of the cell;

wherein the terminal computes the number of versions according to the following formula:

$$R = \left\lfloor \frac{N_{RA}^{BW} \cdot N_{SP}}{D} \right\rfloor,$$

wherein R is the number of versions, $N_{RA}^{BW}$ is the number of the PRACHs supported by the system in the frequency domain, $N_{SP}$ is the number of switch points within 10 ms, and D is the density of the PRACHs;

the terminal computes the version number according to the following formula:

$r = N_{ID}^{cell} \mod R$, wherein $N_{ID}^{cell}$ represents an ID value of the cell and R is the number of versions.

12. The method according to claim 5, wherein after determining the number of versions needed for the each kind of PRACH format and its corresponding density set using method A2 or A4, the each kind of PRACH format and the corresponding version number of the density supported by the each kind of PRACH format are not recorded in the PRACH configuration set;

when performing the PRACH configuration, the terminal computes the number of versions according to the system parameters, and computes the version number according to the number of versions and the ID value of the cell;

wherein the terminal computes the number of versions according to the following formula:

$$R = \left\lfloor \frac{N_{RA}^{BW} \cdot N_{SP}}{D} \right\rfloor,$$

wherein R is the number of versions, $N_{RA}^{BW}$ is the number of the PRACHs supported by the system in the frequency domain, $N_{SP}$ is the number of switch points within 10 ms, and D is the density of the PRACHs;

the terminal computes the version number according to the following formula:

$r = N_{ID}^{cell} \mod R$, wherein $N_{ID}^{cell}$ represents an ID value of the cell, and R is the number of versions.

13. The method according to claim 3, wherein the density sets supported by PRACH Format 0 are 0.5 PRACH/10 ms, 1 PRACH/10 ms, 2 PRACH/10 ms, 3 PRACH/10 ms, 5 PRACH/10 ms, 10 PRACH/10 ms; or 0.5 PRACH/10 ms, 1 PRACH/10 ms, 2 PRACH/10 ms, 3 PRACH/10 ms, 5 PRACH/10 ms; or 0.5 PRACH/10 ms, 1 PRACH/10 ms, 2 PRACH/10 ms, 3 PRACH/10 ms; or 1 PRACH/10 ms, 2 PRACH/10 ms, 3 PRACH/10 ms, 5 PRACH/10 ms, 10 PRACH/10 ms; or 1 PRACH/10 ms, 2 PRACH/10 ms, 3 PRACH/10 ms, 5 PRACH/10 ms; or 1 PRACH/10 ms, 2 PRACH/10 ms, 3 PRACH/10 ms; or 1 PRACH/10 ms, 2 PRACH/10 ms; or 0.5 PRACH/10 ms, 1 PRACH/10 ms, 2 PRACH/10 ms, 3 PRACH/10 ms, 4 PRACH/10 ms, 5 PRACH/10 ms, 6 PRACH/10 ms, 10 PRACH/10 ms; or 0.5 PRACH/10 ms, 1 PRACH/10 ms, 2 PRACH/10 ms, 3 PRACH/10 ms, 4 PRACH/10 ms, 5 PRACH/10 ms, 6 PRACH/10 ms; or 0.5 PRACH/10 ms, 1 PRACH/10 ms, 2 PRACH/10 ms, 4 PRACH/10 ms, 6 PRACH/10 ms, 10 PRACH/10 ms; or 0.5 PRACH/10 ms, 1 PRACH/10 ms, 2 PRACH/10 ms, 4 PRACH/10 ms, 6 PRACH/10 ms;

the density sets supported by PRACH Format 1 or 2 are 0.5 PRACH/10 ms, 1 PRACH/10 ms, 2 PRACH/10 ms, 3 PRACH/10 ms, 5 PRACH/10 ms; or 0.5 PRACH/10 ms, 1 PRACH/10 ms, 2 PRACH/10 ms, 3 PRACH/10 ms; or 0.5 PRACH/10 ms, 1 PRACH/10 ms, 2 PRACH/10 ms; or 0.5 PRACH/10 ms, 1 PRACH/10 ms; or 1 PRACH/10 ms, 2 PRACH/10 ms, 3 PRACH/10 ms, 5 PRACH/10 ms; or 1 PRACH/10 ms, 2 PRACH/10 ms, 3 PRACH/10 ms; or 1 PRACH/10 ms, 2 PRACH/10 ms; or 0.5 PRACH/10 ms, 1 PRACH/10 ms, 2 PRACH/10 ms, 3 PRACH/10 ms, 4 PRACH/10 ms, 5 PRACH/10 ms, 6 PRACH/10 ms; or 0.5 PRACH/10 ms, 1 PRACH/10 ms, 2 PRACH/10 ms, 4 PRACH/10 ms, 6 PRACH/10 ms; or 0.5 PRACH/10 ms, 1 PRACH/10 ms, 2 PRACH/10 ms, 4 PRACH/10 ms;

the densities or the density sets supported by PRACH Format 3 are 0.5 PRACH/10 ms, 1 PRACH/10 ms, 2 PRACH/10 ms, 3 PRACH/10 ms, 5 PRACH/10 ms; or 0.5 PRACH/10 ms, 1 PRACH/10 ms, 2 PRACH/10 ms, 3 PRACH/10 ms; or 0.5 PRACH/10 ms, 1 PRACH/10 ms, 2 PRACH/10 ms; or 0.5 PRACH/10 ms, 1 PRACH/10 ms; or 0.5 PRACH/10 ms; or 1 PRACH/10 ms, 2 PRACH/10 ms, 3 PRACH/10 ms, 5 PRACH/10 ms; or 1 PRACH/10 ms, 2 PRACH/10 ms, 3 PRACH/10 ms; or 1 PRACH/10 ms, 2 PRACH/10 ms; or 1 PRACH/10 ms; or 0.5 PRACH/10 ms, 1 PRACH/10 ms, 2 PRACH/10 ms, 3 PRACH/10 ms, 4 PRACH/10 ms; or 0.5 PRACH/10 ms, 1 PRACH/10 ms, 2 PRACH/10 ms, 4 PRACH/10 ms; or 0.5 PRACH/10 ms, 1 PRACH/10 ms, 2 PRACH/10 ms, 4 PRACH/10 ms, 6 PRACH/10 ms;

the density sets supported by PRACH Format 4 are 0.5 PRACH/10 ms, 1 PRACH/10 ms, 2 PRACH/10 ms, 3 PRACH/10 ms, 5 PRACH/10 ms, 10 PRACH/10 ms; or 0.5 PRACH/10 ms, 1 PRACH/10 ms, 2 PRACH/10 ms, 3 PRACH/10 ms, 5 PRACH/10 ms; or 0.5 PRACH/10 ms, 1 PRACH/10 ms, 2 PRACH/10 ms, 3 PRACH/10 ms; or 1 PRACH/10 ms, 2 PRACH/10 ms, 3 PRACH/10 ms, 5 PRACH/10 ms, 10 PRACH/10 ms; or 1 PRACH/10 ms, 2 PRACH/10 ms, 3 PRACH/10 ms, 5 PRACH/10 ms; or 1 PRACH/10 ms, 2 PRACH/10 ms, 3 PRACH/10 ms; or 1 PRACH/10 ms, 2 PRACH/10 ms; or 0.5 PRACH/10 ms, 1 PRACH/10 ms, 2 PRACH/10 ms, 3 PRACH/10 ms, 4 PRACH/10 ms, 5 PRACH/10 ms, 6 PRACH/10 ms, 10 PRACH/10 ms; or 0.5 PRACH/10 ms, 1 PRACH/10 ms, 2 PRACH/10 ms, 3 PRACH/10 ms, 4 PRACH/10 ms, 5 PRACH/10 ms, 6 PRACH/10 ms; or 0.5 PRACH/10 ms, 1 PRACH/10 ms, 2 PRACH/10 ms, 4 PRACH/10 ms, 6 PRACH/10 ms, 10 PRACH/10 ms; or 0.5 PRACH/10 ms, 1 PRACH/10 ms, 2 PRACH/10 ms, 4 PRACH/10 ms, 6 PRACH/10 ms.

\* \* \* \* \*